United States Patent

Freitag

[15] 3,654,615

[45] Apr. 4, 1972

[54] ELEMENT PLACEMENT SYSTEM

[72] Inventor: Harlow Freitag, Lake Mohegan, N.Y.

[73] Assignee: International Business Machines Corporation, Armonk, N.Y.

[22] Filed: Dec. 1, 1965

[21] Appl. No.: 510,767

[52] U.S. Cl. ....................340/172.5

[51] Int. Cl. ....................G06f 7/00

[58] Field of Search ....................340/172.5; 235/151, 151.1, 235/151.11

[56] References Cited

UNITED STATES PATENTS

| | | | |
|---|---|---|---|
| 3,126,635 | 3/1964 | Muldoon et al. | 235/151.11 X |
| 3,307,154 | 2/1967 | Garth et al. | 340/172.5 |
| 3,325,786 | 6/1967 | Shashoua et al. | 340/172.5 |
| 3,369,163 | 2/1968 | Peterson et al. | 235/151.11 X |

*Primary Examiner*—Paul J. Henon
*Assistant Examiner*—Ronald F. Chapuran
*Attorney*—Hanifin and Clark

[57] ABSTRACT

The disclosure describes a system for assigning a plurality of interrelated circuit elements to element positions in an array of element positions on a circuit board. The system includes means for storing an indication of the interrelationship of the elements being assigned and the order in which the elements are to be assigned. Apparatus is provided for assigning the first element to be assigned to a selected position in the array, selecting candidate positions related in a predetermined manner to the position which has just had an element assigned to it; determining the best candidate position for the next element to be assigned and assigning the next element to be assigned to the position determined above; the system repeats the above three steps until all elements have been assigned.

20 Claims, 33 Drawing Figures

INVENTOR.
HARLOW FREITAG
BY [signature]
ATTORNEY

DETERMINE AND STORE W' LIST

ADD NEW CANDIDATE POSITIONS

MAKE ALL USABLE UNFILLED POSITIONS AVAILABLE

FIG. 5

| | | | | | |
|---|---|---|---|---|---|
| FIG. 5A | FIG. 5B | FIG. 5C | FIG. 5D | FIG. 5E | FIG. 5F |
| FIG. 5G | FIG. 5H | FIG. 5I | FIG. 5J | FIG. 5K | FIG. 5L |
| FIG. 5M | FIG. 5N | FIG. 5O | FIG. 5P | FIG. 5Q | FIG. 5R |

WORD FORMAT
A M# 1

WORD FORMAT
A M# 2

M ARRAY CORE MEMORY
(M A C M)
WORD FORMAT

W MATRIX MEMORY
WORD ADDRESS FORMAT

| | C1 | C2 | C3 | C4 | C5 | C6 | C7 | C8 | C9 | C10 | C11 | C12 | C13 | C14 |
|---|---|---|---|---|---|---|---|---|---|---|---|---|---|---|
| C1 | 1 | 2 | 3 | 4 | 5 | 6 | 7 | 8 | 9 | 10 | 11 | 12 | 13 | 14 |
| C2 | 15 | 16 | 17 | 18 | 19 | 20 | 21 | 22 | 23 | 24 | 25 | 26 | 27 | 28 |
| C3 | 29 | 30 | 31 | 32 | 33 | 34 | 35 | 36 | 37 | 38 | 39 | 40 | 41 | 42 |
| C4 | 43 | 44 | 45 | 46 | 47 | 48 | 49 | 50 | 51 | 52 | 53 | 54 | 55 | 56 |
| C5 | 57 | 58 | 59 | 60 | 61 | 62 | 63 | 64 | 65 | 66 | 67 | 68 | 69 | 70 |
| C6 | 71 | 72 | 73 | 74 | 75 | 76 | 77 | 78 | 79 | 80 | 81 | 82 | 83 | 84 |
| C7 | 85 | 86 | 87 | 88 | 89 | 90 | 91 | 92 | 93 | 94 | 95 | 96 | 97 | 98 |
| C8 | 99 | 100 | 101 | 102 | 103 | 104 | 105 | 106 | 107 | 108 | 109 | 110 | 111 | 112 |
| C9 | 113 | 114 | 115 | 116 | 117 | 118 | 119 | 120 | 121 | 122 | 123 | 124 | 125 | 126 |
| C10 | 127 | 128 | 129 | 130 | 131 | 132 | 133 | 134 | 135 | 136 | 137 | 138 | 139 | 140 |
| C11 | 141 | 142 | 143 | 144 | 145 | 146 | 147 | 148 | 149 | 150 | 151 | 152 | 153 | 154 |
| C12 | 155 | 156 | 157 | 158 | 159 | 160 | 161 | 162 | 163 | 164 | 165 | 166 | 167 | 168 |
| C13 | 169 | 170 | 171 | 172 | 173 | 174 | 175 | 176 | 177 | 178 | 179 | 180 | 181 | 182 |
| C14 | 183 | 184 | 185 | 186 | 187 | 188 | 189 | 190 | 191 | 192 | 193 | 194 | 195 | 196 |

FIG. 6D

ELEMENT PLACEMENT SYSTEM

While there are many commercial and industrial situations where a number of interrelated elements are to be formed into some sort of structural pattern within the confines of a predetermined array, and a decision must be made as to which elements are to be assigned to each position in the array, the following discussion will be primarily concerned with situations occurring in the field of electronic circuits. The requirements of smaller and faster electronic circuits has led to the development of integrated circuit technology where a plurality of elements or even circuits are formed on a single crystal wafer and these elements are internally interconnected to provide a complete functional unit. Since, with this sort of circuit technology, terminals are required only for inputs and outputs from the functional unit rather than to interconnect the individual elements thereof, the total number of terminals required is substantially reduced as is the wiring complexity of the circuit. Furthermore, this circuit technology permits the use of shorter lines and thereby higher speed operation.

In a typical situation, a plurality of like elements or circuits are formed in an array on a single crystal wafer and selected ones of these circuits are interconnected to form a circuit array for performing a desired function. The interconnections may be made either by wiring together pins provided for each element or by plating interconnecting lines on the crystal by photoetching or other well known techniques. In assigning the element positions on the wafer to perform the function of each of the circuits in the circuit array, a primary consideration is to minimize the complexity of the wiring by assigning interconnected circuits to element positions on the wafer which are as close to each other as possible. This also has the effect of reducing lead length and thereby providing high speed operation.

While there are existing algorithms which perform this assignment function, they generally involve iterative, trial and error operations, with all of the circuit elements to be placed and all of the positions on the wafer being looked at during all or most of the iterations. These approaches are capable of giving fairly good results, but they are quite time consuming and expensive and are sometimes limited as to the size, shape, or type of circuit and configuration which they can handle.

A specific problem which few of the existing placement schemes are designed of handling arises when there are elements or circuits on the wafer or circuit board which do not meet specifications and, therefore, cannot be used or can be used only to a limited extent. In the past the entire wafer or circuit board has been discarded when one or more defective elements are found or, in the alternative, a wiring pattern for the imperfect wafer has been determined by hand. When integrated circuit wafers having perhaps a hundred individual circuits on them are formed using existing technology, the percentage of perfect wafers is small enough so that it is not economically feasible to discard all imperfect wafers. Hand determination of a wiring pattern for these wafers is far too time consuming and expensive to be practical and generally does not yield an optimum wiring pattern. A need therefore exists for a system which is capable of allocating usable elements on a wafer to perform each of the circuit functions where all of the elements on the wafer are not useable. Such a scheme should also be fast, relatively inexpensive, and flexible so as to be able to handle a variety of wafer sizes and circuit configurations. The scheme should also be capable of handling criteria changes in the assignment and wiring algorithms and should be capable of handling critical paths and considering wiring length so that, when the assignment is completed, the required interconnecting wires will be as short as possible.

It is therefore a primary object of this invention to provide an improved system for assigning related elements to positions in an array of positions.

A more specific object of this invention is to provide a system of the type described above which is capable of performing the assignment function even when a substantial number of the positions in the array are, for one reason or another, not useable.

Another object of this invention is to provide an element assignment system of the type described above which is faster and less expensive than alternative schemes for performing the same function.

A further object of this invention is to provide an element assignment system of the type described above which is flexible as to the number of elements, the type of elements, the size of the array, and the nature of the array.

Still another object of this invention is to provide an element assignment system of the type described above which is capable of accepting criteria changes without necessitating extensive alteration of the system.

Still another object of this invention is to provide a system for automatically producing an integrated circuit on a multi-circuit wafer array having some imperfect circuits on it.

A feature of the invention is the provision of a systematic scheme for assigning elements to element positions in an array of element positions which required only a limited number of elements and a limited number of element positions to be looked at in order to assign each element.

In accordance with these objects and features, the invention provides a system for determining the positions in an array of positions which are to be assigned to perform the function of each of a plurality of interrelated elements. The elements for example, may be electrical elements of an interconnected electrical circuit, and the positions may be electrical elements on a crystal wafer. When this is the case, the system may form part of a system for generating integrated circuits on monolithic crystal wafers. The relationship of each of the elements to each of the other elements is stored and is utilized to determine the order in which the elements are to be assigned to positions in the array. This order may, for example, be stored as a list with the first item in the list being the element having the greatest relationship to the other elements and the succeeding elements in the list, being in each instance, the element having the greatest relationship to the elements already stored in the list. The first element to be assigned is assigned to a centrally located position in the array. Where the array has imperfect positions, this position is selected to be good one with, in accordance with a preferred assignment criteria, at least one good position adjacent to it. The second element to be assigned is then assigned to a position in the array adjacent to that to which the first element was assigned. Each element after the second is assigned by determining the position, adjacent to a position which already has an element assigned to it, for which the sum of the related distances of the next element to be assigned to the elements already assigned is a minimum and assigning of the next element to be assigned to that position. Related distances may involve a determination both of the number of lines involved and of the weight assigned to these lines. While for the preferred assignment criteria, new elements are assigned to positions adjacent to positions to which elements have already been assigned, other assignment criteria will also be considered.

The foregoing and other objects, features and advantages of the invention will be apparent from the following more particular description of preferred embodiments of the invention as illustrated in the accompanying drawings.

Figure 1:
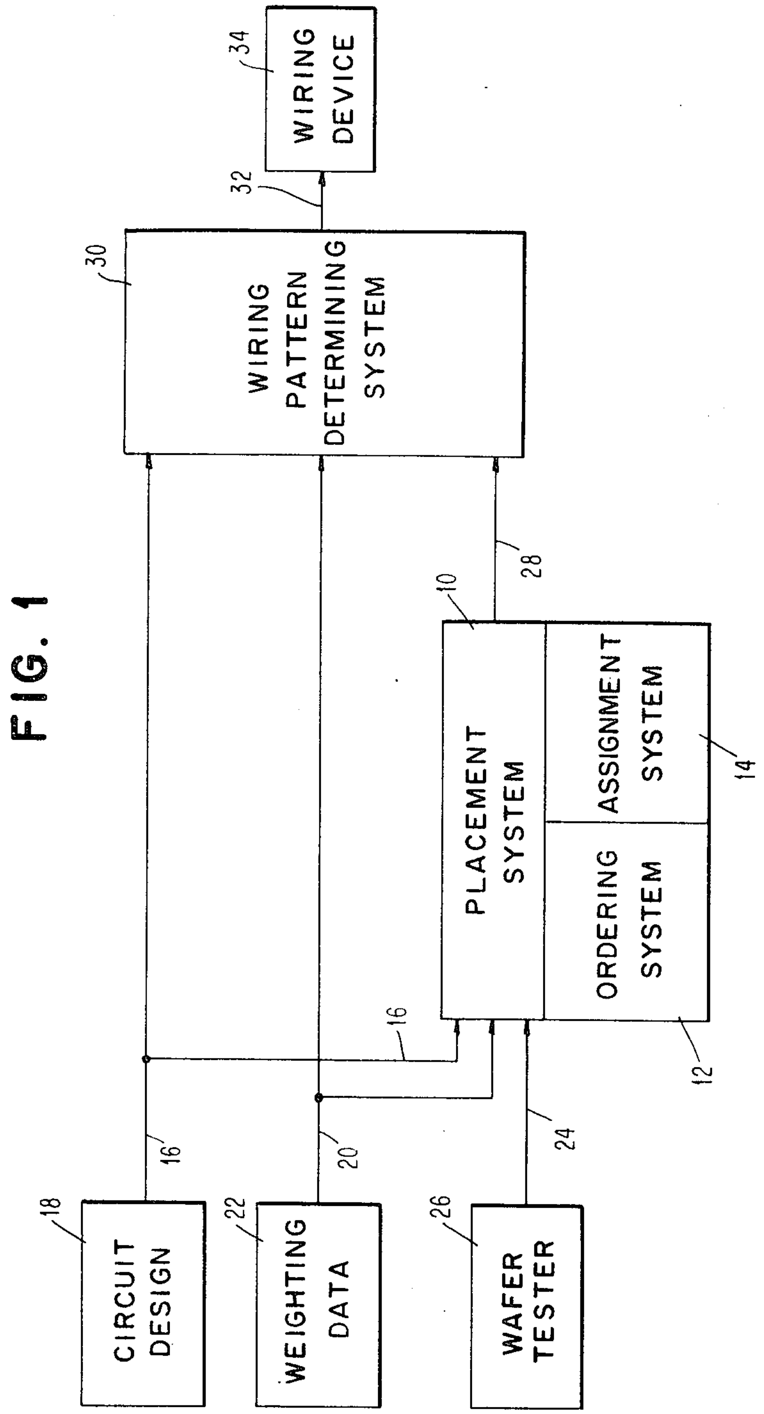
FIG. 1 is a diagram of a system for producing integrated circuit wafers from a wafer having a device yield of less than one hundred percent.
Figure 5A:
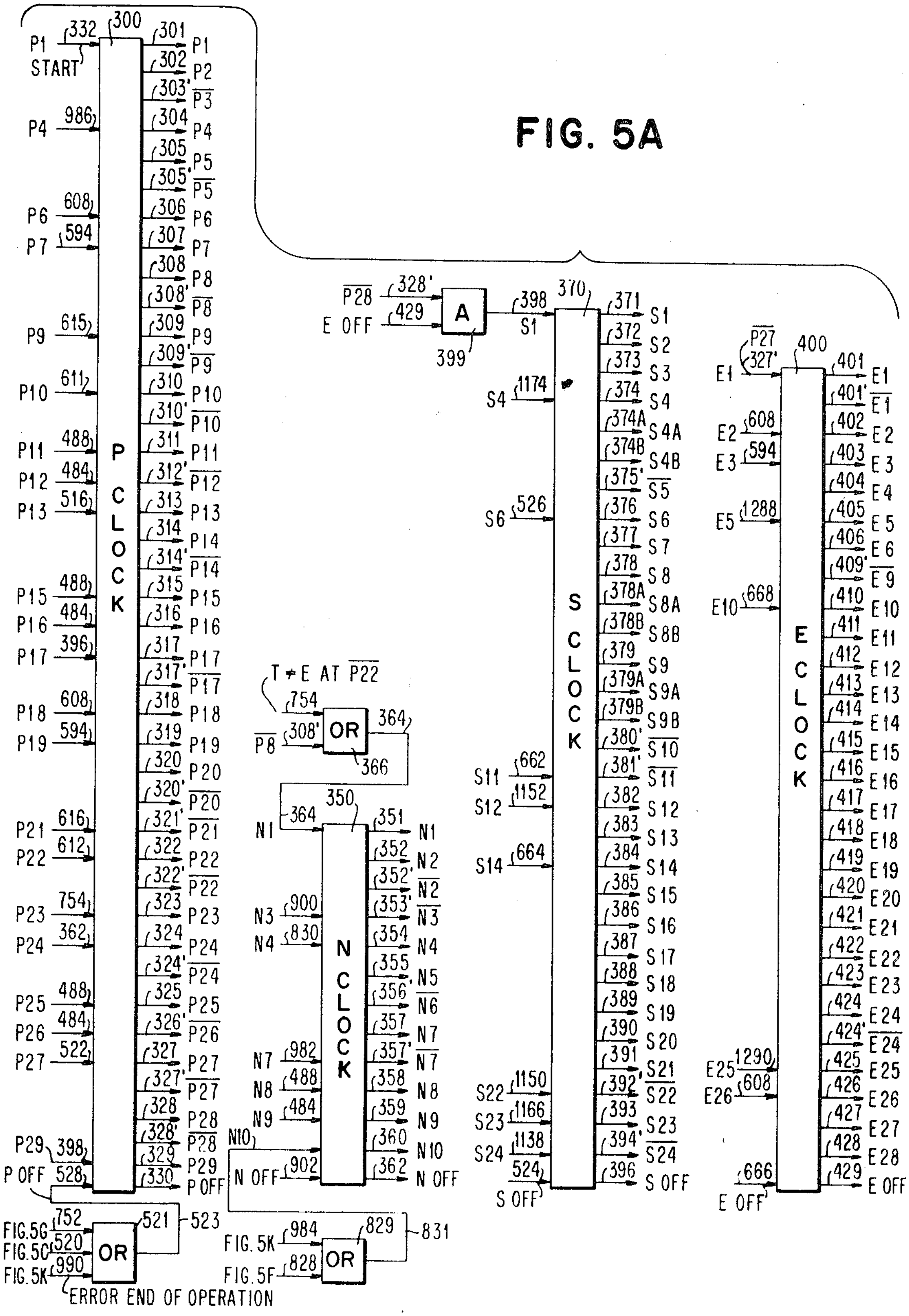
FIG. 5A–5R are combined to from a schematic diagram of a special purpose computer embodiment of the assignment portion of the system shown in FIG. 1.
Figure 5B:
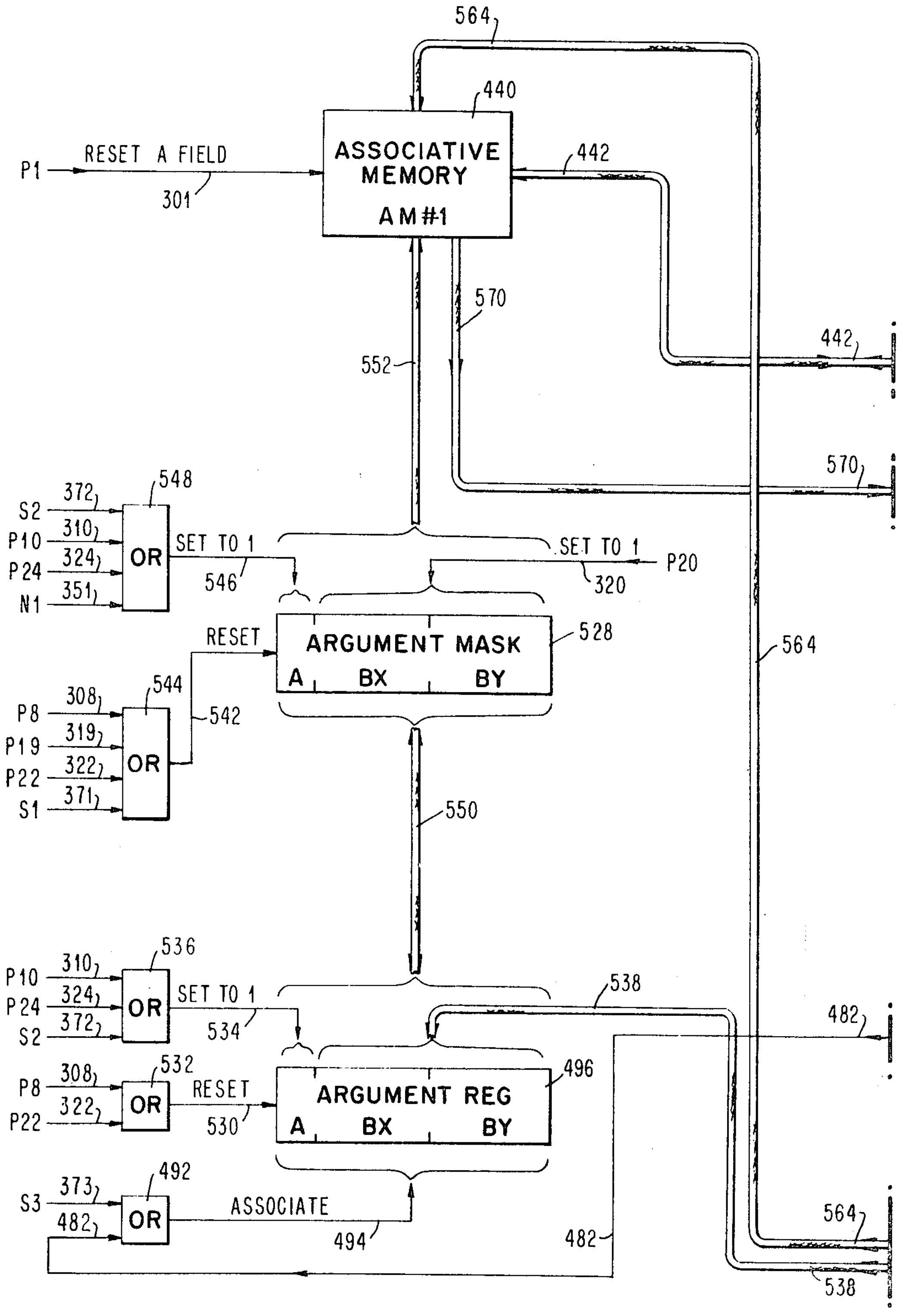
FIG. 5 is a diagram illustrating how
Figure 5C:
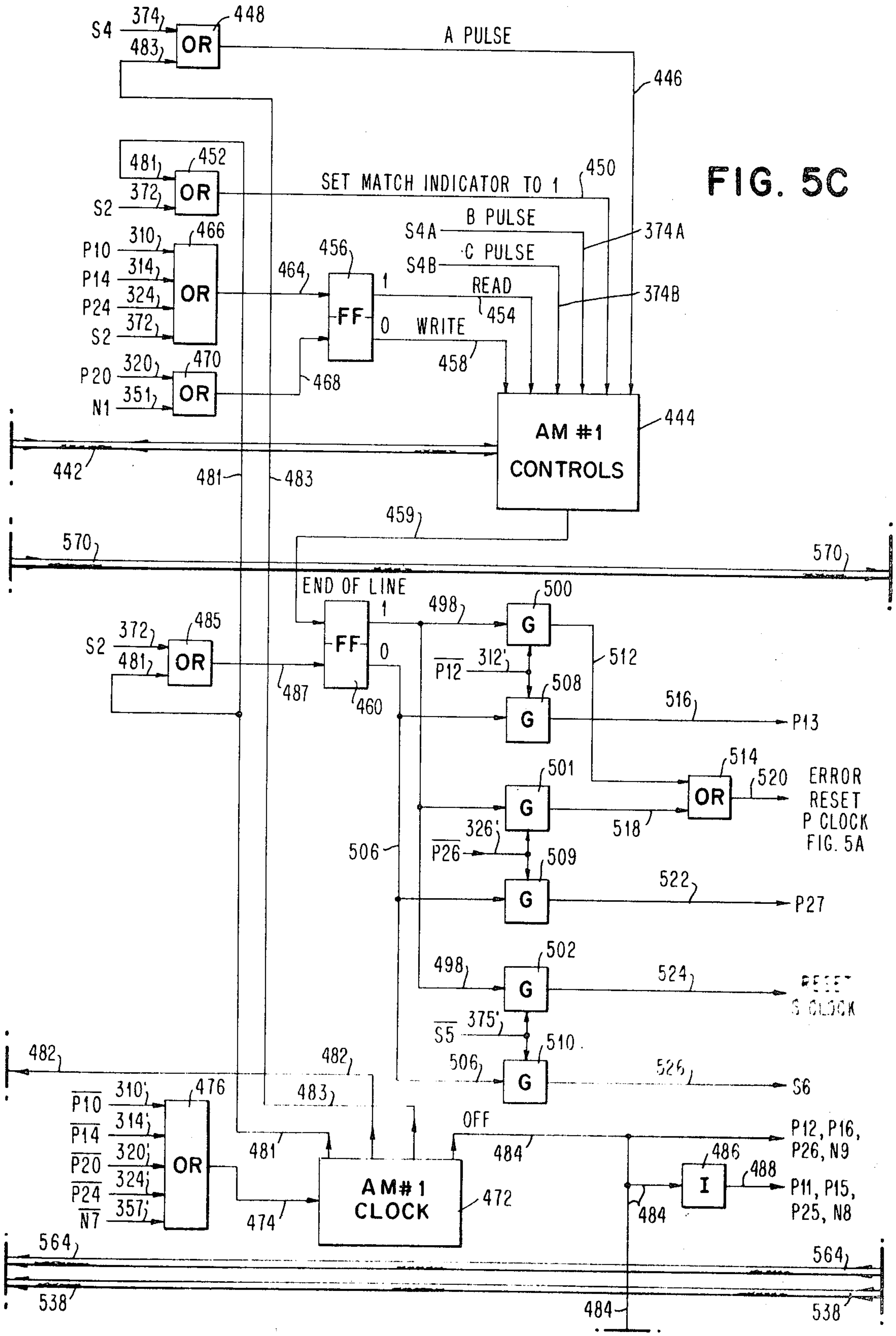
Figure 5D:
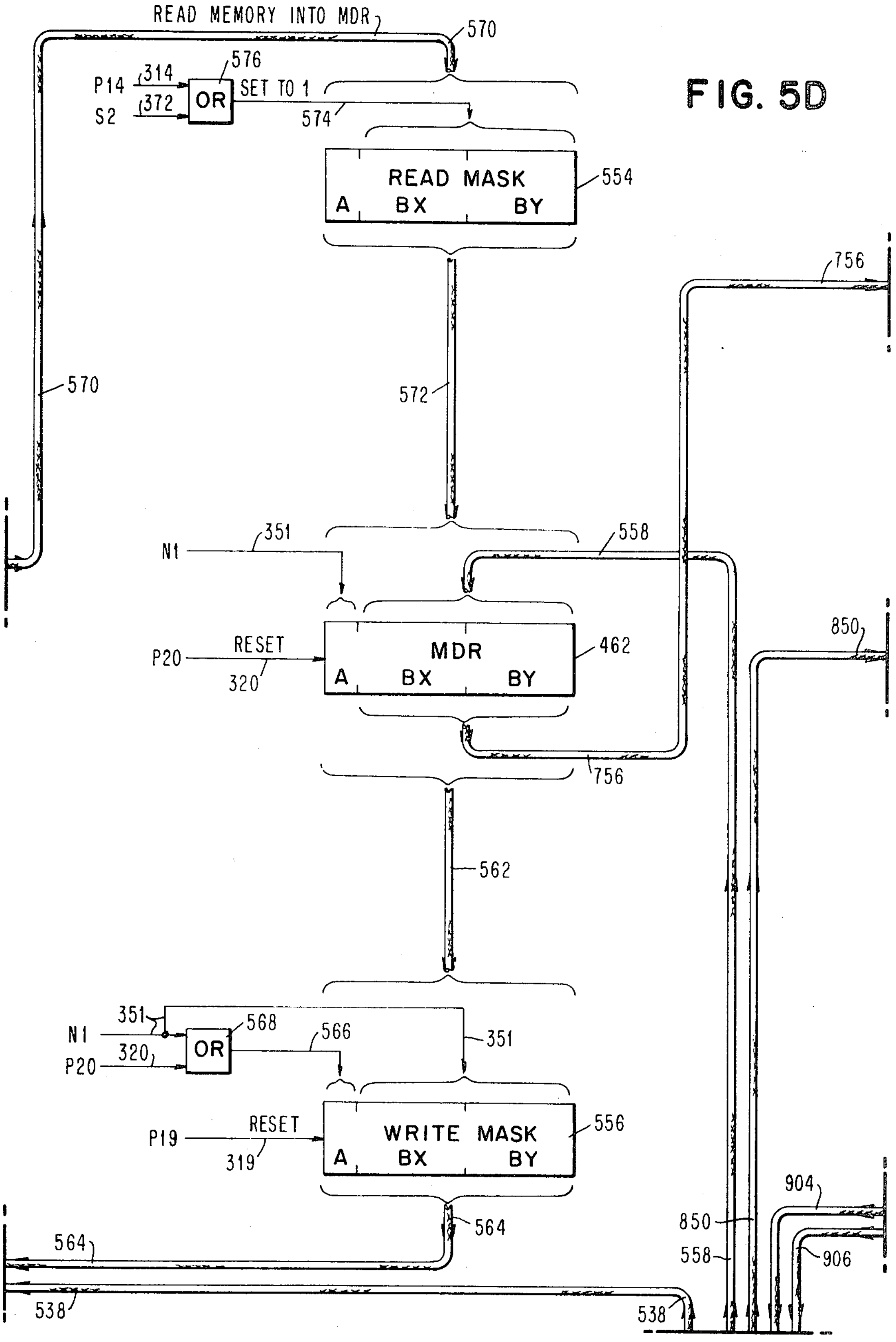
Figure 5E:
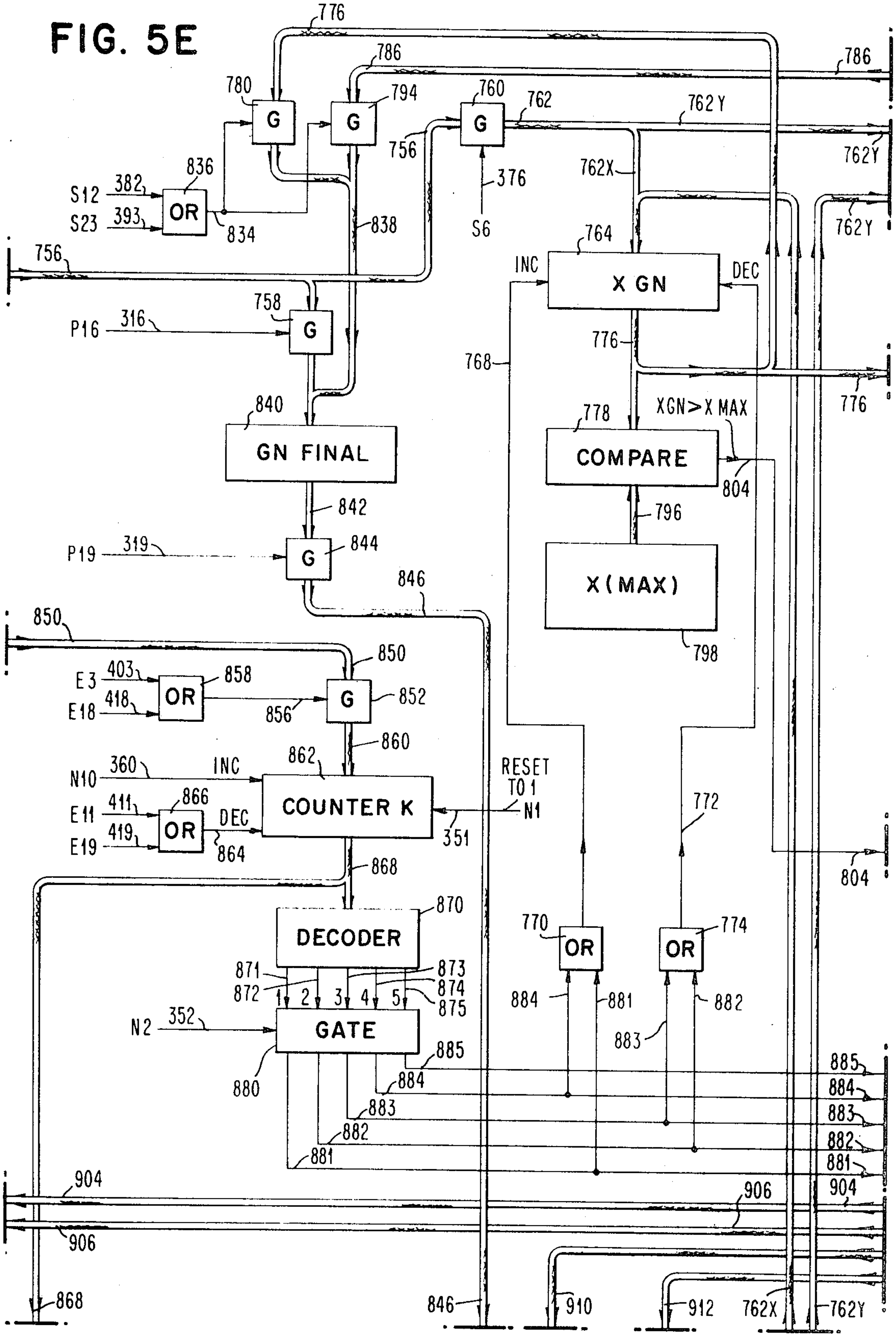
Figure 5F:
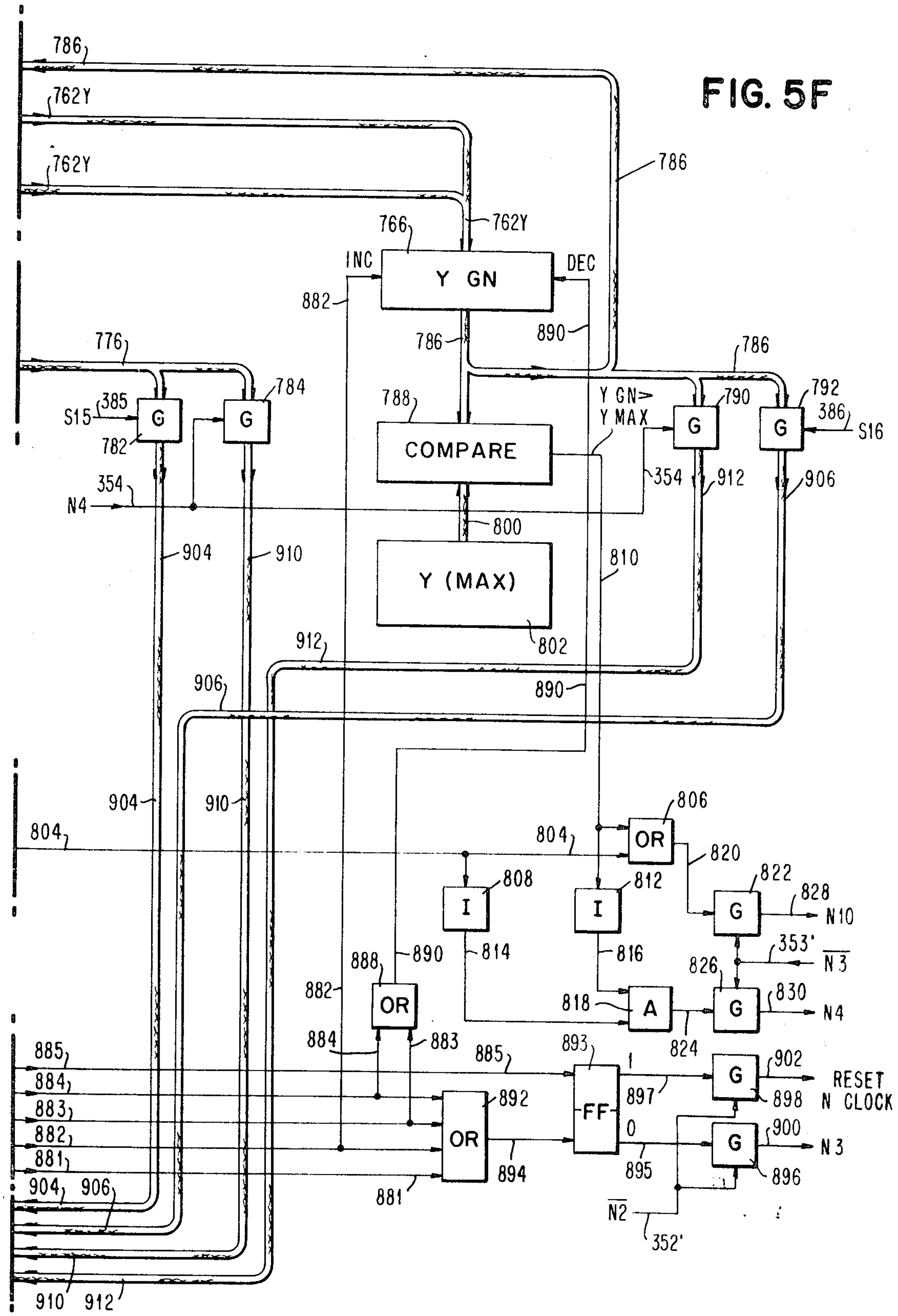
Figure 5G:
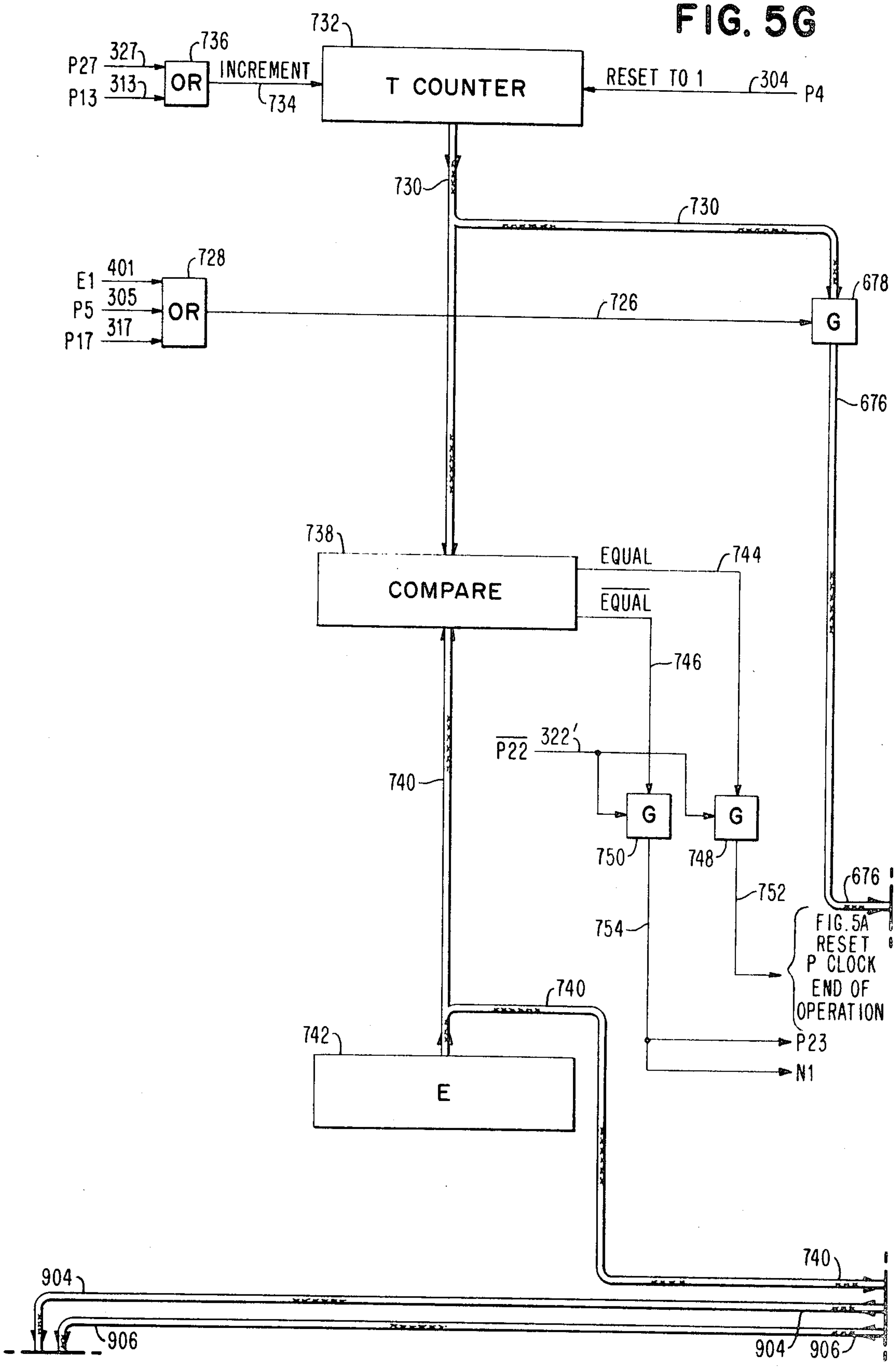
Figure 5H:
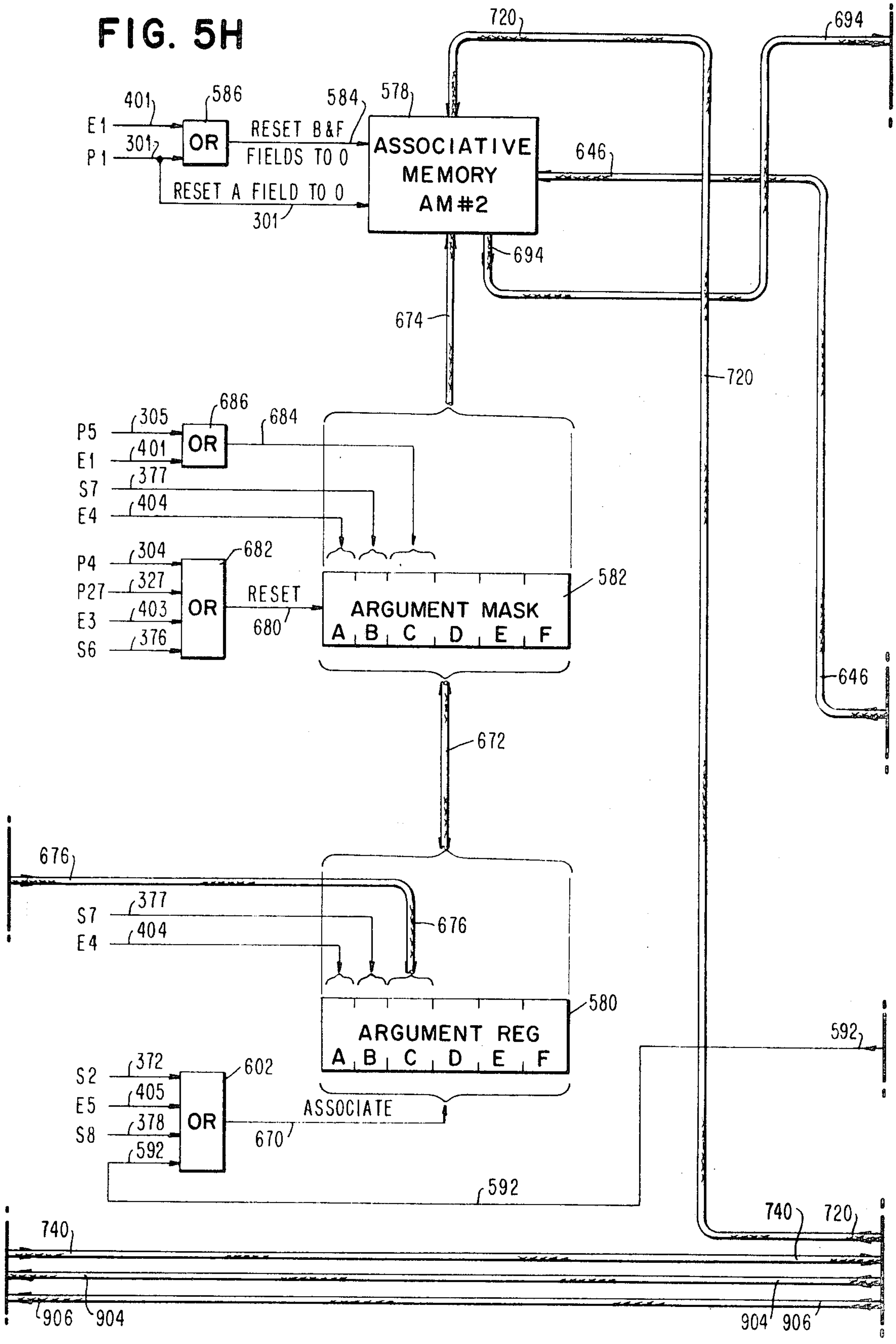
Figure 5I:
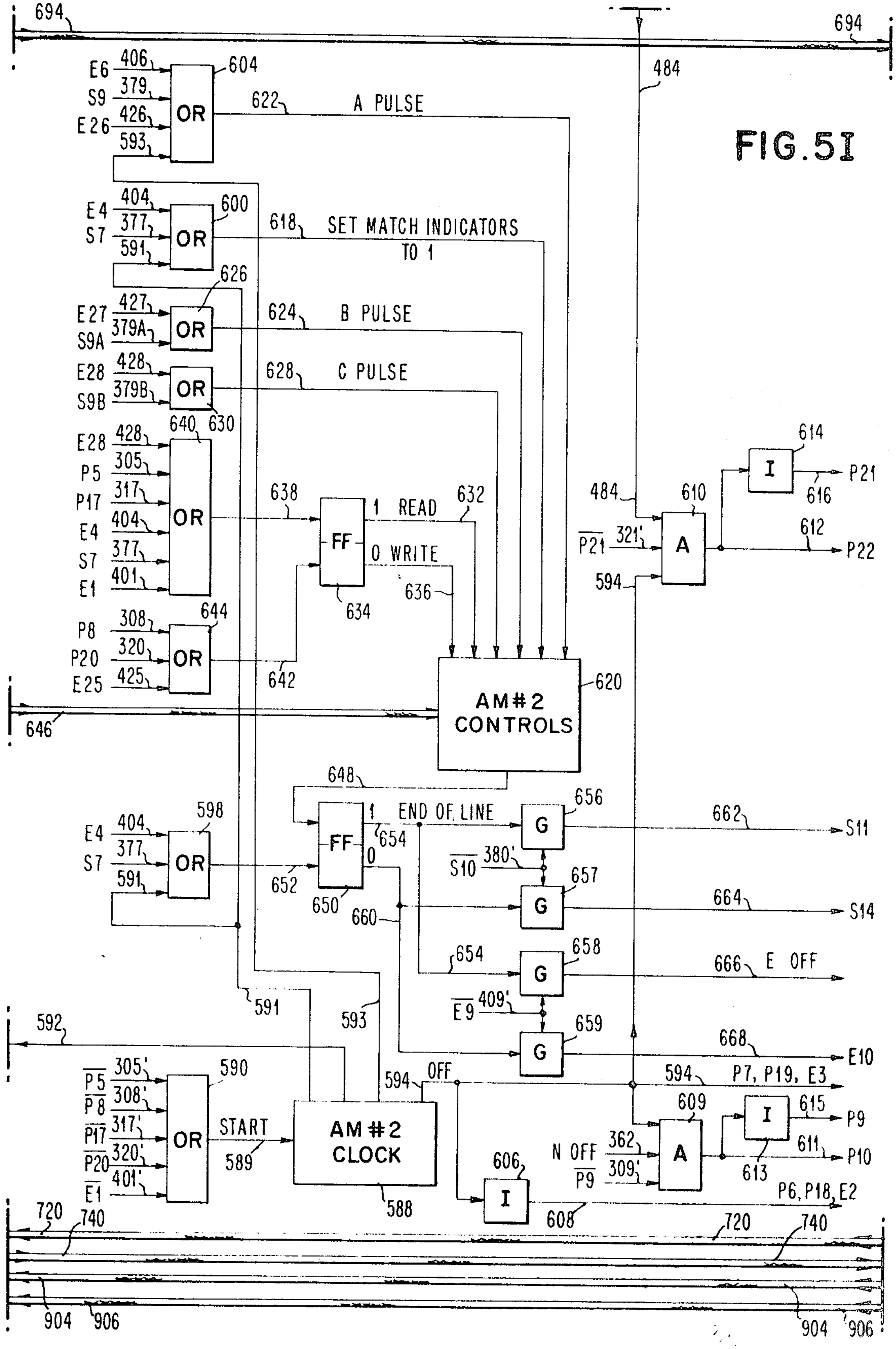
Figure 5J:
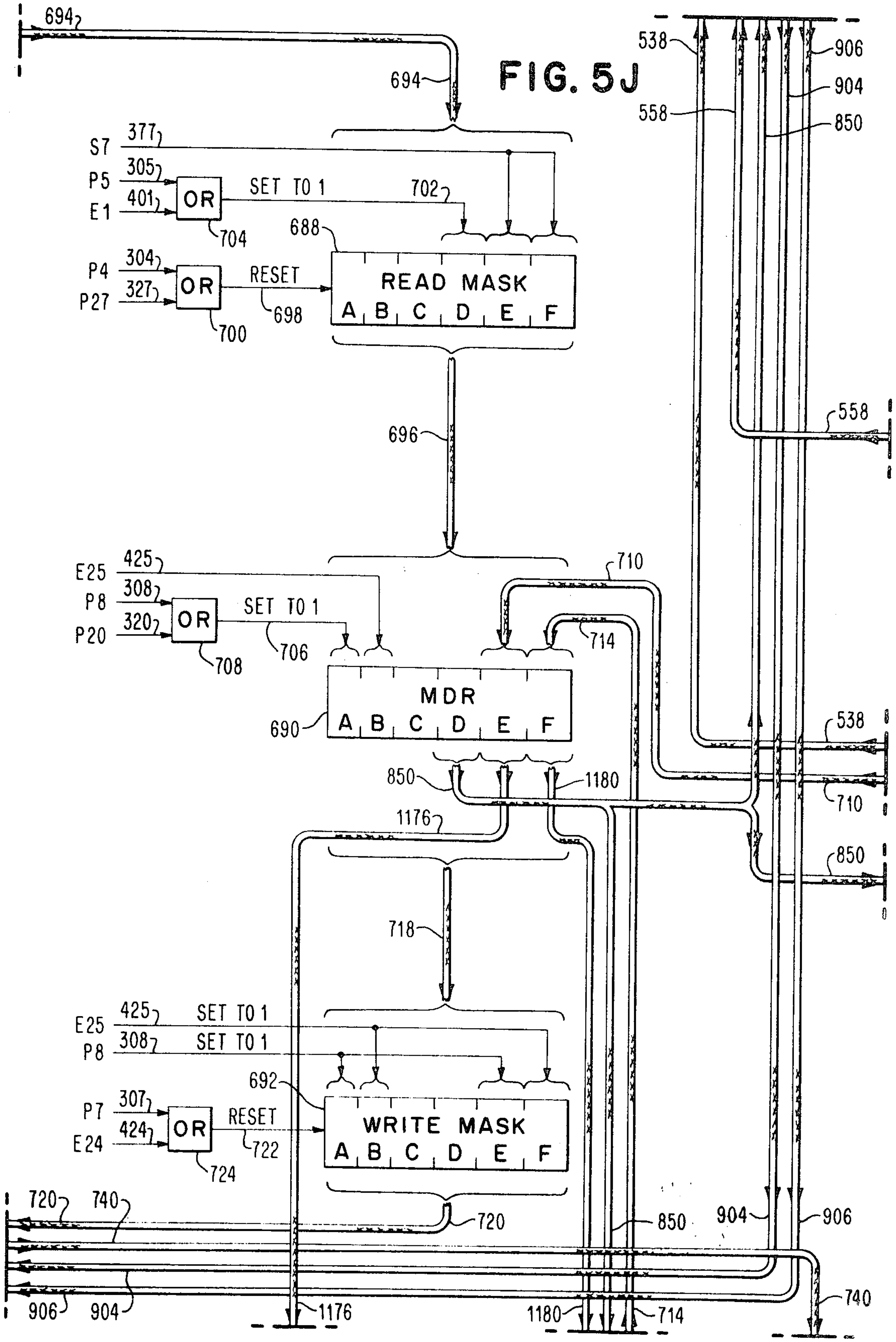
Figure 5K:
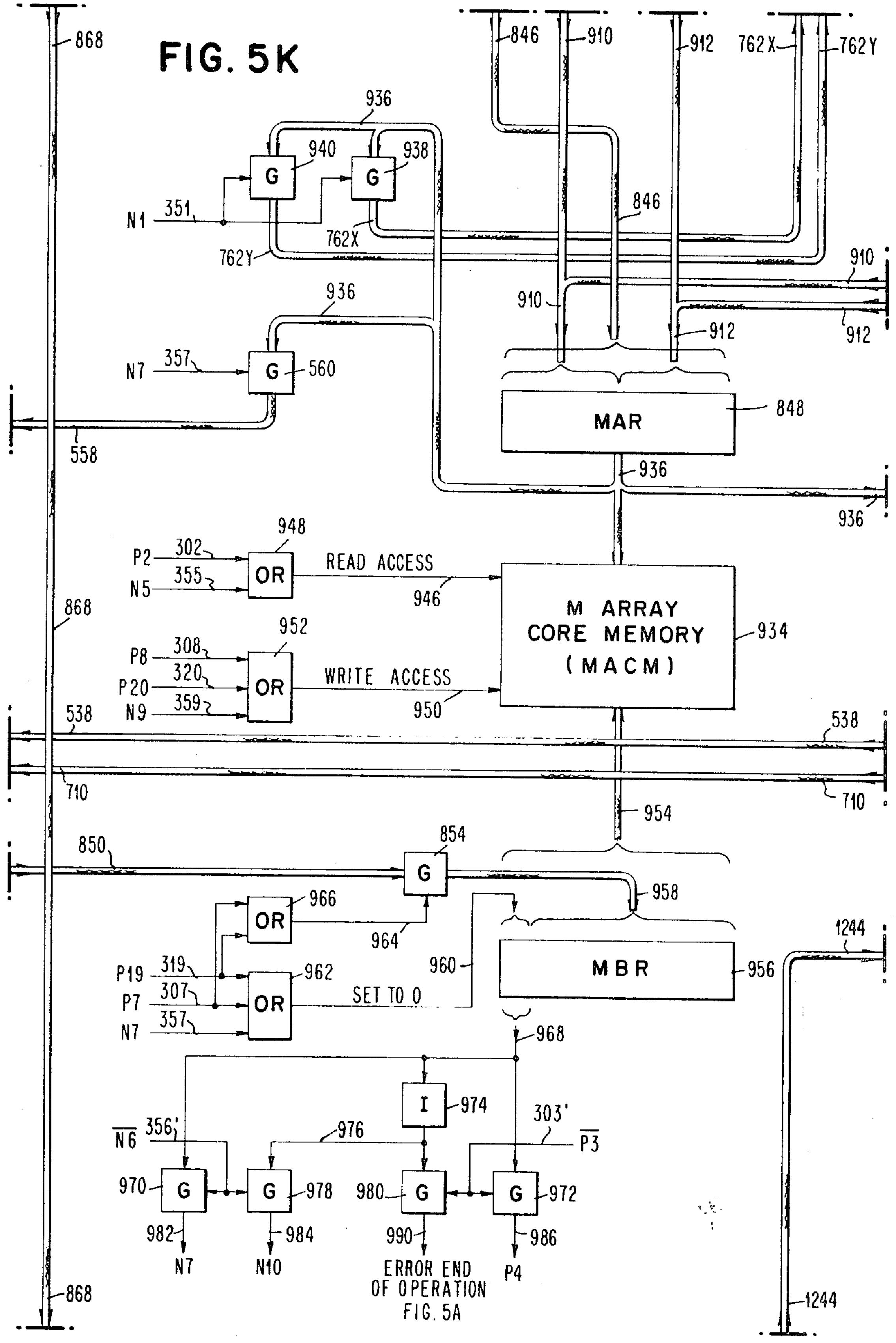
Figure 5L:
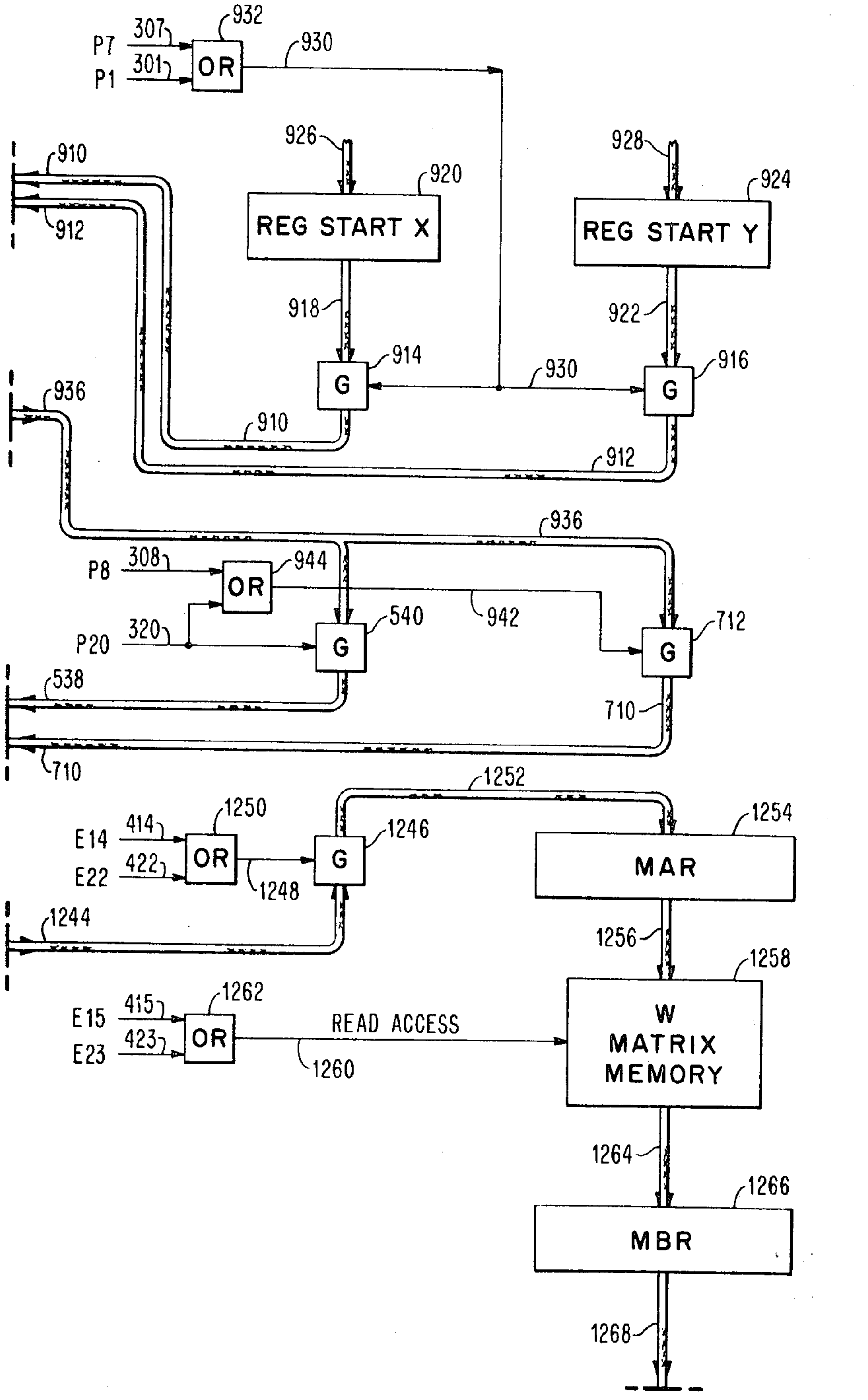
Figure 5M:
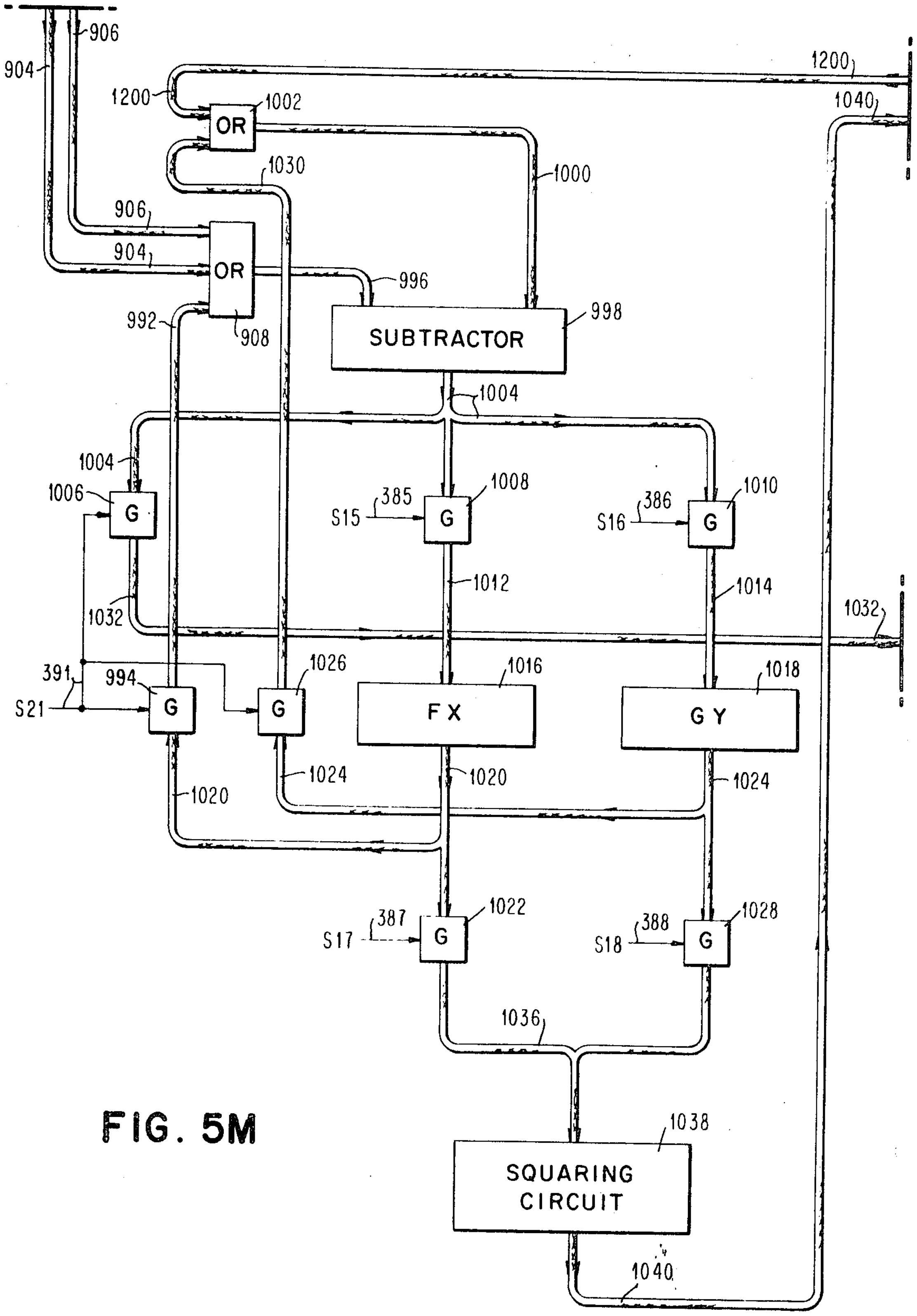
Figure 5N:
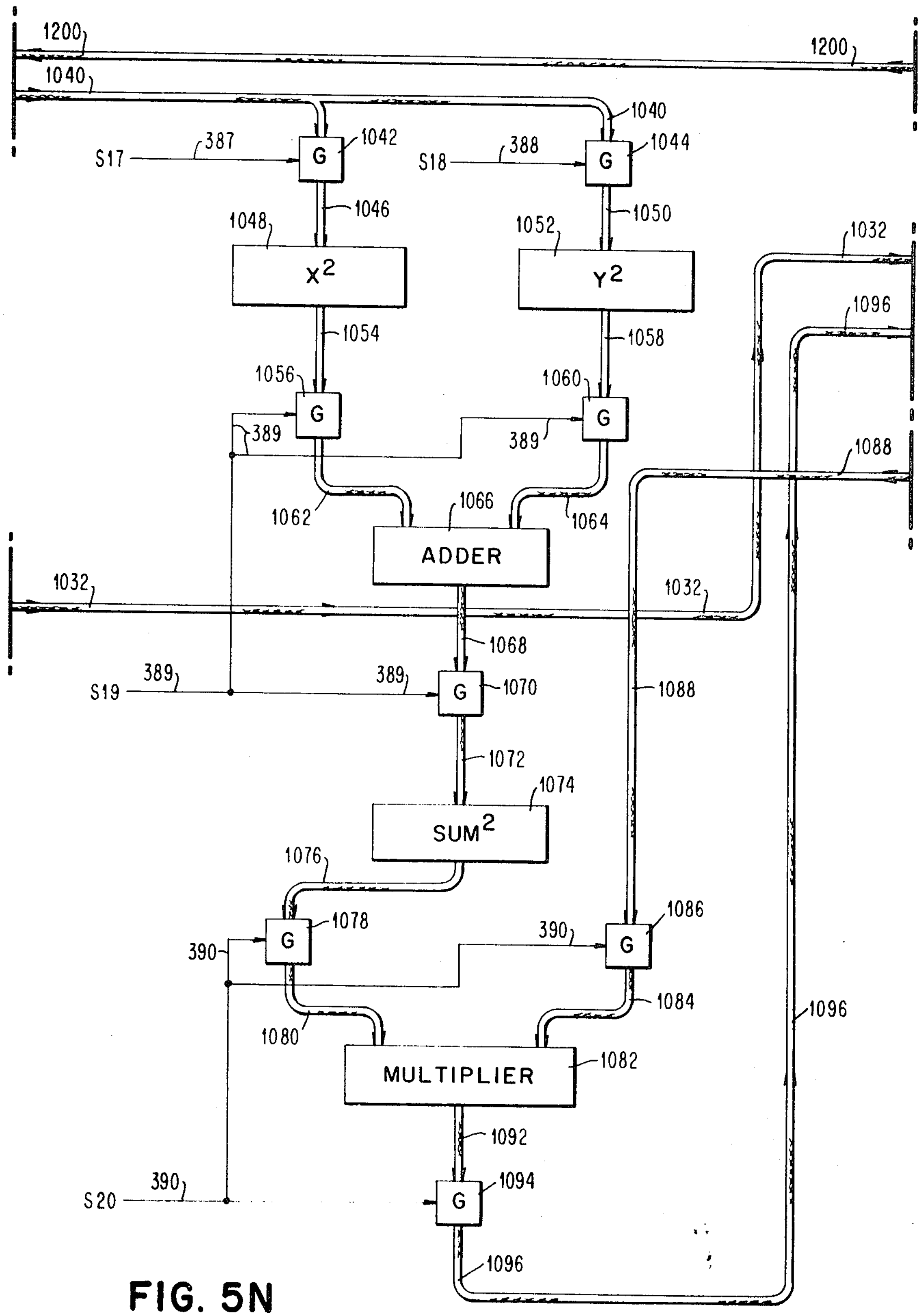
Figure 50:
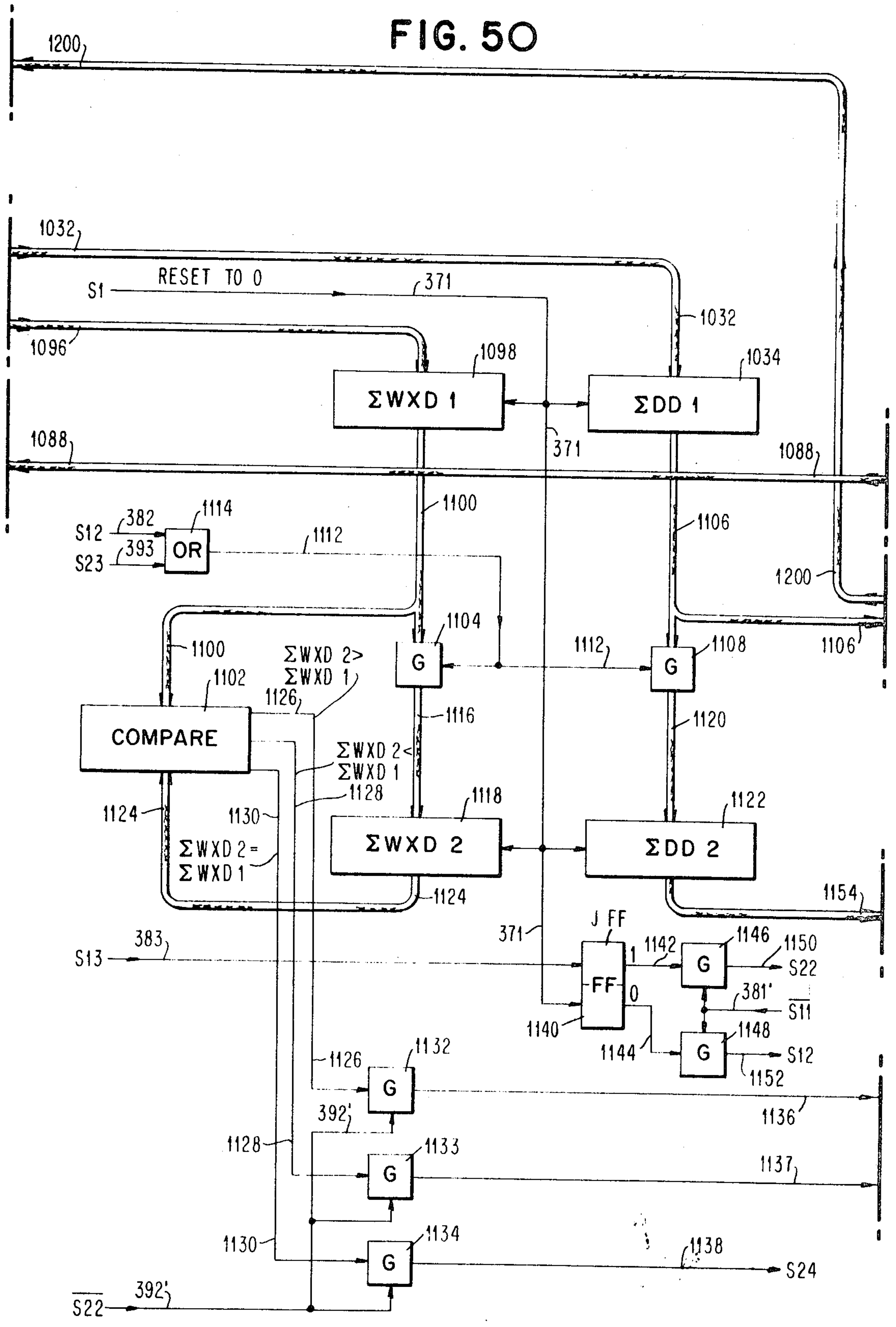
Figure 5P:
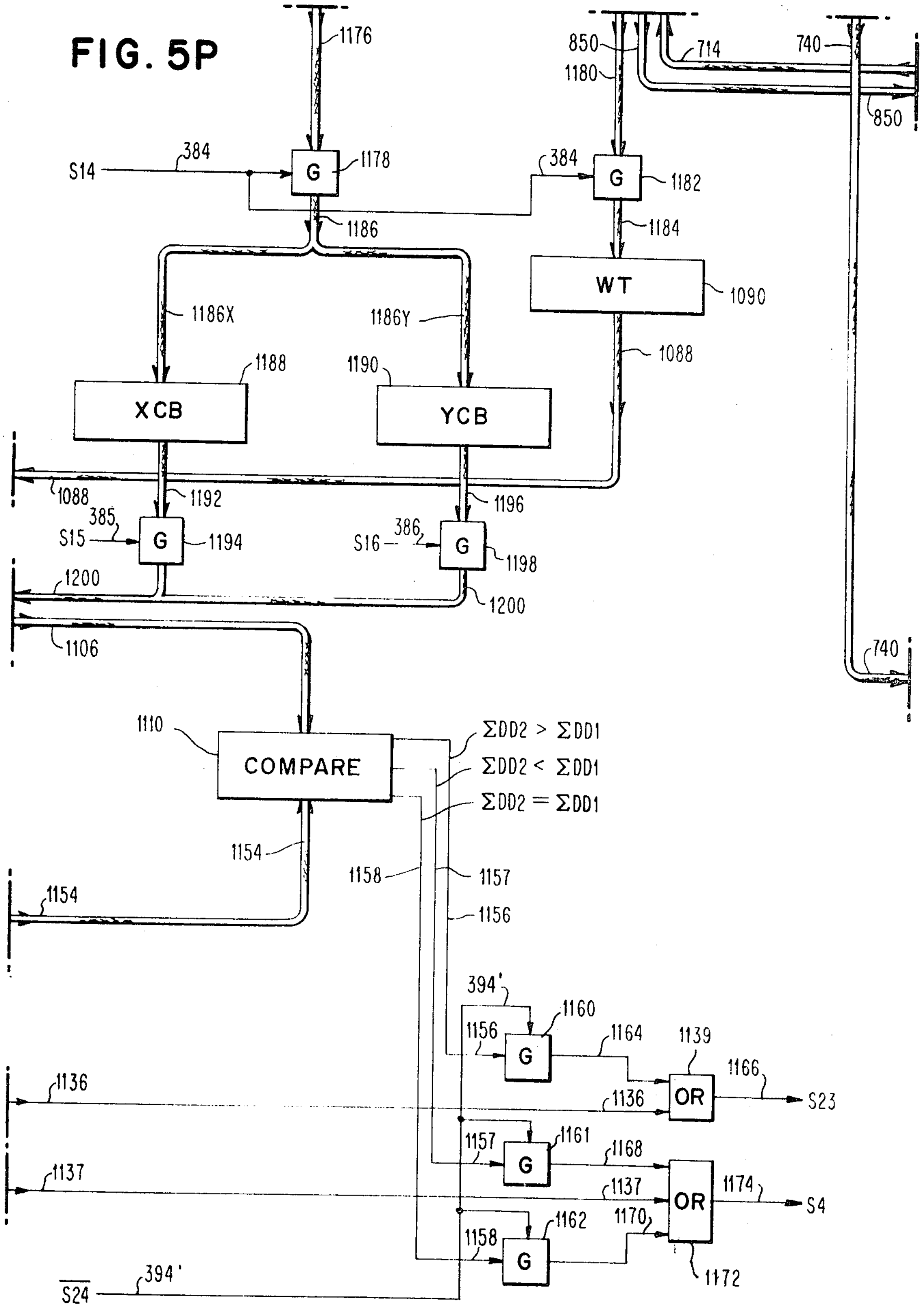
Figure 5Q:
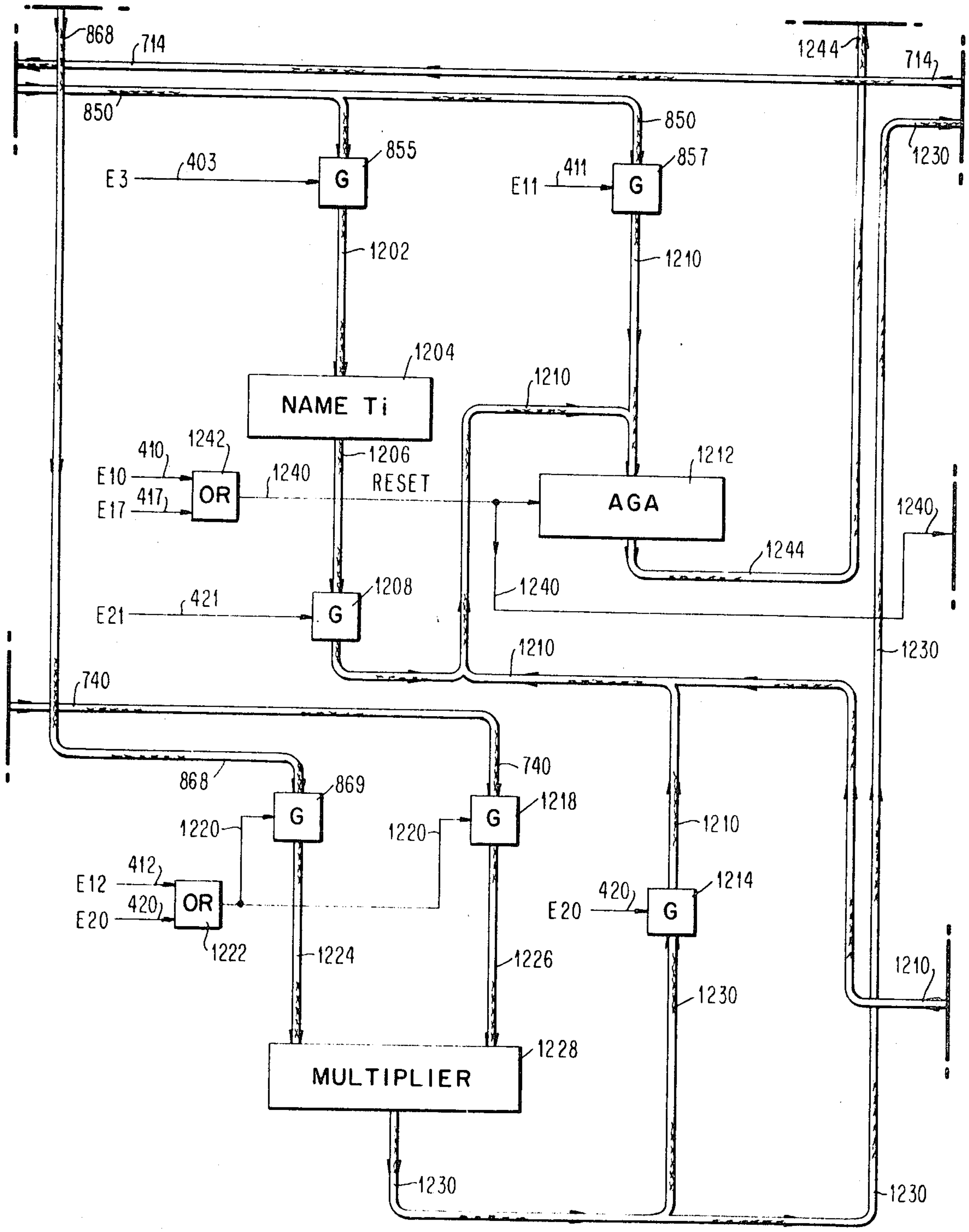
Figure 5R:
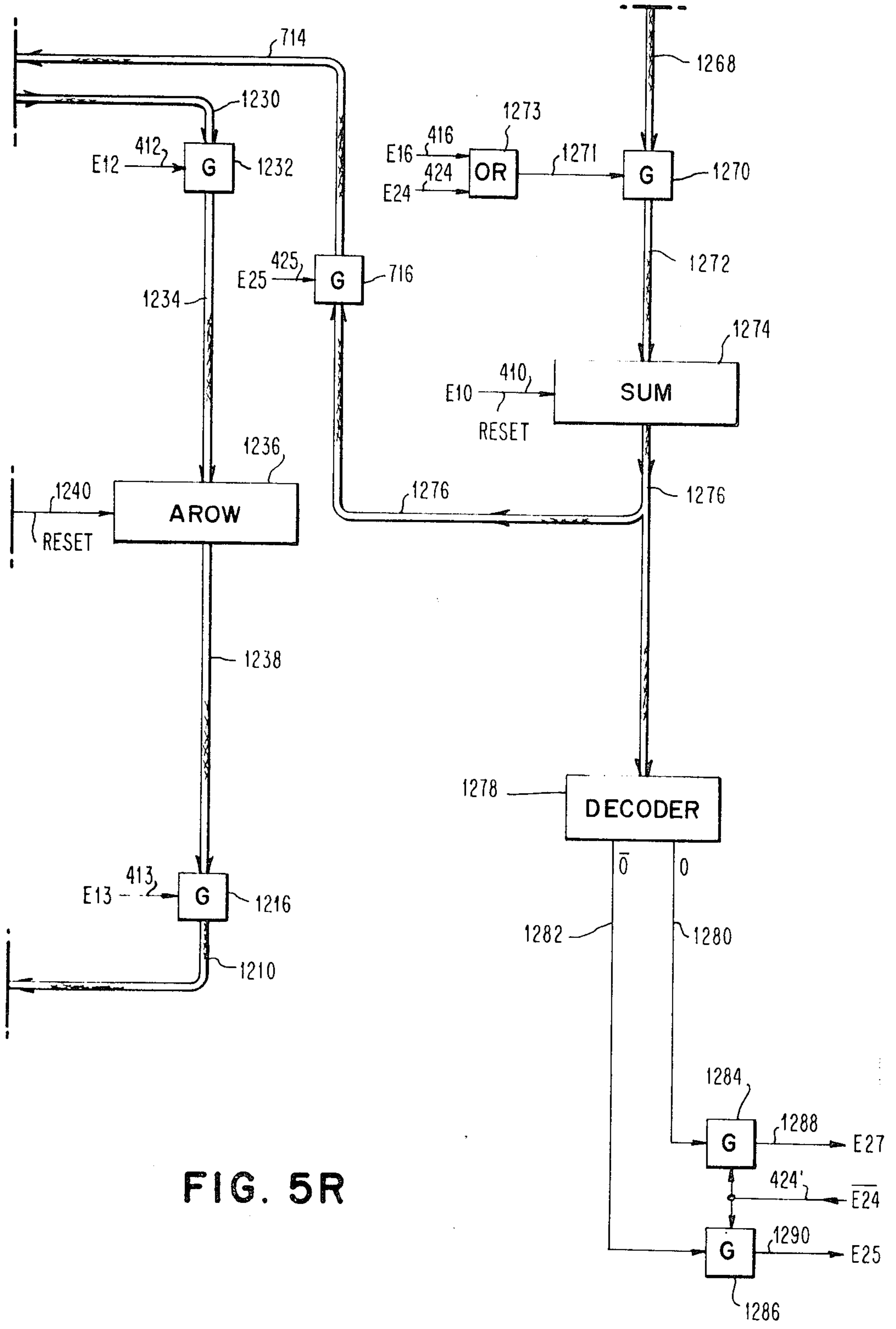

FIGS. 5A–5R when combined form a schematic diagram of a special purpose computer embodiment of the assignment portion of the system shown in FIG. 1.

FIGS. 6A–6D are diagrams illustrating the contents of the various fields for some of the registers and memories shown in FIG. 5A-5R.

In addition to the drawings, Appendices I-IV are provided at the end of the specification to assist in understanding the operation of the various clocks shown in FIG. 5A.

GENERAL SYSTEM DESCRIPTION

FIG. 1 shows the major elements of a system for creating integrated circuits from monolithic circuit wafers having a plurality of individual circuit elements formed thereon. It is assumed that the element yield on a given wafer is generally less than one hundred percent. The first major portion of the system is placement system 10. Placement system 10 is divided into two portions which are individually designated ordering system 12 and assignment system 14. Information as to the circuit which it is desired to form on the wafer is applied to placement system 10 through lines 16 from source 18. Source 18 may, for example, be magnetic tape, punched cards, or any other suitable source of input to a computer system. Similiarly, information as to the relative weight to be assigned interconnections between various elements is applied to placement system 10 through lines 20 from source 22. Source 22 may likewise be magnetic tape, punch cards, or any other suitable source of input to a computer system. Information as to the size and shape of the monolithic wafer and as to the elements on this wafer which are good and bad is applied to placement system 10 through lines 24 from wafer tester 26. The nature of wafer tester 26 would depend entirely on the nature of the elements being tested, and on the criteria established for accepting or rejecting an element. While, in FIG. 1, information has been shown as being applied directly by tester 26 to placement system 10, it is to be understood that this is merely for purposes of illustration and that the output from the tester could, for example, be stored on magnetic tapes or punch cards and applied to placement system 10 from this storage media. It is also possible that information as to wafer size and shape could be supplied from a separate source with only information as to the quality of the elements on the wafer being supplied by tester 26.

Ordering system 12 uses the circuit design on lines 16 and the weighting data on lines 20 to determine the order in which the circuit elements are to be assigned to circuit positions on the wafer. This is accomplished by first determining the sum of the weighted inputs and outputs for each element in the circuit, and selecting the element with the highest sum as the first element to be assigned. A determination is then made of the sum of the relationships of each element not already in the ordering list to the elements already in that list, and the element having the highest such sum is selected as the next element in the list. Where the last-mentioned determination yields two or more elements having the same maximum relationship to elements already placed in the ordering list, the one of those elements having the greatest relationship to all elements in the circuit is selected as the next element to be placed in the list.

When all elements have been placed in the assignment list by ordering system 12, assignment system 14 of placement system 10 is ready to begin operation. The assignment system assigns the first element in the list generated by ordering system 12 to a centrally located position on the wafer. This may be a position at the center of the wafer or may be a position manually selected which is itself a usable element, is near the center of the wafer, and is also in the center of an area of usable elements. System 14 then assigns the next element in the assignment list to a position adjacent to that to which the first element was assigned. Possible operations which may be performed when there are no good positions adjacent to the position to which the first element was assigned will be described later. For each subsequent element in the assignment list, a determination is made as to the sum of the weighted distances of each unused good position on the wafer which is, for example, adjacent to a position already having an element assigned to it from the positions having elements assigned to them which are connected to the next element in the assignment list. The position for which this sum is the smallest is a position to which the next element in the list is assigned. Where two or more positions have the same low sum, the one of these positions which is nearest the center of the wafer may, for example, be the one selected.

The operations of the ordering system may be performed either manually on special purpose computer, or as a program on a general purpose computer. A method of performing the ordering system will be described in a subsequent section. Subsequent sections will also provide a description of a method of performing the operations of the assignment system and a special purpose computer embodiment for implementing this method.

When all elements have been assigned to positions on the wafer by the assignment system, this information is applied through lines 28 to wiring pattern determining system 30. The other inputs to system 30 are lines 16 from circuit design source 18 and lines 20 from weighting data source 22. System 30 determines the paths for the wires interconnecting the circuit elements placed by placement system 10. System 30 may be implemented as a special purpose computer or a programmed general purpose computer. A path determining algorithm which has been programmed on a general purpose computer is taught in an article entitled "An Algorithm For Path Connections and Its Applications" by C. Y. Lee in the Sept. 1961 issue of the IRE Transactions On Electronic Computers.

The wiring paths determined by system 30 are applied through lines 32 as inputs to wiring device 34. Wiring device 34 performs the function of actually interconnecting the selected circuit elements to form the desired electrical circuit. Where pins are provided for each element, the wiring may be accomplished by wire wrapping devices such as those shown in U.S. Pat. No. 2,862,670 issued to R.F. Mallina on Dec. 2, 1958, entitled "Automatic Wiring Apparatus;" in U.S. Pat. 2,862,671 issued to T. L. Diamond on Dec. 2, 1958, entitled "Automatic Wiring System & Apparatus;" or in patent 2,905,400 issued to R.F. Mallina on Sept. 22, 1959, and entitled "Wire Connecting Machine," all three of which patents are assigned to Bell Telephone Laboratories. If pins are not provided on the wafer, the actual wiring may be accomplished by positioning the wafer on a movable jig which is itself positioned under a light beam, if photoetching techniques are used, or under a suitable depositing device. The information from wiring pattern determining system 30 is used to move the jig in the proper directions to cause the desired wiring pattern to be formed.

GENERAL PLACEMENT SYSTEM FLOW DIAGRAM

Figure 2:
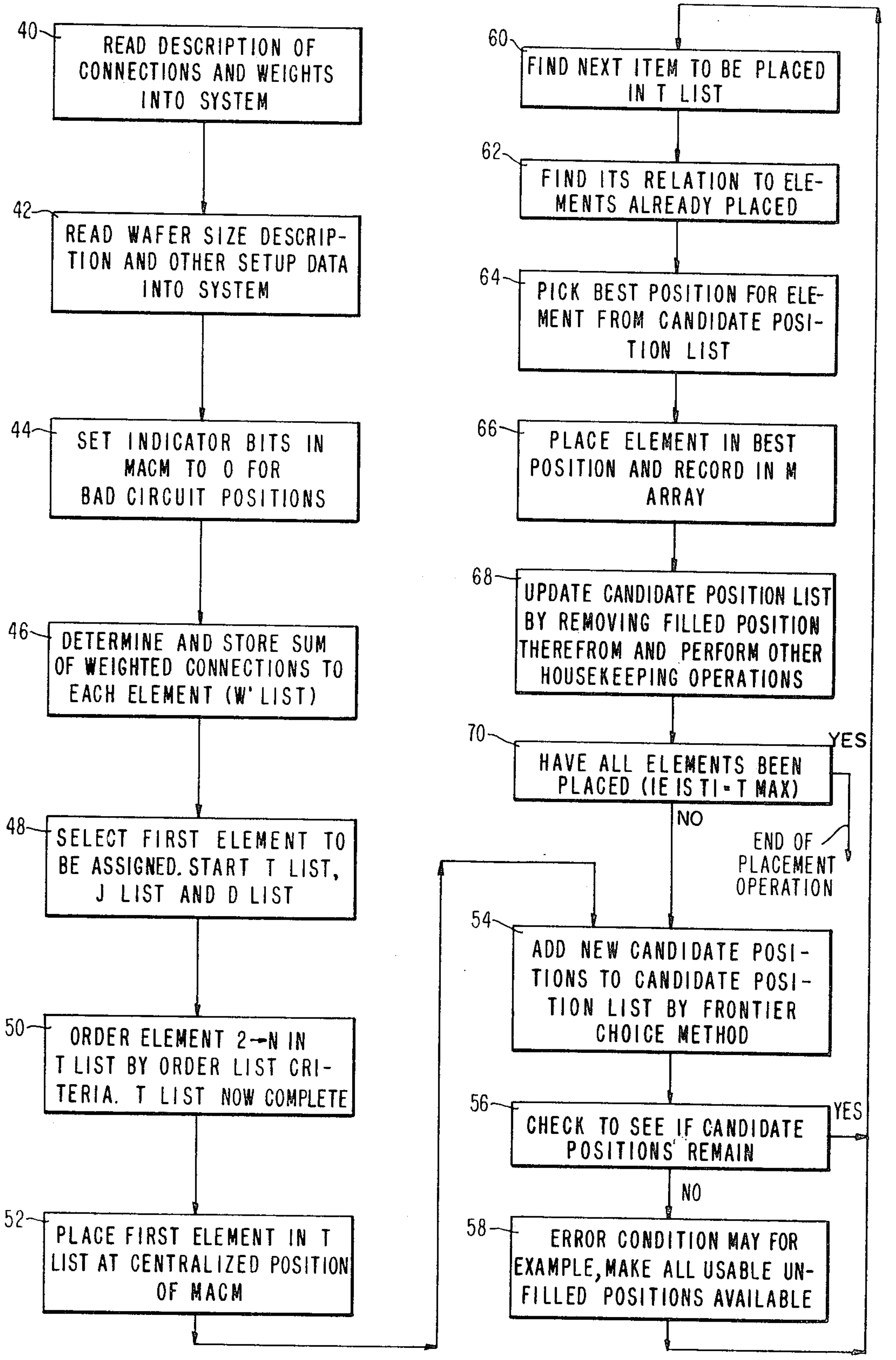
FIG. 2 is a general flow diagram of the operation of the placement portion of the system shown in FIG. 1.

FIG. 2 shows the general flow diagram for the placement system. Referring to this figure, it is seen that the first step in the operation, step 40, is to read a description of the circuit, its connections, and the weight assigned to the connections into the appropriate memory devices of the placement system. As indicated previously, the desired information may initially be stored on magnetic tape, punch cards, or any other standard record media, and is applied to the computer in a standard manner. The second step in the operation, step 42, is to read the wafer size and other set-up data into the system. During this step the maximum X and Y coordinates on the wafer are read into the system. The other set-up data may include assignment criteria, where a fixed criteria is not employed, and information as to the centralized position on the wafer to which the first element is to be assigned. During step 44, the next step in the operation, an indication of the bad circuit positions on the wafer is stored in the system. This is accomplished by reading in the coordinates of bad circuit positions and resetting an indicator bit to zero in the array core memory (MACM) at each position in MACM corresponding to a bad circuit position on the wafer. A more detailed description of MACM will follow later.

Steps 40–44 are preliminary operations which the placement system must perform in order to accumulate all the data which it requires and to place the data in a form such that it may be utilized by ordering and assignment systems. Once these preliminary operations have been completed, the system is ready to begin the operations of the ordering system. Step 46 is a first step of the ordering system. During this step the sum of the weighted connections to each element are computed and these sums stored. The table in which this is stored is called the W' list. The next step in the ordering system is step 48. During this step three lists, the T list, the J list and the D list are started. The W' list is looked at and the element in it which has the highest weighted sum is selected as the first element in the T list. The T list will ultimately contain all the elements of the circuit in the order in which they are to be assigned. All elements which are connected to elements in the T list are listed in the J list, and the weighted connections of the elements in the J list to the elements in the T list are stored in the D list. The third and final step in the ordering system is step 50. During this step the T list is completed. This is accomplished by looking at the D list and selecting the element in it for which the sum of the weighted connections to the elements already in the T list is greatest and placing this element as the next element in the T list. Each time this is done the element assigned is removed from the J and D lists and all elements, not already in the J list, which are connected to the element assigned, are added to this list. The weights stored in the D list are then adjusted to reflect the addition of the new element in the T list. Where the sum of the weighted connections in the D list is the same for two or more elements, the W' list is then looked at for these elements and the element having the highest weighted sum in the W' list is selected as the next element to be placed in the T list.

When all elements have been stored in the T list, the assignment system may then begin operation. The first step in the assignment system is step 52. During this step the first element in the T list is assigned to a centerized position of MACM. As indicated previously MACM contains a position for each position of the wafer. In practice, the position to which the first element in the T list is assigned may be the actual center position of MACM or it may be a position corresponding to a position on the wafer which has been manually determined to be a good position near the center of the wafer and in the center of an area of good positions.

When the first element in the T list has been assigned, the assignment system branches to step 54. During step 54, the system looks at all positions which are adjacent (i.e., above, below, to the right or to the left) to the position which has just had an element assigned to it and such of these positions as are not already contained in the candidate position list, do not have an element assigned to them, and have been determined to be useable positions are added to the candidate position list. The manner in which the candidate position list is used will be described shortly. From step 54, the assignment system proceeds to step 56 during which a determination is made as to whether there are any candidate positions in the candidate position list. If no positions are found in the candidate position list during step 56, the system proceeds to step 58 during which an error indication is generated. When an error indication is generated the wafer is either discarded or an attempt to perform the assignment operation started at a new candidate position (i.e., step 52) is attempted, with the first element in the T list being placed at a different position. In the alternative, one of a variety of alternate steps may be performed where an error indication is received in order to permit the assignment system to complete its operation when the preferred mode of operation is no longer possible. One of these alternate modes of operation, as indicated under step 58 of FIG. 2, is to eliminate the criteria that a new position added to the candidate position list must be adjacent to a position which has an element assigned to it, and to add all positions in MACM which satisfy the other two criteria stated in step 54 to the candidate position list. Other possible alternative steps which may be performed during step 58 will be mentioned later.

If a YES output is obtained from step 56, or after an alternative step 62 has been successfully performed, the next step in the operation is step 60. During this step the next item in the T list is located. From step 60 the system proceeds to step 62 during which all elements which have been assigned to positions on the wafer are looked at and a determination made as to which of these elements are connected to the next element in the T list to be assigned. The weights of these connections are also determined during this step of the operation. From step 62 the system proceeds to step 64. During step 64, every candidate position in the candidate position list is looked at and a determination is made as to the cost of using this position relative to the cost of using the other positions. The cost is the sum of the square of the distance of this position from the position to which each of the elements determined during step 62 is assigned times the weight assigned to that connection. The position with the lowest cost as determined above is the position which is selected as the best position. From step 64, the system proceeds to step 66 during which the element is actually assigned to the best position determined during step 64. This is accomplished by recording the element designation in the appropriate position in MACM. From step 66 the system proceeds to step 68 during which the candidate position list is updated by effectively eliminating from it the position just used and various other housekeeping operations to be described later are performed.

From step 68 the system proceeds to step 70 during which a determination is made as to whether all elements have been placed. This is accomplished by comparing the T number of the element just placed with the maximum T number. If all elements have been placed the system generates an output signal indicating that the placement phase of the operation has been completed. This signal may cause a printout of the contents of MACM or may cause the information in MACM to be applied to wiring pattern determining system 30 (FIG. 1). If, during step 70, it is determined that there are still elements to be assigned, the system returns to step 54 to add new candidate positions to the candidate position list. The system then proceeds through steps 56–70 for each element to be assigned until, during step 70, a determination is made that all elements have been assigned.

DETAILED DESCRIPTION OF FLOW DIAGRAMS FOR PRELIMINARY STEPS AND ORDERING SYSTEM

Referring again to FIG. 2 it is seen that the first step in the operation is to load a description of the system connections and weights into the W matrix memory shown in FIG. 6D. This is a 3–D memory with the weight of the connections between the elements represented by a given row and the element represented by a given column being stored in the third dimension. The weight stored at a given location is that of lines which carry signals from the element represented by the row to the element represented by the column. If the element represented by the column applies signals to the element represented by the row, this fact is represented at the other point where these two elements intersect. A zero is stored at each intersection of elements which are not connected to each other. The actual reading of information from cards or tape into the W matrix core memory may be accomplished in any standard fashion.

Figure 3A:
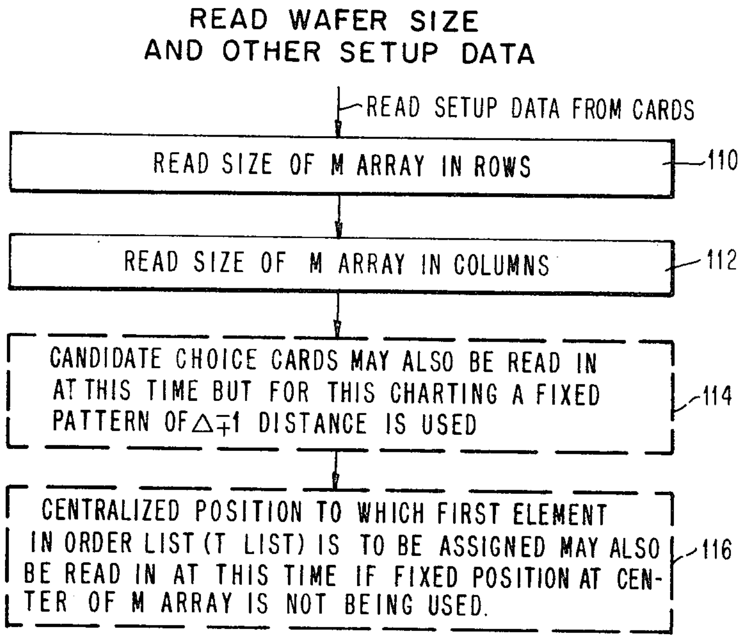
FIGS. 3A–3D are detailed flow diagrams for some of the individual steps of FIG. 2 for the ordering system.

The individual substeps of step 42 of the operation are represented in FIG. 3A. Referring now to FIG. 3A it is seen that during the first of these substeps, step 110, the size of MACM (M array) in rows is read into the system and stored in an appropriate register and, during step 112 of the operation of the size of MACM in columns is read into the system and stored in an appropriate register. If a fixed centralized position is used and if the fixed assignment algorithm previously described, where only adjacent elements are looked at when candidate positions are selected, is employed, and this is all that need be done during step 42. However, if a fixed algorithm is not being employed, a different candidate selection criteria may be read into the system during step 114 (FIG. 3A). This criteria may, for example, be two positions in each direction or may include the diagonal positions as well as those above, below, to the right and to the left of a used position. Likewise, if a fixed centralized position is not used as the position for the first element in the T list, the centralized position to be used for the particular wafer may be read into the system during step 116.

From step 42 the system proceeds to step 44 of the operation. During step 44 of the operation, the coordinates of the unuseable circuit positions on the wafer are read into the system and the left hand indicator bit (FIG. 6C) for each corresponding position in MACM is reset to zero. As will be seen later, the resetting of this bit to zero prevents it from being selected as a candidate position.

Figure 3C:
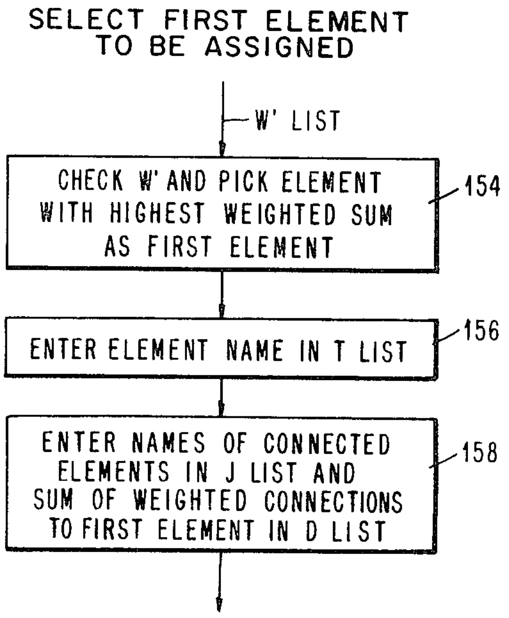
Figure 3B:
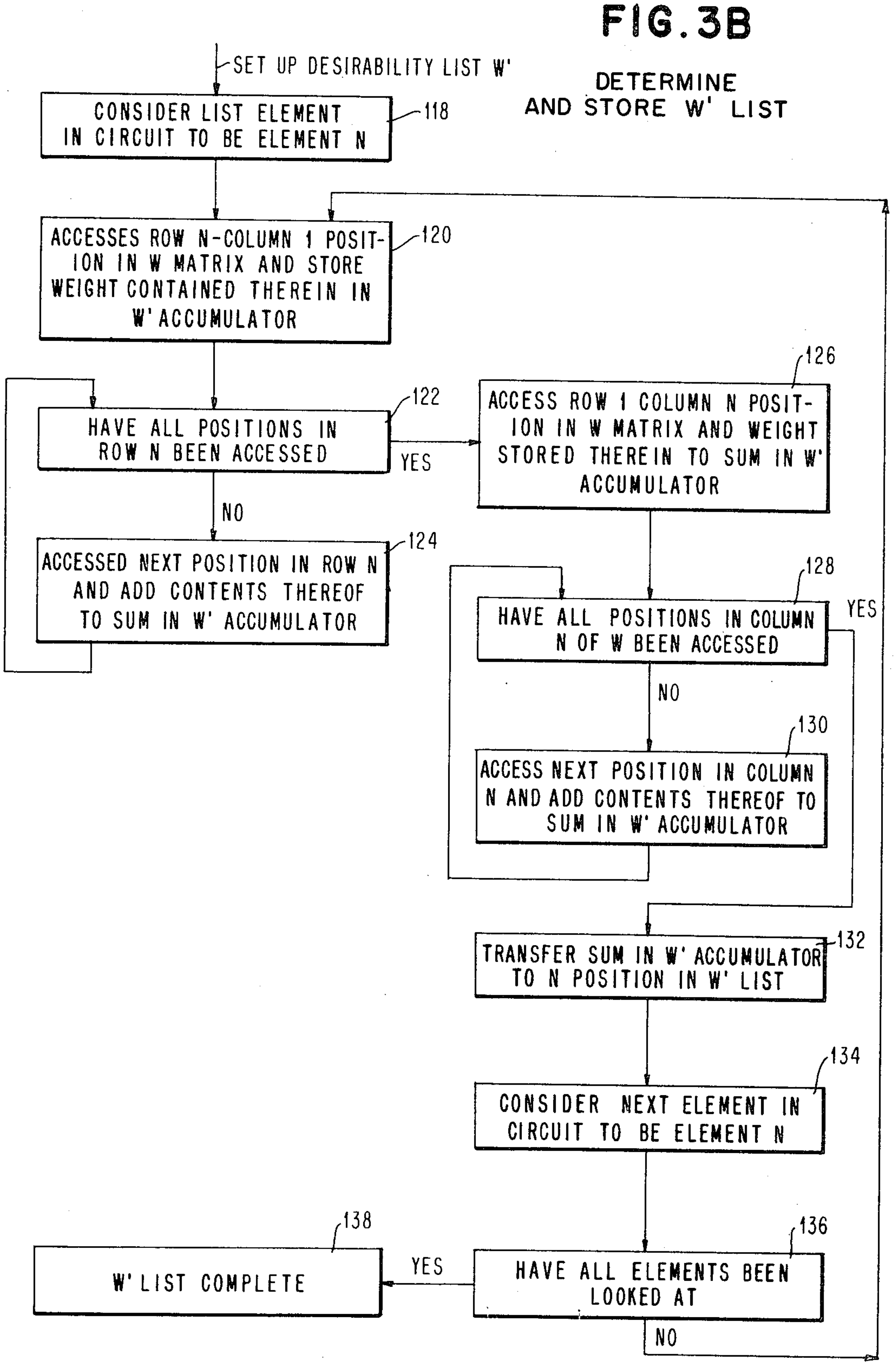

The system has now completed the preliminary loading steps and is ready to begin the first step, step 46, of the ordering system. FIG. 3B is a detailed flow chart of the substeps required in performing step 46 of the operation. Referring to FIG. 3B it is seen that during step 118, the first step of this operation, the first element in the circuit (element C1 in FIG. 6D) is considered as the element N. From step 118 the system proceeds to step 120. During step 120 the row N-column 1 position in the W matrix (FIG. 6D) is accessed and the weight stored therein is applied to a W'. accumulator. The weight stored at address 1 in the W matrix is in this manner retrieved and applied to the W' accumulator. From step 120, the system proceeds to step 122 during which a determination is made as to whether all elements in Row N of the W matrix have been accessed. If all positions in row N have not been accessed, the system proceeds to step 124 during which the next position in row N is accessed and the contents thereof added into the sum stored in the W' accumulator. For example, following the accessing of position 1 in the W matrix, position 2 would be accessed. From step 124 the system returns to step 122 to determine if all positions in row N have been accessed. Steps 122 and 124 are repeated until, during step 122, a determination is made that all positions in row N have been accessed. When this occurs, the system branches to step 126.

During step 126 the row 1 -column N position in the W matrix is accessed and the weight stored therein is added to the sum already stored in the W' accumulator. Assuming that N is still 1, this would mean that position 1 would again be accessed. From step 126 the system proceeds to step 128. During step 128 a determination is made as to whether all positions in column N of the W matrix have been accessed and, if all positions have not been accessed, the system branches to step 130. During step 130 the next position in Column N of the W matrix is accessed and the weight contained therein is added to the sum stored in the W' accumulator. For example, assuming that position 1 which had previously been accessed, position 15 would be the one that would now be accessed. From step 130 the system proceeds back to step 128 to determine if all positions in Column N of the W matrix have been accessed. Step 128 and step 130 are repeated until, during step 128, a determination is made that all of the positions in column N of the W matrix have been accessed. When this occurs the system branches to step 132.

During step 132 the sum accumulated in the W' accumulator is transferred to a position in a W' list which corresponds to the element N. From step 132 the system proceeds to step 134 during which the N number is incremented. For example, assume C1 was the initial element to be considered as element N, C2 would now be the element considered as element N. From step 134 the system proceeds to step 136 during which a determination is made as to whether all elements have been looked at. If all elements have not been looked at the system returns to step 120 to determine the sum of the weighted connections to the new element N. When, during step 136, a determination is made that all elements have been looked at, the system branches to step 138 during which an indication is generated that the W' list is complete.

When step 46 of the operation has been completed, the system is ready to perform step 48. FIG. 3C is a detailed flow diagram of step 48 of the operation. Referring to FIG. 3C it is seen that during step 154, the first step in this operation, the W' list is checked to find the element contained therein which has the highest weighted sum. This element is selected as the first element in the T list. From step 154 the system proceeds to step 156 during which the element selected during step 154 is entered as the first element in the T list. From step 156 the system proceeds to step 158. During step 158, the names of the elements connected to the element just placed in the T list are entered in the J list and the weighted connections of each of the elements in the J list to the element in the T list are entered in the D list. When step 158 has been completed, step 48 of the operation is complete and the system is ready to begin step 50.

Figure 3D:
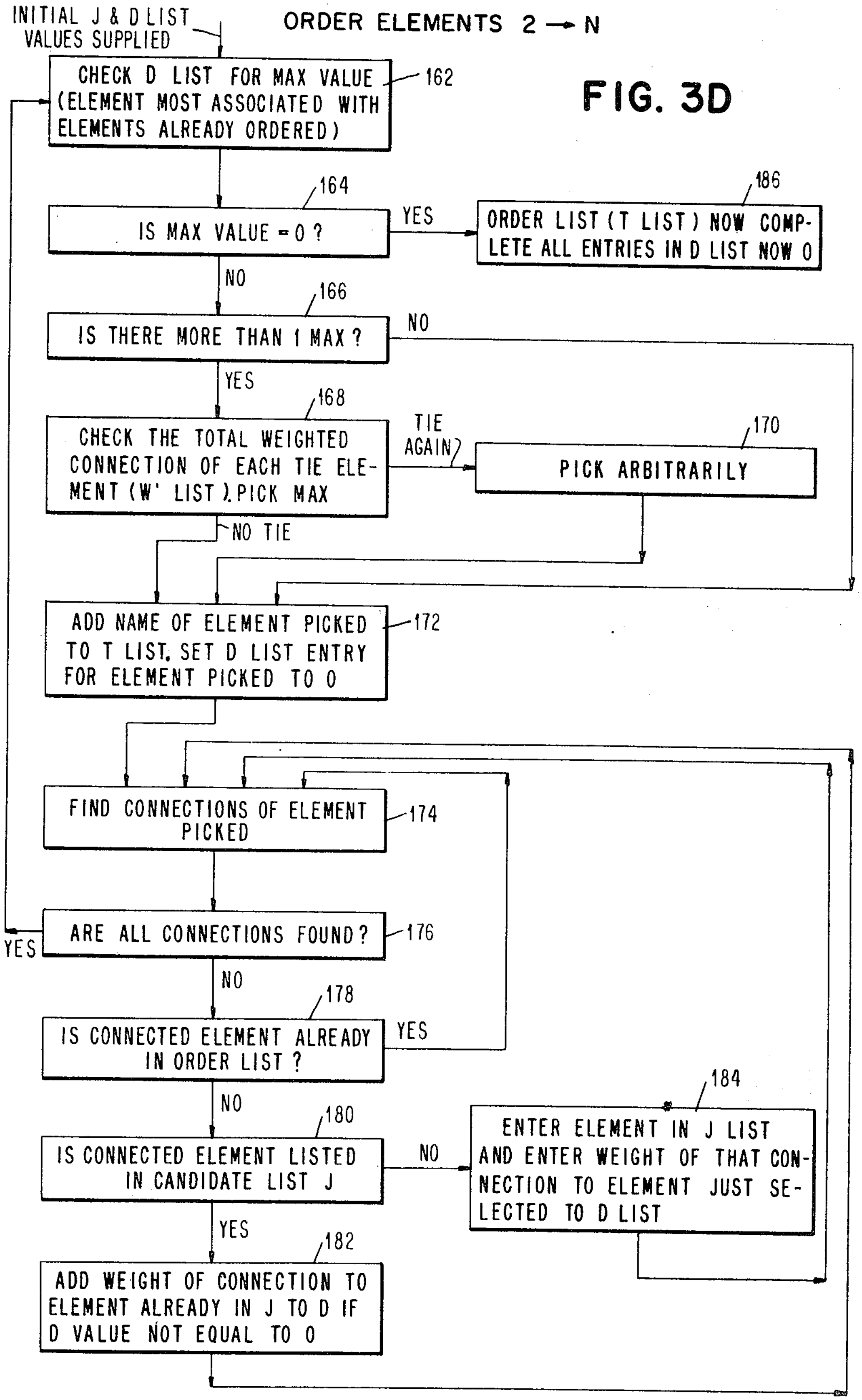

During step 50 the remaining elements are placed in the T list. FIG. 3D is a detailed flow diagram of this step in the operation. Referring to FIG. 3D, it is seen that the first step, step 162, is to check the D list for maximum value. The element having this maximum value is the one which is most associated with the elements already in the T list. From step 162 the system proceeds to step 164 during which a determination is made as to whether this maximum value is zero. The significance of a maximum value of zero will be described later. If the maximum value is not zero, the system proceeds to step 166 during which a determination is made as to whether there is more than one entry in the D list having the same maximum value. If there is more than one entry in the D list having the same maximum value, the system proceeds to step 168, during which the W' list is checked to determine which of the elements having the maximum value in the D list have the maximum value in the W' list. If the determination of step 168 again yields a tie, the system proceeds to step 170 during which an arbitrary pick is made of the element to be placed next in the T list. From step 170 the system proceeds to step 172. If, during step 166 or 168, a no-tie output is obtained, the system proceeds directly to step 172. During step 172, the name of the elements selected during step 166, 168 or 170 is added to the T list and the D list entry for the element picked is set to zero. From step 172, the system proceeds to step 174. During step 174, the elements connected to the element just placed in the T list are located. This is accomplished by looking at both the row and the column in the W matrix for the element just placed and noting the elements corresponding to positions having non-zero weights. From step 174 the system proceeds to step 176. During step 176 a determination is made as to whether all connections to the elements just placed in the T list have been found. If all of the connections have not been found, the system proceeds to step 178. During step 178, a determination is made as to whether the element being looked at, which element is connected to the element just placed in the T list is also in the T list. If this element is in the T list, nothing further need be done with it and the system proceeds back to step 174 to find another element connected to that just placed in the T list. If the result of step 178 is an indication that the element being looked at is not already in the T list, the system proceeds to step 180. During step 180 a determination is made as to whether the connected element being looked at is already in the candidate list J. If the element is already in the list J the system proceeds to step 182 during which the weight of the connection between the element being looked at and the element just placed in the T list is added to the value in the D list for the element being looked at. If the D list value for this element is zero, it means that an error has occurred and the add operation described above is not performed. If, during step 180, an indication is received that the candidate element is not already in the J list, the system proceeds to step 184. During this step, the element being looked at is added to the J list and the weight of the connection between the element and the element just placed in the T list is stored in the D list. From step 182 or step 184, the system proceeds back to step 174 to attempt to find more connections to the elements just placed. When, during step 176, an indication is received that all connections have been found, the system proceeds back to step 162. This causes a new attempt to place an element in the P list to be initiated. When, during step 164, an indication is received that all entries in the D list are zero, this means that all elements have been placed in the T list and the ordering portion of the operation is completed. The system therefore proceeds to step 186 during which an appropriate output signal is generated.

DETAILED DESCRIPTION OF FLOW DIAGRAMS FOR ASSIGNMENT SYSTEM

Referring again to FIG. 2, it is seen that from step 50 the system proceeds to step 52. Step 52 is the first step of the assignment system. During step 52, the T list is looked at and the first element in it is assigned to a predetermined centralized position in MACM. This position may be a fixed position at the center of the array, or may be a position which is set into the system, which position is a good position near the center of the array and is in the center of an area of good positions. Since step 52 is a single step operation, a detailed flow chart has not been provided.

Figure 4A:
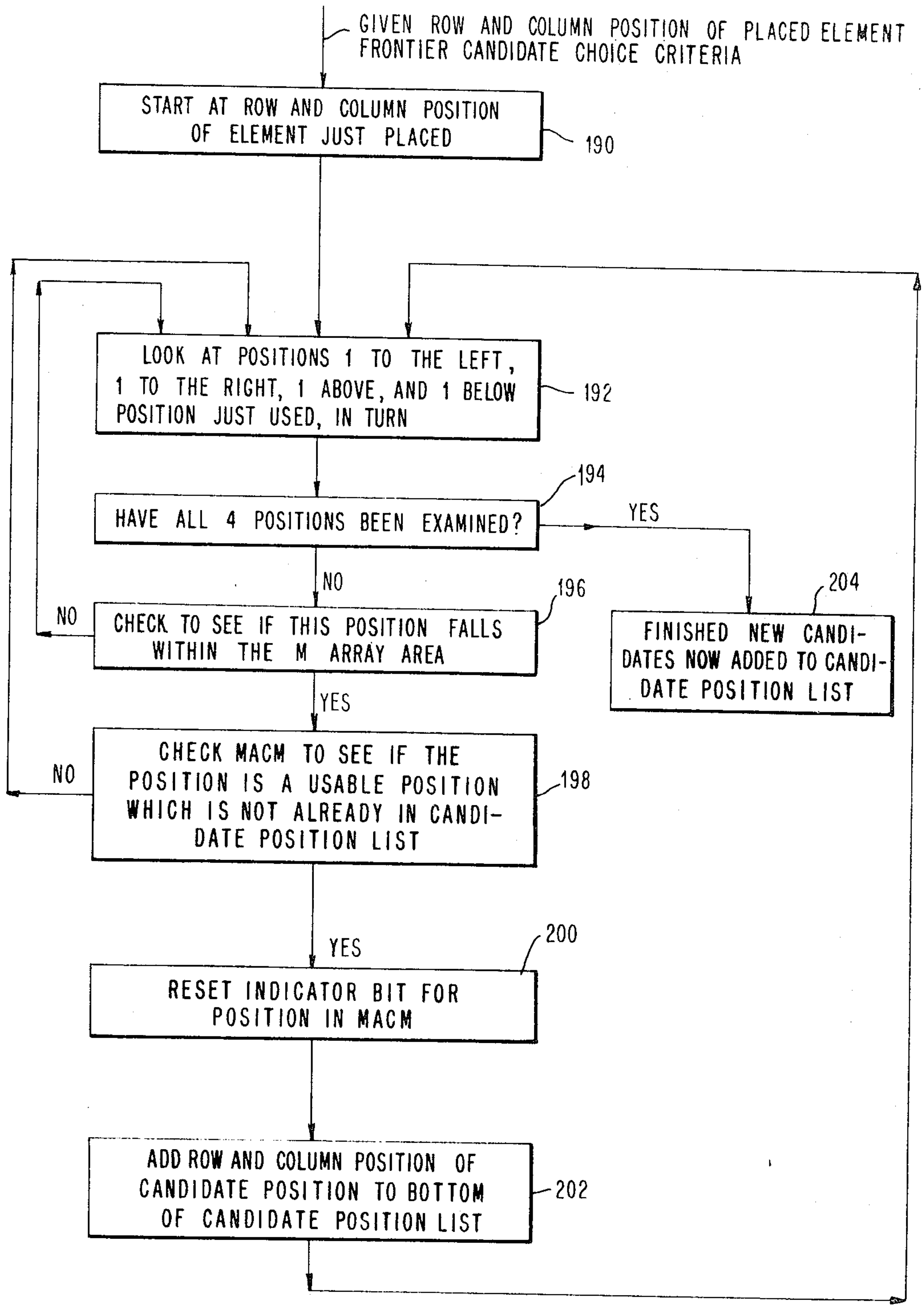
FIGS. 4A–4D are detailed flow diagrams for some of the individual steps of FIG. 2 for the assignment system.

From step 52, the system proceeds to step 54 during which new candidate positions to which an element may be assigned are added to the candidate position list by the frontier choice method. A detailed flow chart of step 54 of the assignment portion of the operation is shown in FIG. 4A. Referring now to FIG. 4A it is seen that the first step of this operation, step 190, is to look at the row and column position of the element just placed. From this step, the system proceeds to step 192 during which the system looks, in turn, first at the position one to the left, then one to the right, then one above, and finally one below the position just used. Each time step 192 is completed, the system proceeds to step 194. During step 194 a determination is made as to whether all four positions adjacent to the position which has just had an element assigned to it, have been examined. If all four positions have not been examined, the system branches to step 196. During step 196, a check is made to be sure that the position being looked at falls within the M array area. If the position is within the M array, the system branches to step 198 during which the indicator bit in MACM for the position being interrogated is checked to determine if this position is a useable position which has not previously been used and is not already in the candidate position list. If, during step 198, an indicator bit of one is found, the system branches to step 200. During step 200 the indicator bit just interrogated in the MACM is reset to zero. The resetting of the indicator bit during step 200 prevents this position from again being added to the list of candidate positions. From step 200 the system branches to step 202 during which the row and column coordinates of the position just investigated are added in at the bottom of the candidate position list. From step 202, the system branches back to step 192 to cause a new adjacent position to be looked at. The system also branches back to step 192 if, during step 196 or 198 a NO output is obtained. When, during step 194, an indication is received that all four positions have been examined, the system branches to step 204 during which an indication is generated that step 54 (FIG. 2) of the operation is complete, and that all adjacent positions which are also candidate positions have now been added to the candidate position list.

Figure 4B:
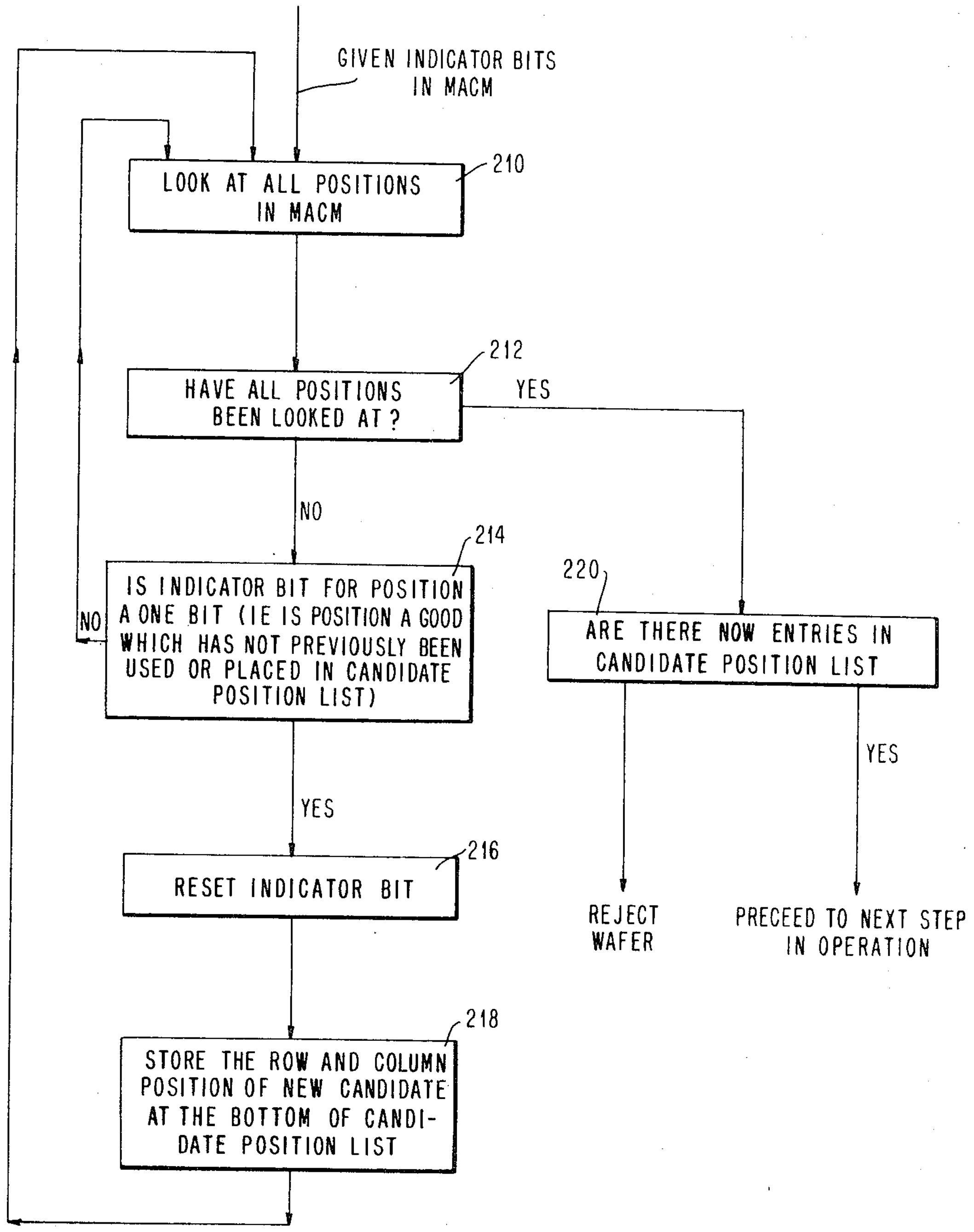

Referring again to FIG. 2, it is seen that when step 54 is completed, the system branches to step 56. During step 56, a check is made of the candidate position list to determine if there are any candidate positions contained therein. Since this is a one step operation, a detailed flow chart for the step has not been provided. If step 56 indicates that there are no candidate positions remaining in the candidate position list, the system proceeds to step 58. During step 58 an error indication is generated and one of a variety of steps are performed in order to allow the system to complete the assignment function even when its preferred mode of operation is no longer possible. One such alternative step is to make all useable unfilled positions available. FIG. 4B is a detailed flow diagram of this step. Referring to FIG. 4B it is seen that the first step in this operation, step 210, is to look at a selected entry in MACM. From step 210 the system proceeds to step 212 during which a determination is made as to whether all positions in MACM have been looked at. If, during step 212, a determination is made that all positions in MACM have not been looked at, the system branches to step 214. During step 214 the indicator bit in MACM (FIG. 6C) for the position being looked at is checked to determine if a one bit is stored therein. A one bit stored in this position indicates that the position is a good one which has not previously been used, or placed in the candidate position list. If the indicator bit is a zero, the position is not to be added to the candidate position list and the system returns to step 210. If the indicator position is a one, the position is to be added to the candidate list and the system branches to step 216. During step 216 the indicator bit for the position just looked at is reset to zero so that this position will not again be added to the candidate position list. From step 216 the system branches to step 218 during which the row and column coordinates of the new candidate position is added to the bottom of the candidate position list. From step 218 the system returns to step 210 to look for a new position in MACM which may be added to the candidate position list. When, during step 212, a determination is made that all positions have been looked at, the system branches to step 220. During step 220 a determination is made as to whether there are now entries in the candidate position list. If there are no candidates in the candidate position list at this time, the wafer is rejected, or, in the alternative, some other approach, to be described later, may be employed, If there are now positions in the candidate position list, the system is ready to proceed to the next step in the operation. Other operations which may be performed during step 58 of the operation will be described later.

When, at the end of either step 56 or 58, an indication is received that there are candidate positions in the candidate position list, the system branches to step 60 (FIG. 2). During step 60 the system increments the T count in order to find the next item to be placed in the T list. Since step 60 is a single step operation, a detailed flow diagram has not been provided for it. From step 60, the system proceeds to step 62.

Figure 4C:
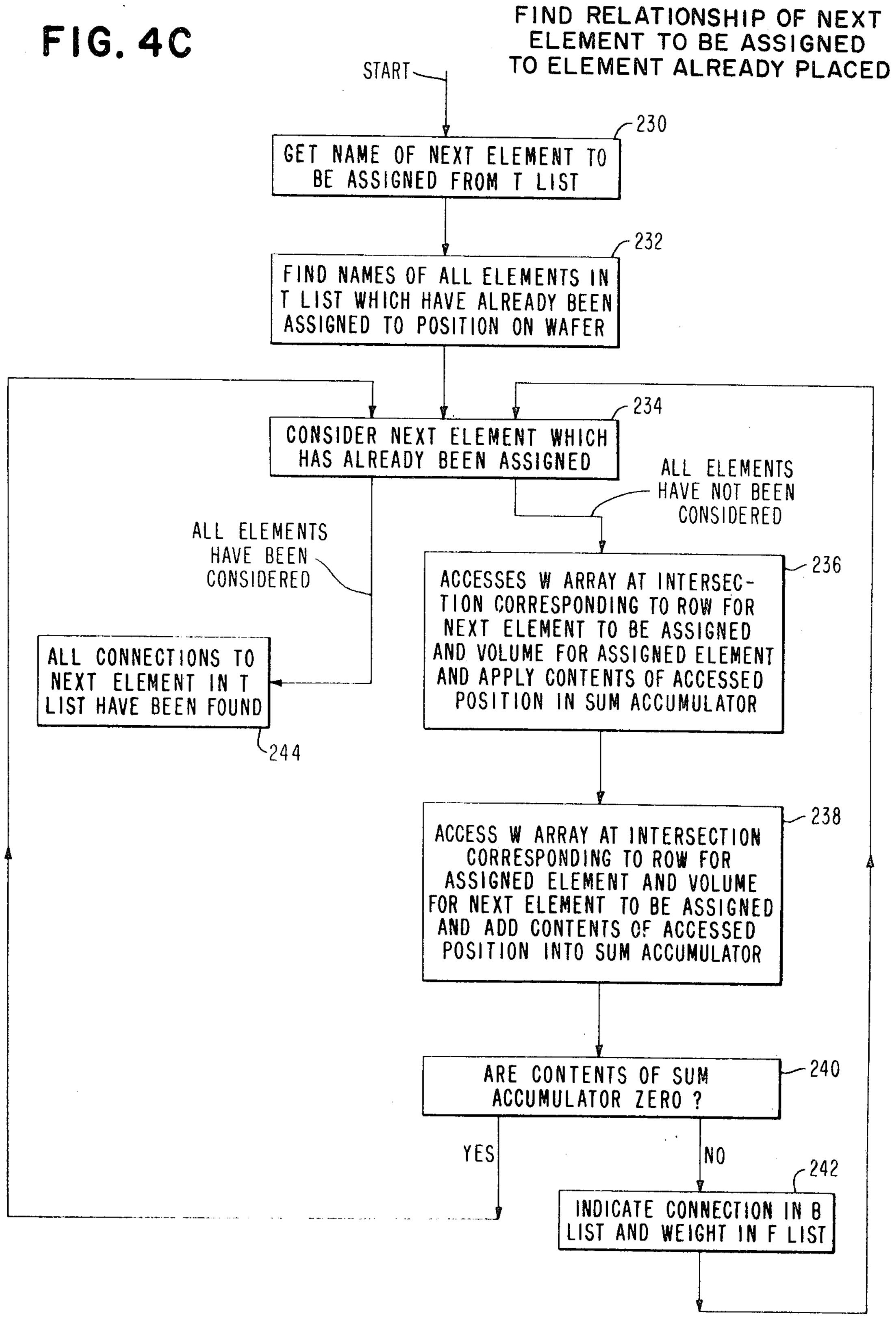

During step 62 the relationship of the element just selected from the T list to elements already placed is determined. FIG. 4C is a detailed flow diagram of this step in the operation. Referring now to FIG. 4C, it is seen that during the first step in this operation, step 230, the name of the next element to be assigned is retrieved from the T list. From step 230 the system proceeds to step 232. During step 232 an indication is generated of all the elements in the T list which have already been assigned to positions on the wafer. From step 232 the system proceeds to step 234. During step 234 the system looks at one of the elements found during step 232. Assuming that all of the elements found during step 232 have not already been considered, the system branches from step 234 to step 236. During step 236 the W matrix memory (FIG. 6D) is accessed at the address corresponding to the intersection of the row for the next element to be assigned and the column for the assigned element being looked at. For example, if the next element to be assigned is C6, and the element being looked at is C3, the W array would be accessed at address 73. The weight stored at the accessed address is applied to a SUM accumulator. From step 236 the system proceeds to step 238 during which the W array is accessed at the address corresponding to the row for the assigned element and the column for the next element to be assigned. For the same elements mentioned above, this would be the address 34. The weight stored at this address is added to the weight previously stored in the SUM accumulator. From step 238 the system proceeds to step 240.

During step 240 the SUM accumulator is interrogated to determine if its contents are zero. If its contents are zero, this means that the element being considered is not connected to the next element to be assigned and the system branches back to step 234 to consider another already-assigned element. If the weight in the SUM accumulator during step 240 is other than zero, it means that the element being considered is connected to the next element to be assigned. Under these conditions the system proceeds to step 242 during which the fact that the element is connected to the next element to be assigned is entered in the B list and the weight of the connection is transferred from the SUM accumulator to the F list. From step 242 the system branches back to step 234 to consider a new already-assigned element. When, during step 234, a determination is made that all already-assigned elements have been considered, the system branches to step 244. During step 244, an indication is generated that all elements connected to the next element in the T list (the next element to be assigned) have been found.

Figure 4D:
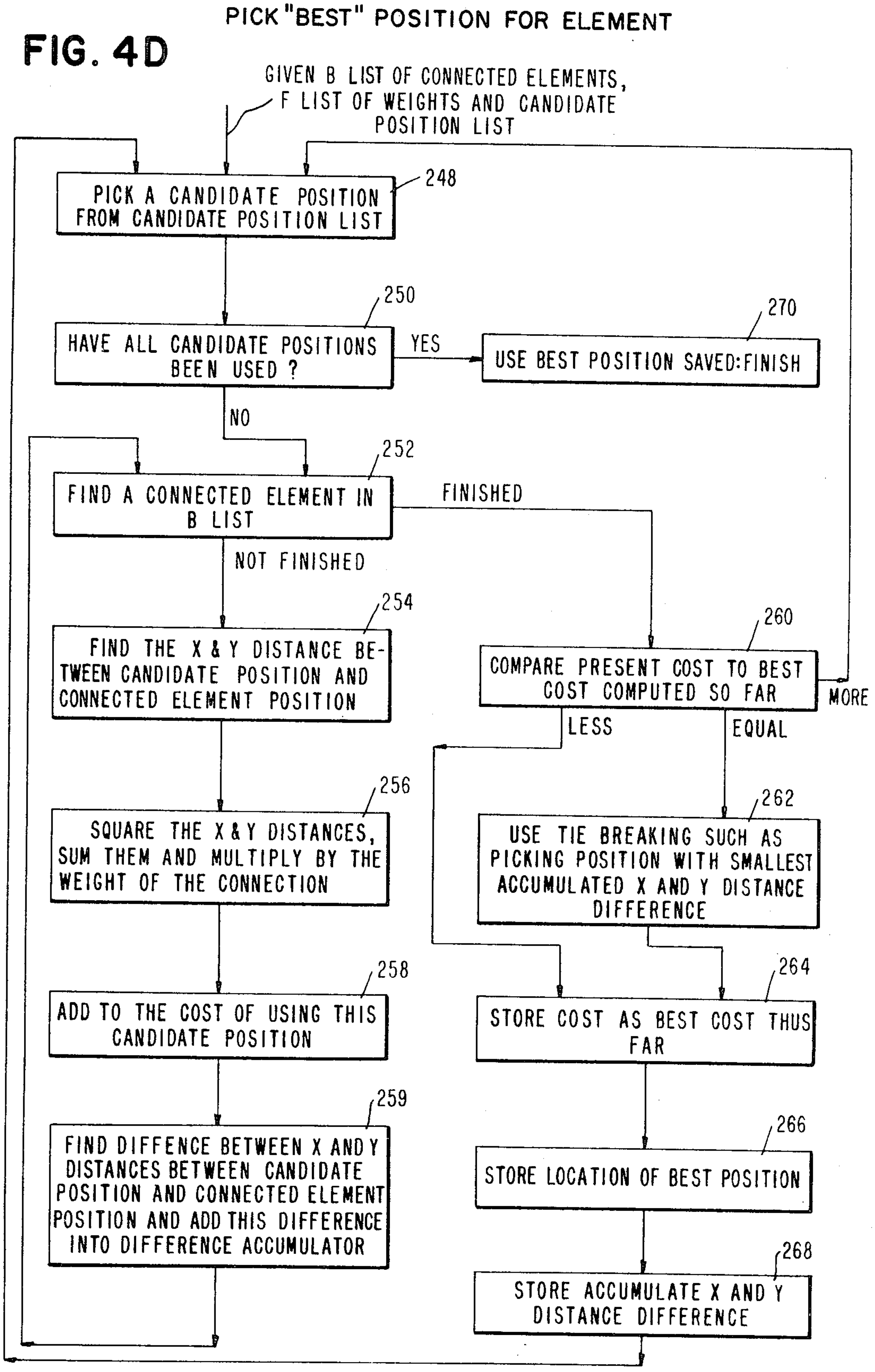

When step 62 (FIG. 2) of the operation has been completed, the system is ready to perform step 64. During step 64 the information derived during step 62 is utilized to determine which of the candidate positions is the best one for the next element to be assigned. FIG. 4D is a detailed flow diagram of this step of the operation. Referring to FIG. 4D it is seen that the first step in this operation is step 248. During step 248 a candidate position is selected from the list of candidate positions. From step 248 the system proceeds to step 250. During step 250 a determination is made as to whether all candidate positions have been used. If all candidate positions have not been used the system proceeds to step 252 during which a connected element is selected from the B list. If there is an unselected element in the B list at this time, the system branches to step 254. During step 254 the system computes the X and Y distance between the candidate position and the connected element position, the connected element position being the position to which the element selected during step 252 is assigned. From step 254 the system proceeds to step 256. During step 256 the X and Y distances determined during step 254 are squared, the sum of these squares determined, and this quantity multiplied by the weight of the connection. During step 258, the next step in the operation, this computed value is added to the cost of using the candidate position. From step 258 the system proceeds to step 259 during which the difference between the X and Y distances determined during step 254 is computed and this value added into a difference accumulator. From step 259 the system returns to step 252 to find a new connected element in the B list. When, during step 252, it is found that all connected elements have been looked at, the system branches to step 260. During step 260 the cost which has been completed for using the candidate position being investigated is compared against the best-cost-so-far. For the first candidate position being investigated, this step may be bypassed, or, in the alternative, a very high number may initially be stored as the best-cost-so-far. If the present cost is higher than the best-cost-so-far (i.e. if the cost of using the candidate position being investigated is more than that stored), the system returns to step 248 to pick another candidate position from the candidate position list. If the cost of using the two positions is equal, the system proceeds to step 262.

During step 262, the tie resulting from step 260 is broken by some suitable criteria as, for example, by using the sum of the X and Y differences computed during step 259 and picking the position for which the sum of these differences is smallest. This criteria gives the maximum flexibility in laying out a subsequent wiring pattern. If the cost computed during step 258 is less than that stored, or, as a result of step 262, a determination is made to use the candidate position being looked at, the system proceeds to step 264. During step 264 the cost determined during step 258 is stored as the best cost, (i.e. the lowest cost) so far. From step 264, the system proceeds to step 266 during which the location of the candidate position being looked at is stored. From step 266 the system proceeds to step 268 during which the sum accumulated in the difference accumulator during step 259 is stored. If a different tie breaking criteria is used, steps 259 and 268 may be eliminated. From step 268 the system returns to step 248 to pick another available position from the candidate position list. When, during step 250, an indication is received that all candidate positions have been looked at, the system branches to step 270 during which an indication is generated that the location saved during the last step 266 is the one which is to be used and that step 64 (FIG. 2) has been completed.

Referring to FIG. 2, it is seen that from step 64 the system proceeds to step 66 during which the next element to be assigned is placed at the best position selected during step 64. This is accomplished by recording the name of the next element in the T list at the selected position in MACM. Since this is a one step operation a detailed flow diagram has not been provided.

Referring still to FIG. 2, it is seen that from step 66 the system proceeds to step 68 during which the candidate position is updated by removing the filled position therefrom, and during which other housekeeping operations are performed. The filled position may either be actually removed from the list, or may be effectively removed by making a suitable notation in a selected field of its entry. The manner in which this is accomplished will be described later. Other housekeeping operations which may be performed at this time include storing, in additional memory, the coordinates at which the element just assigned was placed. A detailed flow diagram for the housekeeping operations described above has not been provided.

From step 68 of the operation the system proceeds to step 70 during which the T number of the element just looked at is compared with the maximum T number to determine if all elements have been placed. If all elements have not been placed, the system branches to step 54 to cause new candidate positions adjacent to the position which had an element assigned to it to be added to the candidate position list. The system then proceeds to determine the best candidate position for the next element to be assigned and to assign the element to this position in a manner previously described. When, during step 70, it is determined that all elements have been placed, a signal is generated indicating the end of the placement operation.

A method of performing the ordering and assignment functions of the placement system 10 (FIG. 1) has now been described in some detail. It should, at this point, be noted that so long as the same circuit configuration is being applied to the wafers, the preliminary steps, with the exception of step 44, and the steps of the ordering system need be performed only once, whereas step 44 and the steps of the assignment system must be performed for each wafer. In the sections to follow a special purpose computer embodiment of a system for performing the assignment function will be described.

DETAILED CIRCUIT DESCRIPTION OF SPECIAL PURPOSE COMPUTER EMBODIMENT OF ASSIGNMENT SYSTEM

In the preceding sections a method of performing the operations of the placement system shown in FIG. 1 has been presented. In this and the following section, a special purpose computer embodiment of the assignment portion of the placement system will be described. This embodiment is illustrated in FIGS. 5A–5R.

Referring first to FIG. 5A, it is seen that the system is controlled by four clocks designated the P clock, N clock, S clock, and E clock. P clock 300 is the master clock which controls most of the operations of the assignment system and is used to start the other clocks at appropriate points in the operating cycle. P clock 300 may be considered to be made up of a plurality of single shot circuits each of which generates an output signal on an appropriate output line 301–329 when the corresponding single shot is in its ON state. The lines 301–329 are also designated lines P1–P29 respectively. The single shots also generate output signals when they switch from their ON to their OFF state. The numerical designations for the lines on which these outputs appear are the same as those for the output lines from the single shot when the single shot is in its ON state with a prime (′) being added to the numerical designation, and the letter designations for the clock pulses which occur when a single shot switches from its ON to its OFF state have a line drawn over the top of them. While each single shot of the P clock has two output lines, only the lines actually used in the circuit are shown in FIG. 5A. Thus there is a $\overline{P3}$ line 303′ (no P3 line 303 being shown since the P3 single shot is not used to control any operations when it is in its ON state) and a $\overline{P5}$ line 305′ (there also being a P5 line 305 since the P5 single shot is used both when in its ON state and when it times out). A single shot will be said to time out when it switches from its ON to its OFF state. P clock 300 also has a P-clock-off-flip-flop which is in its ONE state when none of the other single shots are ON (i.e., when the P clock is OFF) and has a P-off output line 330. In addition to the output lines just described, P clock 300 also has a number of inputs which are used to either set some of the single shots therein or condition these single shots to be set. The first of these lines, line 332, is energized when a start signal is applied to the system from an external source (i.e., when, for example, the function of the ordering system has been completed) and is applied to set the P1 single shot to its ON state. The remaining inputs to the P clock will be described in conjunction with the points in the system where they are generated. Single shots which do not have a specific input shown in FIG. 5A are generally set to their ON state when the preceding single shot in the clock switches from its ON to its OFF state. The turn on condition for each of the single shots in P clock 300 and the functions performed when this single shot is in its ON state, and when it switches from its ON to its OFF state, are shown in chart form in Appendix I at the end of the specification. No attempt has been made to connect the outputs from the P clock to the various points in the circuit where they are utilized, but this information may be easily derived by referring to the appropriate point in Appendix 1.

N clock 350 is used to control the operation of finding the good neighbors of an element which has just been assigned to a position on the wafer by use of the frontier choice method. Stated another way, this clock is used to control step 58 (FIG. 2) of the operation. As with the P clock, N clock 350 is made up of a plurality of single shot triggers each of which may generate an output signal on a corresponding output line 351–360 when it is in its ON state and a signal on a corresponding output line 351′–360′ when it times out. The lines 351–360 are also designated the N1–N10 lines respectively and the lines 351′–360′ the $\overline{N1}$–$\overline{N10}$ lines respectively. Only such of the N clock output lines as are actually used in the circuit are shown in FIG. 5A. There is also an N-clock-off-flip-flop with an N-off output line 362. One input to N clock 350 is output line 364 from OR gate 366. One input to OR gate 366 is $\overline{P8}$ line 308′ . The other input to this OR gate and the remaining inputs to N clock 350 will be described in conjunction with the points at which they are generated. As with the P clock, where no other input is shown, a single shot in the N clock is generally set to its ON state when the preceding trigger switches from its ON to its OFF state. The turn on condition for each of the single shots in the N clock, the functions performed when this single shot is in its ON state, and the functions performed when the single shot switches from its ON to its OFF state are shown in chart form in Appendix II at the end of the specification. While the various inputs and outputs from the N clock are not connected to the points in the circuit from which they are derived and to which they are applied respectively, this information may easily be derived from the chart in Appendix II.

S clock 370 is used to control the sub-operation which finds the best position for an element from the candidate positions in list B. Stated another way, the S clock controls the performance of step 68 (FIG. 2). The single shots of the S clock generate output signals on appropriate lines 371–394 when they are in their ON state and on appropriate lines 371′–394′ when they time out. It is noticed that some of the clock lines also bear letter designations such as 374A, 374B, etc. No particular significance is attached to this, in merely resulting from the manner in which these clock pulses were initially designated. The lines 371–374 (including the lines having letter designations) are also designated lines S1–S24 respectively and the lines 371′–394′, lines $\overline{S1}$-$\overline{S24}$ respectively. The lines are shown in FIG. 5A only if used. An S clock OFF flip-flop and S-OFF line 396 are also provided. One input to S clock 370 is output line 398 from AND gate 399 which is applied to set the S1 single shot to its ON state. One input to AND gate 399 is $\overline{P28}$ line 328′. The remaining inputs to the S clock will be described in conjunction with the points at which they are generated. The turn-on condition, the functions performed when the single shot is in its ON state, and the functions performed when the single shot switches from its ON to its OFF state for each of the single shots in the S clock are shown in chart form in Appendix III at the end of the specification. While input and output connections are not shown for the S clock in FIGS. 5A–5R, they may easily be derived from Appendix III.

E clock 400 is used to control the operation of finding the elements connected to the next element in the T list to be assigned. This is step 66 of FIG. 2. The single shots of E clock 400 generate output signals on lines 401–426 respectively when they are in their ON state and on lines 401′–426′when they time out. These lines, which are shown in FIG. 5A only if used, are also designated the E1–E26 lines and $\overline{E1}$–$\overline{E26}$ lines respectively. An E-clock-off flip-flop with an E-off output line 429 is also provided. One input to E clock 400 is $\overline{P27}$ line 327′ which is applied to set the E1 single shot to its ON state. The remaining inputs to the E clock will be described in conjunction with the points in the circuit where they are generated. The turn on conditions for each of the single shots in the E clock, the functions performed when this single shot is in its ON state, and the functions performed when the single shot switches from its ON to its OFF state are shown in chart form in Appendix IV. While the connections to the E clock inputs and outputs are not shown in FIGS. 5A–5R, these connections may easily be derived by referring to Appendix IV.

Figure 6A:
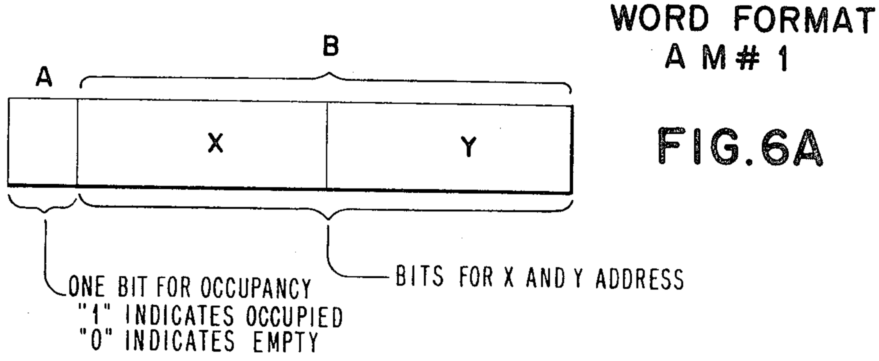

Referring now to FIG. 5B, it is seen that the system includes an associative memory 440 which is designated AM No. 1. Each entry in this memory contains a 1 bit A field which has a bit in it when that position of the memory is occupied and a multibit BX field which contains the X address of a candidate position as determined by the frontier choice method and a BY field which contains the Y address of the candidate position. FIG. 6A is a diagram of the contents of a single address position in memory 440. As will be seen later, AM No. 1 is the memory in which the candidate position list is stored. The controls for associative memory 440 are applied through lines 442 from AM No. 1 controls 444 (FIG. 5C). The A field of all of the positions in memory 440 are reset by a signal applied to P1 line 301. Memory 440 and the controls therefore are generally of the type shown in application Ser. No. 296,353, entitled "Memory System" filed on behalf of H. Hellerman on July 17, 1963 and assigned to the assignee of the instant application. The associative memory is generally shown in FIG. 4B of the Hellerman application and the controls in FIG. 4A. From these figures, it can be seen that lines 442 include three lines for each word in AM No. 1, two running from the controls to AM No. 1 and a mismatch line from AM No. 1 to the controls. The other inputs to controls 444 are output line 446 from OR gate 448, output line 450 from OR gate 452, S4A line 374A, S4B line 374B, output line 454 from the one side of read-write flip-flop 456, and output line 458 from the ZERO side of this flip-flop. Controls 444 contain two flip-flops for each position in memory 440, one of which flip-flops is referred to as a match indicator. The match indicators are all set to their one state by a signal applied to line 450. A signal applied to line 446 is called an A pulse. This pulse tests the match indicators and, depending on the state of flip-flop 456, causes the memory position in AM No. 1 (FIG. 5B) corresponding to the first match indicator which is set to be written into or read out from. When a read or write occurs, the additional flip-flop in controls 444 for the accessed memory position is set. If all of the match indicators are reset, the A pulse on line 446 is passed through controls 444 to line 459 to set end-of-line flip-flop 460 to its ONE state. The signal on line 374A is referred to as a B pulse and the signal on line 374B as a C pulse. The significance of these pulses, which is described in more detail in the above mentioned patent, is in setting up control circuitry so as to permit more than one matched on entry in memory 440 to be read out. The B pulse finds the additional flip-flop which is set and resets the corresponding match indicator. The C pulse resets the additional flip-flop. Flip-flop 456 is the read-write flip-flop for memory 440. When it is in its one state, generating an output signal on line 454, the memory is in its READ state and the contents of matched on memory position is read out into memory data register (MDR) 462 (FIG. 5D) when an A pulse is applied to control circuitry 444. When this flip-flop is in its ZERO state, the memory is in its WRITE condition and when an A pulse is applied to controls 444, the contents of MDR are written into the selected memory position.

One input to OR gate 448 (FIG. 5C) is S4 line 374. One input to OR gate 452 is S2 line 372. The input to the one side of flip-flop 456 is output line 464 from OR gate 466. The inputs to OR gate 466 are P10 line 310, P14 line 314, P24 line 324, and S2 line 372. The input to the ZERO side of flip-flop 456 is output line 468 from OR gate 470. The inputs to OR gate 470 are P20 line 320 and N1 line 351.

Referring still to FIG. 5C, it is seen that an AM No. 1 clock 472 is provided. This clock controls the accessing of memory 440. Clock 472 is started by a signal applied to output line 474 of OR gate 476. The inputs to OR gate 476 are $\overline{P10}$ line 310', $\overline{P14}$ line 314', $\overline{P20}$ line 320', $\overline{P24}$ line 324', and $\overline{N7}$ line 357'. Clock 472 has four output lines 481–484. Output line 481 is connected as the second input to OR gate 452 and as one input to OR gate 485. The other input to OR gate 485 is S2 line 372. Output line 487 from OR gate 485 is connected as the ZERO-side input to flip-flop 460. Line 482 is connected as one input to OR gate 492 (FIG. 5B), the other input to this OR gate being S3 line 373. Output line 494 from OR gate 492 is applied to argument register 496 to cause an associate operation to be performed. The mechanics of an associate operation will be described later. Output line 483 from clock 472 is connected as the other input to OR gate 448. Output line 484 is the OFF output from clock 472. A signal appears on this line when there is no signal on any of the lines 481–483. Line 484 is connected to condition single shots P12 (FIG. 5A) P16, P26 and N9 to be set when the single shot preceding that mentioned times out. Line 484 is also connected as one input to AND gate 610 (FIG. 5I) and through inverter 486 and line 488 to condition single shots P11, P15, P25 and N8 to be reset to their ON state when these single shots are timing out.

Referring again to FIG. 5C it is seen that output line 498 from the ONE side of flip-flop 460 is connected as the information input to gates 500–502, and that output line 506 from the ZERO side of this flip-flop is connected as the information input to gates 508–510. The conditioning input to gates 500 and 508 is $\overline{P12}$ line 312'. The conditioning input to gates 501 and 509 is $\overline{P26}$ line 326'. The conditioning input to gates 502 and 510 is $\overline{S5}$ line 375'. Output line 512 from gate 500 is connected as one input to OR gate 514. Output line 516 from gate 508 is connected to set single shot P13 to its ON state. Output line 518 from gate 501 is connected as the second input to OR gate 514. Output line 520 from OR gate 514 is connected to generate an error indication to the external circuitry indicating that there are too many bad circuits, and therefore, that the circuit cannot be placed on the wafer. This is the error signal generated during step 58 of the operation. The signal on line 520 is also applied through OR gate 521 (FIG.5A) and line 523 to set the OFF flip-flop of the P clock to its ON state. Output line 522 from gate 509 is connected to set the P27 single shot to its ON state, and output line 526 from gate 510 is connected to set the S6 single shot to its ON state. Output line 524 from gate 502 is connected to reset S clock 370 (FIG. 5A by setting the S-clock-OFF flip-flop to its ON state.

Referring now to FIG. 5B, it is seen that an argument register 496 and an argument mask 528 are provided for associative memory 440. Argument register 496 will have a bit pattern set into it which, during an associate operation, is to be matched against the contents of the various memory positions in memory 440. Argument mask 528 has 1 bits in the field which it is desired to associate on. Argument register 496 is reset to 0 by a signal applied to output line 530 from OR gate 532. The inputs to OR gate 532 are P8 line 308 and P22 line 322. A 1 is set into the A field of argument register 496 by a signal applied to output line 534 from OR gate 536. The inputs to OR gate 536 are P10 line 310, P 24 line 324, and S2 line 372. An address is applied to the B field of argument register 496 through lines 538 from gates 540 (FIG. 5L). The inputs to these gates will be described later. Argument mask 528 (FIG. 5D) is reset by a signal applied to output line 542 from OR gate 544. The inputs to OR gate 544 are P8 line 308, P19 line 319, P22 line 322, and S1 line 371. A 1 is set into the A field of argument mask 528 by a signal applied to output line 546 from OR gate 548. The inputs to OR gate 548 are S2 line 372, P10 line 310, P 24 line 324, and N1 line 351. The B fields of argument mask 528 are set to 1 by a signal applied to P20 line 320. The contents of argument register 496 are applied through lines 550, argument mask 528, and lines 552 to associative memory 440 during an associate operation.

Referring now to FIG. 5D, it is seen that a memory data register (MDR) 462, read mask 554, and a write mask 556 are also provided for associative memory 440. Information to be written into memory 440 is initially stored in MDR 462. This register is reset by a signal applied to P20 line 320 and a 1 bit is set into its A field by a signal applied to N1 line 351. Address information is applied to the B field of this register through lines 558 from gates 560 (FIG. 5K). The contents of MDR 462 are applied to memory 440 through lines 562, write mask 556, and lines 564 when an A pulse is applied to line 446 (FIG. 5C) and flip-flop 456 is in its ZERO state. Write mask 556 is reset by a signal applied to P19 line 319. A 1 bit is set into the A field of write mask 556 by a signal applied to output line 566 from OR gate 568. The inputs to OR gate 568 are P20 line 320 and N1 line 351. N1 line 351 is also connected to set one bits into the B field of the write mask.

When an A pulse is applied to line 446 (FIG. 5C) and flip-flop 456 is in its 1 state, the contents of the associated-on memory position are applied through lines 570, read mask 554, (FIG. 5D and lines 572 to MDR 462. Read mask 554 serves to prevent the writing over of information in MDR 462 which is desired to preserve. 1 bits are set into the B field of read mask 554 by a signal applied to output line 574 from OR gate 576. The inputs to OR gate 576 are P14 line 314 and S2 line 372.

Figure 6B:
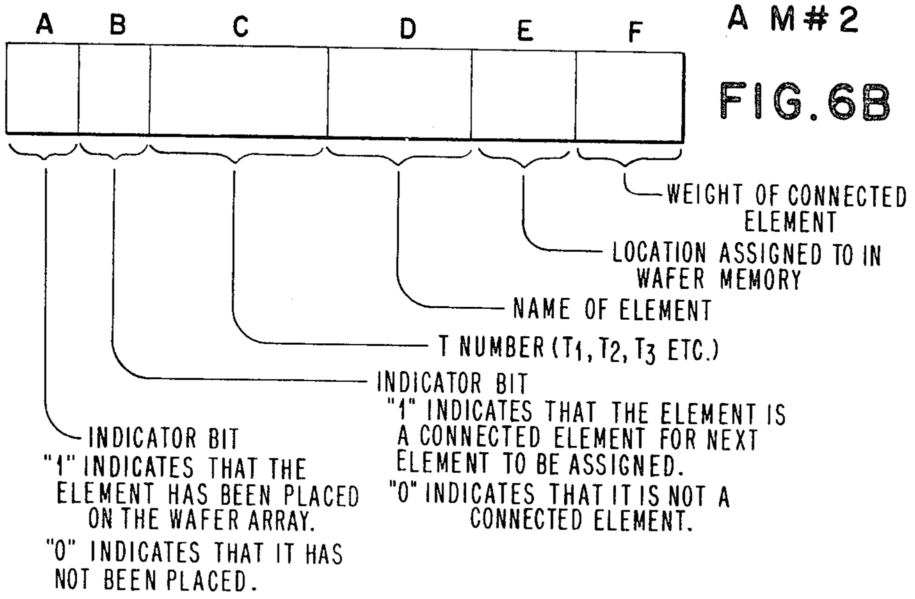

Referring now to FIG. 5H, it is seen that the system includes a second associative memory 578 (AM No. 2) which memory also has an argument register 580 and an argument mask 582. Each memory position in associative memory 578 has six fields designated the A field, B field, C field, D field, E field and F field. FIG. 6B is a diagram illustrating the contents of each of these fields. Referring to FIG. 6B, it is seen that the C field of this memory stores the T number of the element with the element name being stored in the D field. The C field of memory 578 is, therefore, used to store the T list previously mentioned. When the element has been assigned to a position on the wafer, the coordinants of this position are stored in the E field of memory 578. A 1 bit A field is used to indicate whether the element has been placed on the wafer array or not, a 1 bit in this field indicating that it has been placed. The B field and F field of memory 578 are used during the operations of finding the best position to place an element; the B field serving the function of the B list to indicate that the element mentioned in the D field is a connected element, and the F field performing the function of the F list by indicating the weight of the connection.

The A field of all the memory positions in memory 578 are reset to 0 by a signal applied to P1 line 301, and the B and F fields of all the memory positions in memory 578 are reset to 0 by a signal on output line 584 from OR gate 586. The inputs to OR gate 586 are P1 line 301 and E1 line 401.

Referring now to FIG. 5I, it is seen that an AM No. 2 clock 588 is provided. This clock is started by a signal on output line 589 from OR gate 590. The inputs to OR gate 590 are $\overline{P5}$ line 305', $\overline{P8}$ line 308', $\overline{P17}$ line 317', $\overline{P20}$ line 320', and $\overline{E1}$ line 401'. Clock 588 generates output signals on lines 591–594. When a start signal is applied to line 589, clock 588 first generates an output signal on line 591 followed by a signal on line 592 and then a signal on line 593. When there is no signal on any of the lines 591–593, a signal appears on OFF line 594.

Line 591 is connected as one input to OR gates 598 and 600. Output line 592 from clock 588 is connected as one input to OR gate 602 (FIG. 5H). Output line 593 from clock 588 is connected as one input to OR gate 604. AM No. 2 clock-OFF output line 594 is connected to cause the setting of single shots P7, P19, and E3, when the preceding single shot is switching from its ON to its OFF state. Line 594 is also connected as one input to AND gate 609, as a second input to AND gate 610 and through inverter 606 and line 608 to cause single shots P6, P18, and E2, to be reset to their ON states when these single shots are timing out. The other inputs to AND gate 609 are $\overline{P9}$ line 309', and N-off line 362. The final input to AND gate 610 is $\overline{P21}$ line 321'. Output line 611 from AND gate 609 is connected to set single shot P10 to its ON state and through inverter 613 and line 615 to reset single shot P9 to its ON state when it times out. Output line 612 from AND gate 610 is connected to set single shot P22 to its ON state and through inverter 614 and line 616 to reset the P21 single shot to its ON state when this single shot times out. Circuitry is provided inside the P and E clocks to perform such ANDing operations as may be required above.

The other inputs to OR gate 600 (FIG. 5I) are E4 line 404 and S7 line 377. Output line 618 from OR gate 600 is applied to AM No. 2 controls 620 to cause the match indicator flip-flops therein to be reset to their ONE state. AM No. 2 controls 620 are identical to the previously described AM No. 1 controls 444. The other inputs to OR gate 604 are E6 line 406, E26 line 426, and S9 line 379. Output line 622 from OR gate 604 is connected to apply an A pulse to controls 620. A B pulse is applied to controls 620 through output line 624 from OR gate 626 and a C pulse is applied to the controls through output line 628 from OR gate 630. The inputs to OR gate 626 are E27 line 427 and S9A line 379A. The inputs to OR gate 630 are E28 line 428 and S9B line 379B. The READ-input to controls 620 is output line 632 from the ONE side of flip-flop 634 and the WRITE input is ZERO-side output line 636 from this flip-flop. The ONE-side input to flip-flop 634 is output line 638 from OR gate 640 and the ZERO-side input to this flip-flop is output line 642 from OR gate 644. The inputs to OR gate 640 are P5 line 305, P17 line 317, E1 line 401, E4 line 404, E28 line 428, and S7 line 377. The inputs to OR gate 644 are P8 line 308 and P20 line 320 and E25 line 425. Controls 620 are interconnected with associative memory 578 by lines 646. If, when an A pulse is applied to line 622, all the match indicators in controls 620 are set to their ZERO state, an output signal appears on line 648 which line is connected as the ONE-side input to end-of-line flip-flop 650. The ZERO-side input to end-of-line flip-flop 650 is output line 652 from before-mentioned OR gate 598. The remaining inputs to OR gate 598 are E4 line 404 and S7 line 377.

Output line 654 from the ONE-side of end-of-line flip-flop 650 is connected as the information input to gates 656 and 658. Output line 660 from the ZERO side of the end-of-line flip-flop is connected as the information input to gates 657 and 659. The conditioning input input to gates 656 and 657 is $\overline{S10}$ line 380' and the conditioning input to gates 658 and 659 is $\overline{E9}$ line 409'. Output line 662 from gate 656 is connected to set single shot S11 to its ON state and output line 664 from gate 657 is connected to set single shot S14 to its ON state. Output line 666 from gate 658 is connected to set the E-clock-off flip-flop to its ON state (i.e., to reset the E clock) and output line 668 from gate 659 is connected to set single shot E10 to its ON state.

Referring now to FIG. 5H, it is seen that the remaining inputs to OR gate 602 are S2 line 372, S8 line 378, and E5 line 405. Output line 670 from OR gate 602 is connected as the associate input to argument register 580. When an associate input is applied to argument register 580, the contents of this register are applied through lines 672, argument mask 582, and lines 674 to associative memory 578 where the contents of the field (or fields) passed by the argument mask is compared against the contents of this field in each of the memory positions. The A field of argument register 580 is set to 1 by a signal on E4 line 404 and the B field of this register is set to 1 by a signal on S7 line 377. A T number is set into the C field of argument register 580 through output lines 676 from gates 678 (FIG. 5G). Argument mask 582 is reset by a signal on output line 680 from OR gate 682. The inputs to OR gate 682 are P4 line 304, P27 line 327, E3 line 403, and S6 line 376. The A field of argument mask 582 is set to 1 by a signal on E4 line 404 and the B field of this register is set to 1 by a signal on S7 line 377. The bits of the C field of the argument mask are set to 1 by a signal on output line 684 from OR gate 686. The inputs to OR gate 686 are P5 line 305, and E1 line 401.

Referring now to FIG. 5J, it is seen that a read mask 688, and MDR 690, and a write mask 692 are provided for AM No. 2 578 (FIG. 5H). If flip-flop 634 (FIG. 5I) is in its ONE state when an A pulse is applied to line 622, the contents of a matched on position in assiciative memory 578 is applied through output lines 694, read mask 688, and lines 696 to MDR 690. Read mask 688 is reset by a signal on output line 698 from OR gate 700. The inputs to OR gate 700 are P4 line 304, and P27 line 327. The D field of read mask 688 is set to 1 by a signal on output line 702 from OR gate 704. The inputs to OR gate 704 are P5 line 305, and E1 line 401. The E and F fields of read mask 688 are set to 1 by a signal on S7 line 377. The A field of MDR 690 is set to 1 by a signal on output line 706 from OR gate 708. The inputs to OR gate 708 are P8 line 308, and P20 line 320. The B field of MDR 690 is set to 1 by a signal on E25 line 425. Data is read into the E field of MDR through output lines 710 from gates 712 (FIG. 5L) and data is read into the F field of MDR through output lines 714 from gates 716 (FIG. 5R).

If, when an A pulse is applied to line 622 (FIG. 5I) flip-flop 634 is in its ZERO state, the contents of MDR 690 (FIG. 5J) are applied through lines 718, write mask 692 and lines 720 to cause the portion of the contents of MDR which is passed by write mask 692 to be stored in the matched-on memory position in associative memory 578. Write mask 692 is reset by a signal applied to output line 722 from OR gate 724. The inputs to OR gate 724 are P7 line 307 and E24 line 424. The A and E fields of write mask 692 are set to 1 by a signal applied to P8 line 308 and the B and F fields of the write mask are set to 1 by a signal applied to E25 line 425.

Referring now to FIG. 5G, it is seen that the conditioning input to gate 678 is output line 726 from OR gate 728. The inputs to OR gate 728 are P5 line 305, P17 line 317, and E1 line 401. The information inputs to gates 678 are output lines 730 from T counter 732. T counter 732 is used to keep track of the element in the T list being looked at, at any given time. T counter 732 is reset to 1 by a signal applied to P4 line 304 and is incremented by a signal applied to output line 734 from OR gate 736. The inputs to OR gate 736 are P13 line 313 and P27 line 327.

Output lines 730 from T counter 732 also form one set of inputs to compare circuit 738. The other set of inputs to compare circuit 738 are output lines 740 from E register 742. E register 742 is set to contain the total number of elements in the electrical circuit array which is being placed on the wafer. When the inputs applied to compare circuit 738 are equal, a signal appears on line 744 and, when the inputs to the compare circuit are not equal, a signal appears on line 746. Lines 744 and 746 are applied as the information inputs to gates 748 and 750 respectively. The conditioning input to gates 748 and 750 is $\overline{P22}$ line 322'. Output line 752 from gate 748 is connected to indicate the end of operation and as another input to OR gate 521 (FIG. 5A). As indicated previously, output line 523 from OR gate 521 is connected to set the P-clock-OFF flip-flop to its ON state. Output line 754 from gate 750 is connected to set single shot P23 to its ON state, and as the other input to OR gate 366 (FIG. 5A).

Referring now to FIG. 5D, it is seen that output lines 756 from the B fields of MDR 462 are connected as the information inputs to gates 758 (FIG. 5E) and 760. The conditioning input to gate 760 is S6 line 376. Output lines 762 from gates 760 divide into lines 762X which apply the X portion of the address on lines 762 to XGN register 764 and lines 762Y which apply the Y portion of the address passed by gates 760 to YGN register 766 (FIG. 5F). The contents of the XGN register are incremented by a signal on output line 768 from OR gate 770 and is decremented by a signal on output line 772 from OR gate 774. Output lines 776 from XGN register 764 are connected as one set of inputs to compare circuit 778, as the information inputs to gates 780, and as the information inputs to gates 782 (FIG. 5F) and 784. Output lines 786 from YGN register 766 are connected as one set of inputs to compare circuit 788, as the information inputs to gates 790 and 792 and as the information inputs to gates 794 (FIG. 5E). The other set of inputs to compare circuit 778 are output lines 796 from X (MAX) register 798 and the other set of inputs to compare circuit 788 are output lines 800 from Y (MAX) register 802. X (MAX) register 798 and Y (MAX) register 802 contain the X and Y coordinates respectively of the last position on the wafer. If the contents of the XGN register are greater than the contents of the X (MAX) register, compare circuit 778 generates an output signal on line 804 which is applied as one input to OR gate 806 (FIG. 5F) and as the input to inverter 808. If the contents of register YGN is greater than the contents of the Y (MAX) register, compare circuit 788 generates an output signal on line 810 which is applied as a second input to OR gate 806 and as the input to inverter 812. Output line 814 from inverter 808 and output line 816 from inverter 812 are connected as the inputs to AND gate 818. Output line 820 from OR gate 806 is connected as the information input to gate 822 and the output line 824 from AND gate 818 as connected as the information input to gate 826. The conditioning input to gates 822 and 826 is $\overline{N3}$ line 353'. Output line 828 from gate 822 is connected through OR gate 829 (FIG. 5A) and line 831 to set single shot N10 to its ON state, and output line 830 from gate 826 is connected to set single shot N4 to its ON state.

The conditioning input to gates 780 and 794 (FIG. 5E) is output line 834 from OR gate 836. The inputs to OR gate 836 are S12 line 382 and S23 line 393. The outputs from gates 780 and 794 merge to form lines 838 which are connected as the inputs to GN final register 840. Lines 838 are also the outputs from gates 758, the conditioning input to which is P16 line 316. Output lines 842 from GN final register 840 are connected as the information inputs to gates 844. The conditioning input to gates 844 is P19 line 319. Output lines 846 from gates 844 are connected as the inputs to memory address register (MAR) 848 (FIG. 5K).

Output lines 850 from the D field of MDR 690 (FIG. 5J) are connected as the information inputs to gates 852 (FIG. 5E), and 854 (FIG. 5K), 855 (FIG. 5Q) and 857. The conditioning input to gates 852 is output line 856 from OR gate 858. The inputs to OR gate 858 are E3 line 403 and E18 line 418. Output lines 860 from gates 852 are connected as the inputs to counter K 862. Counter 862 is reset to 1 by a signal on N1 line 351 and is incremented by a signal on N10 line 360. Counter K is decremented by a signal on output line 864 from OR gate 866. The inputs to OR gate 866 are E11 line 411 and E19 line 419. The output from counter 862 is applied through lines 868 to decoder 870 and as the information input to gate 869 (FIG. 5Q). Depending on the number recorded in counter K, decoder 870 generates an output signal on ONE of five output lines 871–875. Lines 871–875 are connected as inputs to gates 880, the conditioning input to these gates being N2 line 352. The outputs from gate 880 are lines 881–885. Lines 881 and 884 are connected as the inputs to OR gate 770 and lines 882 and 883 are connected as the inputs to OR gate 774. Line 882 is also connected as the increment input to YGN register 776 (FIG. 5F). Lines 883 and 884 are connected as the inputs to OR gate 888. Output line 890 from OR gate 888 is connected as the decrement input to the YGN register. Lines 881–884 are also connected as the inputs to OR gate 892. Output line 894 from OR gate 892 is connected as the input to the ZERO side of flip-flop 893. Output line 895 from the ZERO side of flip-flop 893 is connected as the information input to gate 896. Line 885 is connected as the ONE-side input to flip-flop 893, the ONE-side output 897 from this flip-flop being connected as the information input to gate 898. The conditioning input to gates 896 and 898 is $\overline{N2}$ line 352'. Output line 900 from gate 896 is connected to set the N3 single shot (FIG. 5A) to its ON state, and output line 902 from gate 898 is connected to set the N clock OFF flip-flop to its ON state (i.e., to reset the N clock).

The conditioning input to gate 782 (FIG. 5F) is S15 line 385, and the conditioning input to gate 792 is S16 line 386. The conditioning input to gates 784 and 790 is N4 line 354. Output lines 904 and 906 from gates 782 and 792 respectively, are connected as two sets of inputs to OR gates 908 (FIG. 5M). Output lines 910 and 912 from gates 784 and 790 respectively, are connected as the X address and Y address inputs to MAR 848 (FIG. 5K). Lines 910 and 912 are also the outputs from gates 914 (FIG. 5L) and 916 respectively. The information inputs to gates 914 are output lines 918 from START X register 920, and the information inputs to gates 916 are output lines 922 from START Y register 924. The START X and START Y registers are the registers in which the X and Y addresses respectively of the centralized position on the wafer to which the first element in the T list is to be assigned are stored. This may be a fixed address position, or addresses may be read into these registers through lines 926 and 928 respectively during substep 116 (FIG. 3A) of step 42 (FIG. 2) of the operation. The conditioning input to gates 914 and 916 is output line 930 from OR gate 932. The inputs to OR gate 932 are P1 line 301 and P7 line 307.

Figure 6C:
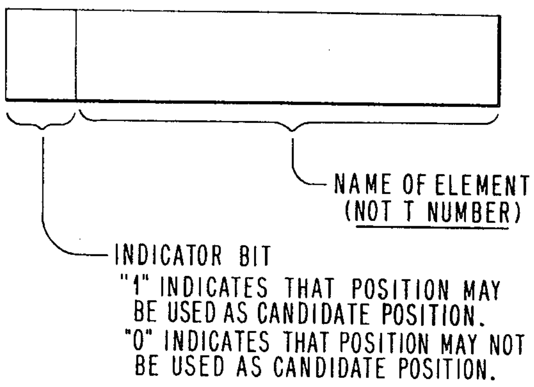

MAR 848 serves as the memory address register for M array core memory (MACM) 934. Memory 934 is a three dimensional memory the function of which has been described in previous sections. The format for an address position in MACM 934 is shown in FIG. 6C. Referring to this figure, it is seen that each work contains a 1 bit field which has a bit in it if the position is capable of being added to the list of candidate positions, and is set to ZERO otherwise this bit is also referred to as the indicator bit. The remaining positions of the word in MACM are reserved for storing the name of the element which is assigned to the corresponding position on the wafer. Output lines 936 from MAR 848 are connected as the address inputs to MACM 934, as the information input to gate 560, as the information inputs to gates 938 and 940, and as the information inputs to gates 540 and 712 (FIG. 5L). The conditioning input to gates 560 is N7 line 357. The conditioning input to gate 540 is P20 line 320, and the conditioning input to gate 712 is output line 942 from OR gate 944. The inputs to OR gate 944 and P8 line 308 and P20 line 320. The outputs from gates 560, 540, and 712, have previously been described. The conditioning input to gates 938 and 940 is N1 line 351. The outputs from gates 938 and 940 are the before-mentioned lines 762 and 762Y which form the inputs to XGN register 764 (FIG. 5E), and YGN register 766 (FIG. 5F) respectively.

Referring again to FIG. 5K, it is seen that a READ access to MACM 934 occurs when there is a signal on output line 946 from OR gate 948 and a WRITE access to MACM occurs when there is a signal on output line 950 from OR gate 952. The inputs to OR gate 948 are P2 line 302 and N5 line 355. The inputs to OR gate 952 are P8 line 308, P20 line 320, and N9 line 359. Information to be written into or read out of MACM 934 passes through lines 954 from memory buffer register (MBR) 956. The inputs to the element-designation portion of MBR 956 are output lines 958 from gates 854, and the set-to-0 input to the 1 bit field indicating whether the position may be used is output line 960 from OR gate 962. The conditioning input to gate 854 is output line 964 from OR gate 966. P7 line 307 and P10 line P19 are inputs to both OR gates 962 and 966. N7 line 357 is the final input to OR gate 962.

The contents of the 1 bit field of MDR 956 is applied through line 968 to the information input of gates 970 and 972, and through inverter 974 and line 976 as the information input to gates 978 and 980. The conditioning input to gates 970 and 978 is $\overline{N6}$ line 356' and the conditioning input to gates 972 and 980 is $\overline{P3}$ line 303'. Output line 982 from gate 970 and output line 984 from gate 978 are connected to set single shot N7 and single shot N10 respectively of N clock 350 (FIG. 5A) to their ON state. Output line 986 from gate 972 is connected to set single shot P4 to P clock 300 (FIG. 5A) to its ON state. Output line 990 from gate 980 is connected to generate an error indication, and is also connected as an input to OR gate 521 (FIG. 5A) causing the P clock OFF flip-flop to be set to its ON state.

Referring now to FIG. 5M, it is seen that the final set of inputs to OR gates 908 are output lines 992 from gates 994. Output lines 996 from OR gates 908 are connected as one set of inputs to subtracter 998. The other set of inputs to the subtracter are output lines 1000 from OR gates 1002. Subtracter 998 is of a type which generates, as an output, the obsolute value of the difference of the inputs applied to it. Output lines 1004 from subtracter 998 are connected as the information inputs to gates 1006, 1008, and 1010. The conditioning inputs to gates 1008 and 1010 are S15 line 385 and S16 line 386 respectively. Output lines 1012 and 1014 from gates 1008 and 1010 respectively, are connected as the inputs to FX register 1016 and GY register 1018. Output lines 1020 from FX register 1016 are connected as the information inputs to gates 994 and 1022. Output lines 1024 from GY register 1018 are connected as the information inputs to gates 1026 and 1028. The conditioning input to gates 994, 1006, and 1026 is S21 line 391. Output lines 1030 from gates 1026 are connected as one set of inputs to OR gates 1002 and output lines 1032 from gates 1006 are connected as the inputs to ΣDD1 accumulator 1034 (FIG. 5O).

Referring again to FIG. 5M, it is seen that the conditioning input to gate 1022 is S17 line 387 and the conditioning input to gate 1028 is S18 line 388. Gates 1022 and 1028 share common output lines 1036 which are connected as the inputs to squaring circuit 1038. Output lines 1040 from squaring circuit 1038 are connected as the information inputs to gates 1042 (FIG. 5N) and 1044. The conditioning inputs to gates 1042 and 1044 are S17 line 387 and S18 line 388 respectively. Output lines 1046 from gate 1042 are connected as the inputs to $X^2$ register 1048 and output lines 1050 from gates 1044 are connected as the inputs to $Y^2$ register 1052. Output lines 1054 from $X^2$ register 1048 are connected as the information inputs to gates 1056 and output lines 1058 from $Y^2$ register 1052 are connected as the information inputs to gates 1060. Output lines 1062 and 1064 from gates 1056 and 1060 respectively, are connected as the inputs to adder 1066. Output lines 1068 from adder 1066 are connected as the information inputs to gates 1070. The conditioning input to gates 1056, 1060, and 1070 is S19 line 389. Output line 1072 from gates 1070 are connected as the inputs to $SUM^2$ register 1074. Output lines 1076 from register 1074 are connected as the information inputs to gates 1078. Output lines 1080 from gates 1078 are connected as one set of inputs to multiplier 1082. The other set of inputs to multiplier 1082 are output lines 1084 from gates 1086. The information inputs to gates 1086 are output lines 1088 from WT register 1090 (FIG. 5P). Output lines 1092 from multiplier 1082 are connected as the information inputs to gates 1094. The conditioning input to gates 1078, 1086, and 1094 is S20 line 390. Output lines 1096 from gates 1094 are connected as the information inputs to ΣWXD1 accumulator 1098 (FIG. 5O).

Output lines 1100 from accumulator 1098 are connected as one set of inputs to compare circuit 1102 and as the information inputs to gates 1104. Output lines 1106 from ΣDD1 accumulator 1034 are connected as the information inputs to gates 1108, and as ONE set of inputs to compare circuit 1110 (FIG. 5P). The conditioning input to gates 1104 and 1108 is output line 1112 from OR gate 1114. The inputs to OR gate 1114 and S12 line 382 and S23 line 393. Output lines 1116 from gates 1104 are connected as the inputs to ΣWXD2 register 1118 and output lines 1120 from gates 1108 are connected as the inputs to ΣDD2 registers 1122. Output lines 1124 from register 118 are connected as the other set of inputs to compare circuit 1102. Compare circuit 1102 generates an output signal on line 1126 if the contents of register ΣWXD2 are greater than the contents of accumulator ΣWXD1, on line 1128 if the contents of register ΣWXD2 are less than the contents of accumulator ΣWXD1, and on line 1130 if the two inputs are equal. Lines 1126, 1128, and 1130 are connected as inputs to gates 1132–1134 respectively. The conditioning input to gates 1132–1134 is $\overline{S22}$ line 392'. Output lines 1136–1137 from gates 1132–1133 respectively, are connected as inputs to OR gates 1139 (FIG. 5P) and 1172 respectively. Output line 1138 from gate 1134 is connected to set single shot S24 of S clock 370 (FIG. 4A) to its ON state.

S1 line 371 is connected as the reset input to ΣWXD1 accumulator 1098 (FIG. 5O), ΣWXD2 register 1188, ΣDD1 accumulator 1034 and ΣDD2 resistor 1122 and as the input to the ZERO side of J flip-flop 1140. The input to the ONE side of J flip-flop 1140 is S13 line 383. Output line 1142 from the ONE side of the J flip-flop and output line 1144 from the ZERO side of this flip-flop are connected as the information inputs to gates 1146 and 1148 respectively. The conditioning input to gates 1146 and 1148 is $\overline{S11}$ line 381'. Output line 1150 from gate 1146 is connected to set the S22 single shot of S clock 370 to its ON state, and output line 1152 from gate 1148 is connected to set single shot S12 to its ON state.

Output lines 1154 from ΣDD2 register 1122 (FIG. 5O) are connected as the other set of inputs to compare circuit 1110 (FIG. 5P). A signal appears on output line 1156 from compare circuit 1110 when the contents of the ΣDD2 register are greater than those of the ΣDD1 accumulator. A signal appears on output line 1157 from compare circuit 1110 when the contents of the ΣDD2 register are less than the contents of the ΣDD1 accumulator, and a signal appears on line 1158 when the two inputs to compare circuit 1110 are equal. Lines 1156–1158 are connected as the information inputs to gates 1160–1162 respectively. The conditioning input to gates 1160–1162 is $\overline{S24}$ line 394'. Output line 1164 from gate 1160 is connected as the other input to OR gate 1139. Output line 1166 from OR gate 1139 is connected to set single shot S23 of S clock 370 (FIG. 5A) to its ON state. Output lines 1168 and 1170 from gates 1161 and 1162 respectively, are connected as the other inputs to OR gate 1172. Output line 1174 from OR gate 1172 is connected to set single shot S4 to its ON state.

Referring now to FIG. 5J, it is seen that output lines 1176 from the E field of MDR 690 are connected as the information inputs to gates 1178 (FIG. 5P), and output lines 1180 from the F field of MDR 690 are connected as the information inputs to gates 1182. The conditioning inputs to gates 1178 and 1182 is S14 line 384. Output lines 1184 from gates 1182 are connected as the inputs to the beforementioned WT register 1090. Output lines 1186 from gates 1178 divide to form lines 1186X and 1186Y which are connected as the inputs to XCB register 1188 and YCB register 1190 respectively. Output lines 1192 from XCB register 1188 are connected as the information inputs to gates 1194 and output lines 1196 from YCB register 1190 are connected as the information inputs to gates 1198. The conditioning inputs to gates 1194 and 1198 are S15 line 385 and S16 line 386 respectively. Gates 1194 and 1198 share common output lines 1200 which lines are connected as the other set of inputs to OR gates 1002 (FIG. 5M).

Referring now to FIG. 5Q, it is seen that the conditioning inputs to gates 855 and 857 are E3 line 403 and E11 line 411 respectively. Output lines 1202 from gates 855 are connected as the inputs to NAME Ti register 1204. Output lines 1206 from register 1204 are connected as the information inputs to gates 1208. The conditioning input to gates 1208 is E21 line 421. Output lines 1210 from gate 1208 are connected as the inputs to AGA accumulator 1212. Lines 1210 also serve as the outputs from gates 857, 1214, and 1216 (FIG. 5R). The conditioning input to gate 1214 is E20 line 420.

Referring now to FIG. 5G, it is seen that output lines 740 from E register 742 are connected as the information inputs to gates 1218 (FIG. 5Q). The conditioning input to gates 869 and 1218 is output line 1220 from OR gate 1222. The inputs to OR gate 1222 are E12 line 412 and E20 line 420. Output lines 1224 and 1226 from gates 869 and 1218 respectively, are connected as the inputs to multiplier 1228. Output lines 1230 from multiplier 1228 are connected as the information inputs to gates 1214 and 1232 (FIG. 5R). The conditioning input to gate 1232 is E12 line 412. Output lines 1234 from gates 1232 are connected as the inputs to AROW accumulator 1236. Output lines 1238 from AROW accumulator 1236 are connected as the information inputs to gates 1216. The conditioning input to gates 1216 is E13 line 413. AGA accumulator 1212 (FIG. 5Q) and AROW accumulator 1236 (FIG. 5R) are reset by a signal on output line 1240 from OR gate 1242 (FIG. 5Q). The inputs to OR gate 1242 are E10 line 410 and E17 line 417.

Output lines 1244 from AGA accumulator 1212 (FIG. 5Q) are connected as the information inputs to gates 1246 (FIG. 5L). The conditioning input to gates 1246 is output line 1248 from OR gate 1250. The inputs to OR gate 1250 and E14 line 414 and E22 line 422. Output line 1252 from gates 1246 are connected as the inputs to memory address register (MAR) 1254. Output lines 1256 from MAR 1254 are the address inputs to three-dimensional matrix memory 1258. Memory 1258 is the matrix memory mentioned in previous sections and is used to store the weights of the various connections. FIG. 6D shows the manner in which the addresses for the W matrix memory are laid out for a 14-by-14 array. Each word in the W matrix memory has only a single field in which the weight for the indicated connection is stored. A read access to W matrix memory 1258 is caused by a signal on output line 1260 from OR gate 1262. The inputs to OR gate 1262 are E15 line 415 and E23 line 423. Output lines 1264 from memory 1258 are connected as the inputs to memory buffer register (MBR) 1266. Output lines 1268 from MBR 1266 are connected as the information inputs to gates 1270 (FIG. 5R). The conditioning input to gates 1270 is output line 1271 from OR gate 1273. The inputs to OR gate 1273 are E16 line 416 and E24 line 424. Output lines 1272 from gates 1270 are connected as the inputs to SUM accumulator 1274. Output lines 1276 from SUM accumulator 1274 are connected as the information input to gates 716 and as the inputs to decoder 1278. The conditioning input to gates 716 is E25 line 425. The output from these gates has previously been described. Decoder 1278 generates an output signal on line 1280 when the contents of SUM accumulator 1274 are 0, and on line 1282 when the contents of SUM accumulator 1274 are other than 0. Lines 1280 and 1282 are connected as the information inputs to gates 1284 and 1286 respectively. The conditioning input to gates 1284 and 1286 is $\overline{E24}$ line 424'. Output line 1288 from gate 1284 is connected to set the E5 single shot of E clock 400 (FIG. 5A) to its ON state, and output line 1290 from gate 1286 is connected to set single shot E25 to its ON state.

OPERATION OF HARDWARE EMBODIMENT OF ASSIGNMENT SYSTEM

For the embodiment of the invention shown in FIG. 5A–5R, it is assumed that all clocks are initially off, all accumulators, registers and counters initially reset, and that AM No.1 memory 440 (FIG.5B) and AM No.2 memory 578 (FIG. 5H), are both empty. E register 742 (FIG. 5G) is then loaded with a number equal to the total number of elements to be placed on the wafer. X(MAX) register 798 (FIG. 5E) and Y (MAX) register 802 (FIG. 5F) are loaded with the highest X coordinant and the highest Y coordinate respectively on the wafer. Start X register 920 (FIG. 5L) and start Y register 924 are loaded with the X and Y address respectively of the centralized position on the wafer which the first element in the T list is to be assigned to. MACM 934 (FIG. 5K) has the one bit field of each of its memory positions (see FIG. 6C) loaded with either a 1 bit or a 1 bit indicating whether the corresponding position on the wafer is good or bad respectively. W matrix memory 1258 (FIG. 5L) has the weights fro the various connections read into it. The T list is stored in the C and D fields of AM No.2 (FIG. 5H). The manner in which these are performed is shown generally in FIG. 2 and described in more detail in conjunction with the description thereof.

When the above described initial variables have been loaded into the appropriate registers and memories, the system is ready to begin an assignment operation by applying a start pulse through line 332 (FIG. 5A) to P clock 300 to set the P1 single-shot to its ON state. When the P1 single-shot is in its ON state, a signal appears on line 301 which is applied to associative memory 440 (FIG. 5B) to reset the A field of all the words therein to 0, and is applied to associative memory 478 (FIG. 5H), to reset the A field of all the words therein to 0. The signal on line 301 is also applied through OR gate 586 and line 584 to associative memory 578 to reset the B field and F field of all the words therein to 0. Referring now to FIG. 5L, it is seen that the signal on line 301 is also applied through OR gate 932 and line 930 to condition gates 914 and 916 to apply the X and Y addresses respectively of the position on the wafer to which the first element in the T list is to be assigned to MAR 848 (FIG. 5K) of M array core memory (MACM) 934.

When the P1 single-shot times out, the P2 single-shot is set to its ON state. When the P2 single-shot is in its ON state a signal appears on line 302 which is applied through OR gate 948 (FIG. 5K) to line 946 to cause a read access of MACM. This results in the word stored at the address indicated in MAR, this word being the word stored at the address in MACM corresponding to the position on the wafer to which the first element in the T list is to be assigned, to be read out through lines 954 into memory buffer register (MBR) 956.

When single-shot P2 times out, single-shot P3 is switched to its ON state. Nothing happens while single-shot P3 is in its ON state. However, when single-shot P3 times out, a signal appears on line 303' which signal is applied as the conditioning input to gates 972 (FIG. 5K) and 980. The input to gate 972 is the contents of the one bit status field of MBR 956 and the input to gate 980 is the inverted contents of this field. Therefore, if the contents of this field is 0, indicating that the centralized position selected is not a usable position, inverter 974 is generating an output signal at this time which is applied through gate 980 to lines 990 to cause an ERROR signal to be generated. The signal on line 990 is also applied through OR gate 521, (FIG. 5A) to cause the P-clock-off flip-flop in P clock 300 (FIG. 5A) to be set to its ON state. If there is a 1 bit in the left-hand field of MBR at this time, the resulting signal on line 968 is applied through gate 972 to line 986 to cause the P4 single-shot to be set to its ON state allowing the normal sequence of operation to continue.

It can be seen that the above described sequence of operations checks to be sure that the position selected at which the first element in the T list is to be placed is in fact a usable position. If this position is manually determined, as assumed for this embodiment of the invention, then it should always be a good position except when an actual error in selecting the position arises. However, if a fixed point at the center of the array is always used as the centralized position, this position may frequently not be a good position. A possible scheme which may be employed when this situation arises will be discussed in the next section.

Assuming that the position selected for receiving the first element in the T list is a good position, single-shot P4 is now in its ON state. The resulting signal on P4 line 304 is applied to reset T counter 732 (FIG. 5G) to a count of 1. This indicates that the first element in the T list is being looked at. The signal on line 304 is also applied through OR gate 682 (FIG. 5H) and line 680 to reset argument mask 582 for AM No. 2 578 and through OR gate 700 (FIG. 5J) and line 698 to reset read mask 688 of this memory. When single-shot P4 times out, it causes single-shot P5 to be set to its ON state.

When single-shot P5 is in its ON state, the resulting signal on line 305 is applied through OR gate 640 (FIG. 5I) and line 638 to set flip-flop 634 to its ONE or READ state. This causes a signal to be applied through line 632 to controls circuit 620. The signal on line 305 is also applied through OR gate 686 (FIG. 5H) and line 684 to cause ones to be stored in the C field of argument mask 582 and through OR gate 704 (FIG. 5J) and line 702 to cause ones to be stored in the D field of READ mask 688. Finally, the signal on lines 305 is applied through OR gate 728 (FIG. 5G) and line 726 to condition gates 678 to pass the contents of T counter 732 through lines 676 to the C field of argument register 580 (FIG. 5H). The circuit is in this way set up to associate on the C field in AM No. 2 seeking a match on the T number in the T counter which at this time is T1 and to cause a read out of the D field of the matching entry which field contains the name of the first element in the T list. These operations are performed under control of AM No. 2 clock 588 (FIG. 5I). Therefore, when single-shot P5 times out the resulting signal on line 305' is applied through OR gate 590 and line 589 to start the AM No. 2 clock. Single-shot P6 is also set to its ON state by the timing out of single-shot P5.

The sole function of single-shot P6 is to test to determine if the operations controlled by the AM No. 2 clock have been completed. When the AM No. 2 clock is started, the OFF flip-flop in this clock is reset resulting in the absence of a signal on line 594 and the presence of a signal on line 608. Each time single-shot P6 times out, it tests to see whether there is a signal on line 594 or line 608 and, under control of gating circuitry in the P clock, causes single-shot P6 to be reset to its ON state if there is a signal on line 608 and causes single-shot P7 to be set to its ON state if there is a signal on line 594. The starting of clock 588 causes a signal on line 591 which is applied through OR gate 598 and line 652 to reset end-of-line flip-flop 650 to its ZERO state, and is also applied through OR gate 600 and line 618 to set the match indicators in control circuit 620 to their ONE state. There is a match indicator flip-flop for each word in associative memory 578. The signal on line 591 is followed by a signal on line 592 which is applied through OR gate 602 (FIG. 5H) and line 670 to cause an associate operation in associative memory AM No. 2. During this associate operation, the contents of the C field of the argument register are applied through argument mask 582 to associative memory 578 and, as the contents of this field pass through the memory, signals are applied through lines 646 for each word in the memory which has a C field which does not match the C field in the argument register to cause the corresponding match indicator to be reset to ZERO. At the end of the associate operation only the match indicator for the word in the associative memory having a T number of 1 to set to its ONE state. The signal on line 592 from clock 588 (FIG. 5I) is followed by a signal on line 593 which signal is applied through OR gate 604 and line 622 to apply an A pulse to controls 620. The A pulse passes through the control circuit until it finds the first match indicator which is set to its ONE state. Depending on the setting of flip-flop 634, the A pulse then causes either a read or a write operation for the corresponding word in memory 578. Since there is a signal on line 632 at this time, the A pulse causes a reading out of the memory word having a T No. of 1. This word is applied through lines 694 to read mask 688 (FIG. 5J) where all but the D field of this word are masked out. The D field of this word is passed through lines 696 to the D field of MDR 690. The signal on output line 593 from clock 588 (FIG. 5I) is followed by a signal on off-line 594 which is effective, the next time single-shot P6 times out, to cause single-shot P7 to be switched to its ON state.

When single-shot P7 is in its ON state, the resulting output signal on line 307 is applied through OR gate 932 (FIG. 5L) and line 930 to condition gates 914 and 916 to apply the address of the position on the wafer to which the first element in the T list is to be assigned to MAR 848 (FIG. 5K). The signal on line 307 is also applied through OR gate 966 (FIG. 5K) and line 964 to condition gates 854 to apply the element designation in the D field of MDR 690 (FIG. 5J) to MBR 956, and through OR gate 962 and line 960 to set the 1 bit status field in MBR 956 to 0. Finally, the signal on line 307 is applied through OR gate 724 (FIG. 5J) and line 722 to reset write mask 692. When single-shot P7 times out, single-shot P8 is set to its ON state.

When single-shot P8 is in its ON state, the resulting signal on line 308 is applied through OR gate 952, (FIG. 5K) and line 950 to cause a write access to MACM 934. This causes the name of the T1 element assigned to the centralized position on the wafer to be stored in the corresponding position in the M array, and also causes the status bit for this position to be set to 0 indicating that no other element may be assigned to this position. Except for some housekeeping operations which are now to be described, this effects a substantial completion of step 52 (FIG. 2) of the operation (i.e., the first step of the assignment system). The signal on line 308 is also applied through OR gate 944 (FIG. 5L) and line 942 to condition gates 712 to pass the address in MAR 848 through lines 710 to the E field of MDR 690 (FIG. 5J). The signal on line 308 is also applied to set the A and E fields of write mask 692 of 1 and through OR gate 708 and line 706 to set the A field of MDR 690 to 1. Referring now to FIG. 5I, it is seen that the signal on line 508 is applied through OR gate 644 and line 642 to set flip-flop 634 to its ZERO or WRITE state and, in preparation for a later operation, the signal on line 308 is applied through OR gates 532 and 544 (FIG. 5B) to reset argument register 496 and argument mask 528 respectively. When single-shot P8 times out, the resulting signal on line 308' is applied through OR gate 590 (FIG. 5I) to cause AM No. 2 clock 588 to be started thereby permitting final housekeeping entries to be made in associative memory 578 and is also applied through OR gate 366 (FIG. 5A) and line 364 to cause the N1 single-shot of N clock 350 to be set to its ON state. The starting of the N clock causes the step of adding new candidate positions to the list of candidate positions by the frontier choice method (i.e., step 54 of FIG. 2) to be initiated. Finally, the timing out of single-shot P8 causes single-shot P9 to be set to its ON state.

The sole function of single-shot P9 is to prevent further operations under the control of the P clock until the write operation controlled by AM No. 2 clock 588 and the add-new-candidates operation controlled by N clock 350 have been completed. Therefore, when single-shot P9 times out AND gate 609 (FIG. 5I) is fully conditioned to generate an output signal on line 611 causing single-shot P10 to be set to its ON state only if there are signals on both AM No. 2-clock-off line 594 and N-clock-off line 362. If either of these off-pulses is missing, inverter 613 generates an output signal on line 615 which in conjunction with the timing out of the P9 single-shot causes the P9 single-shot to be reset to its ON state.

The functions performed when signals appear on output lines 591 and 592 of the AM No. 2 clock are the same as those previously described when the clock was running during P6 time. However, the A pulse generated when there is a clock pulse on line 593 now finds a signal on write-line 636 (FIG. 5I) causing the contents of the A and E fields of MDR 690 (there are 1 bits in the write mask 692 only in these fields) to be written into the matched on memory position. Referring to FIG. 6B, it is seen that this causes the location which the T1 element was assigned to on the wafer to be written into the E field of the T1 memory position and causes the indicator bit in the A field to be set to 1 indicating that this element has now been placed on the wafer.

The manner in which the N clock functions to cause candidate positions to be added to the candidate position list in associative memory No. 1 (FIG. 5B) will now be described. Appendix II at the end of the specification and FIG. 4A may be referred to for assistance in understanding the operation of the N clock. When the N1 single-shot is set to its ON state, the resulting output signal on line 351 is applied through OR gate 548 (FIG. 5B) to set a 1 into the A field of argument mask 528, is applied to set the B field of write mask 556 (FIG. 5D) to 1 and through OR gate 568 to set the A field of this mask to 1, is applied to set the A field of MDR 462 to 1, and is applied through OR gate 470 and line 468 to set flip-flop 456 to its ZERO or WRITE state. The reason for these operations will be apparent later. The signal on line 351 is also applied to set K counter 862 (FIG. 5E) to a count of 1 and to condition gates 938 (FIG. 5K) and 940 to pass the X and Y addresses respectively in MAR 848 to XGN register 764 (FIG. 5E) and YGN register 766 (FIG. 5F). The operation just described corresponds to step 190 of FIG. 4A. When single-shot N1 times out, single-shot N2 is set to its ON state.

When single-shot N2 is in its ON state the resulting output signal on line 352 is applied to gates 880 (FIG. 5E) to gate the output from decoder 870 onto lines 881–885. Since counter 862 was just set to 1, decoder 870 is generating an output signal on line 871 at this time causing gate 880 to generate an output signal on line 881. The signal on line 881 is applied through OR gate 770 and line 768 to increment the contents of XGN register 764. This causes the system to look at the position one to the right of that to which the T1 element was assigned. This effectively performs the operations indicated in steps 192 and 194 in FIG. 4A. The signal on line 881 is also applied through OR gate 892 and line 894 to set flip-flop 893 to its ZERO state. When the N2 single-shot times out, the resulting signal on line 352′ is applied to condition gate 896 to pass the signal on ZERO-side output line 895 from flip-flop 893 onto line 900. This signal is applied to N clock 350 (FIG. 5A) to cause the N3 single-shot to be set to its ON state.

The contents of the XGN register (FIG. 5E) are applied as one input to compare circuit 778 the other input to this compare circuit being the contents of X(MAX) register 798. If the contents of the XGN register are greater than the contents of the X(MAX) register, a signal appears on line 804. Similarly the contents of the YGN register and the Y(MAX) register (FIG. 5F) are compared in compare circuit 788 and, if the contents of YGN register are greater, an output signal appears on line 810. A signal on either line 804 or 810 causes OR gate 806 to apply a signal through line 820 to the information input of gate 822 while the absence of a signal on both of these lines fully conditions AND gate 818 to generate an output signal on line 824 which is applied to the information input of gate 826. When the N3 single-shot times out, the resulting output signal on line 353′ is applied to condition gates 822 and 826. If gate 822 generates an output signal on line 828 indicating that the address contained in registers XGN and YGN is off the wafer, single-shot N10 is set to its ON state. As will be seen later, when single-shot N10 is in its ON state, K counter 862 (FIG. 5E) is incremented and the system returns to N2. If gate 826 is fully conditioned to generate an output signal on line 830, indicating that the address in registers XGN and YGN is on the wafer, single-shot N4 is set to its ON state. The operations performed when single-shot N3 is in its ON state are the same as those indicated for step 196 of FIG. 4A.

When single-shot N4 is in its ON state the resulting output signal on line 354 is applied to condition gates 784 (FIG. 5F) and 790 to pass the address in registers XGN and YGN to MAR 848 (FIG. 5K) of MACM. When single-shot N4 times out, single-shot N5 is switched to its ON state. When single-shot N5 is in its ON state the resulting signal on line 355 is applied through OR gate 948 (FIG. 5K) and line 946 to cause a read-access to MACM. This causes the contents of MACM for the address to the right of that to which the first element in the T list was assigned to be read out into MBR 956. When single-shot N5 times out, single-shot N6 is switched to its ON state. When single-shot N6 is in its ON state no operations are performed. However, when single-shot N6 times out the resulting output signal on line 356′ is applied to condition gates 970 (FIG. 5K) and 978. If the position which has just been read into MBR is a good one which has not already had an element assigned to it or been placed in the candidate position list, gate 970 is fully conditioned at this time to generate an output signal on line 982 which causes single-shot N7 to be set to its ON state. However, if the position to the right of that which the first element in the T list was assigned is a bad position (i.e., is not a useable position) or for some other reason cannot be added to the candidate position list, gate 978 is fully conditioned at this time to generate an output signal on line 984 which causes single-shot N10 to be switched to its ON state. As indicated previously, the switching of single-shot N10 to its ON state causes K counter 862 to be incremented with the system then returning to N2 time. The operations described above are equivalent to step 198 of FIG. 4A.

If it is determined that the position being looked at is a candidate position so that single-shot N7 is switched to its ON state, the resulting output signal on line 357 is applied through OR gate 962 (FIG. 5K) to line 960 to cause a 0 to be written into the status bit position of MBR 956. The signal on line 357 is also applied to condition gates 560 to pass the address in MAR 848 to the address fields (i.e., the B fields) of MDR 462 (FIG. 5D). When single-shot N7 times out the resulting signal on line 357′ is applied through OR gate 476 (FIG. 5C) and line 474 to start AM No. 1 clock 472. The timing out of single-shot N7 also causes single-shot N8 to be set to its ON state.

N8 merely serves to inhibit further operations under control of the N clock until the AM No. 1 clock has completed its cycle. It will be remembered that, during N1 time, flip-flop 456 (FIG. 5C) was set to its WRITE state, a 1 was gated into the A field of the MDR of AM No. 1, and 1's were gated into the A and B fields of the write mask of AM No. 1. At this time, MDR 462 therefore contains a 1 bit in its A field and the address which has just been checked out in its B field. The starting of AM No. 1 clock 472 causes a signal on line 481 which is applied to reset end-of-line flip-flop 460 and through OR gate 452 and line 450 to set the match indicators in control circuit 444 to their ONE state. The signal on line 481 is followed by a signal on line 482 which is applied through OR gate 492 (FIG. 5B) to cause an associate operation of memory 440. Since the A field of the argument register is 0 at this time, all positions in memory 440 which have a 0 A field, which at this time will be all the memory positions in AM No. 1 match, and therefore all of the match indicators in controls 444 remain in their ONE state. The signal on line 482 is followed by a signal on line 483 which causes an A pulse to be applied to controls 444. This pulse finds the match indicator for the first memory position in its ONE state and, since flip-flop 456 is in its ZERO or WRITE state, causes the previously set conditions of MDR 462 to be written into this memory position. The operation just described is equivalent to step 202 of FIG. 4A. The signal on line 483 is followed by a signal on line 484. The signal on line 484 is applied to the N clock, and is ANDED in the N clock with the signal resulting from the timing out of the N8 single-shot to cause the N9 single-shot to be set to its ON state.

When the N9 single-shot is in its ON state, the resulting output signal on line 359 is applied through OR gate 952 (FIG. 5K) to line 950 to cause a write access to MACM 934. Since the status bit in MBR was set to 0 during N7 time, the write access at N9 time is effective to cause a 0 bit to be written into the status bit field of the M-array address just placed as a candidate position in AM No. 1. The effect of this operation is to prevent this position from being added to the list of candidate positions a second time. When the N9 single-shot times out, the N10 single-shot is set to its ON state.

When the N10 single-shot is in its ON state, the resulting output signal on line 360 is applied to increment K counter 862 (FIG. 5E). Assuming that this counter was initially reset to 1, it will be incremented to a count of 2 at the first N10 time. When the N10 single-shot times out, the N2 single shot is reset to its ON state. When the N2 single-shot now applies a signal to line 352 to condition gates 880 (FIG. 5E) it finds a signal on line 882 which is applied through OR gate 774 to decrement the contents of the XGN register, and is also applied to increment the contents of the YGN register. The effect of this operation is to cause the system to look at the position directly above the position to which the T1 element was assigned. The system then proceeds through clock time N3–N10 to perform the required tests on this memory position and to store the address of this position in the second word of AM No. 1 if it is found to be an acceptable candidate position. At N10 time the K counter is again incremented to a count of three and the system returned to N2 time. With a count of three in K counter 862 there is a signal on line 883 at N2 time which is applied through OR gate 774 to decrement the contents of the XGN register and is also applied through OR gate 888 to decrement the contents of the YGN register. This causes the position directly to the left of the position to which the first element in the T list was assigned to be checked and its address to be stored in the third word of AM No. 1 if it is found to be an acceptable candidate position. At N10 time counter K is again incremented resulting in a signal on line 884 at the following N2 time. The signal on line 884 is applied through OR gate 770 to increment the contents of the XGN register, and through OR gate 888 to decrement the contents of the YGN register. The effect of this operation is to cause the position directly below that to which the first element in the T list was assigned to be checked and its address to be stored in the fourth word of AM No. 1 if it is found to be a candidate position. At N10 time counter K is again incremented causing a signal on line 885 at the following N2 time. The signal on line 885 is applied to set flip-flop 893 to its ONE state. The resulting signal on line 897 is applied as the information input to gate 898. Therefore, when the N2 single-shot times out, the resulting output signal on line 352' fully conditions gate 898 to generate an output signal on line 902 which is applied to set the N-clock-off flip-flop to its ONE state. The next time that the P9 single-shot times out, causing a signal on line 309', the signals on lines 309', 362, and 594 are effective to fully condition AND gate 609 (FIG. 5I) to generate an output signal on line 611 which is applied to set single shot P10 of P clock 300 (FIG. 5A) to its ON state.

The system is now ready to check to see if any candidate positions are stored in AM No. 1. This is equivalent to step 56 of FIG. 2. As preliminary steps in this operation, when single-shot P10 is in its ON state the resulting signal on line 310 is applied through OR gate 466 (FIG. 5C) and line 464 to set flip-flop 456 to its ONE or READ state, is applied through OR gate 536 (FIG. 5B) and line 534 to set a 1 into the A field of argument register 496 and is applied through OR gate 548 and line 546 to store a 1 in the A field of argument mask 528. The remaining positions of the argument mask have previously been reset to 0. When single shot P10 times out, the resulting signal on line 310' is applied through OR gate 476 (FIG. 5C) and line 474 to start AM No. 1 clock 472, and is also applied to set single-shot P11 to its ON state.

The sole function of single-shot P11 is to prevent further operation under control of the P clock until the operation controlled by the AM No. 1 clock have been completed. Therefore, if there is a signal on line 488 (FIG. 5C) indicating that the AM No. 1 clock is still running when single-shot P11 times out, single-shot P11 is restarted. During P11 time the AM No. 1 clock functions in a manner previously described to reset the end of line flip-flop to ZERO and the match indicators in controls 444 to ONE, to cause an associate operation on a 1 bit A field, and to apply an A pulse to the control circuit to check to see if there were any matches during the associate operation. If there were matches during the associate operation, this means that there are entries in the candidate list in AM No. 1, while if there were no matches it means that there were no candidates in this list. If there are no matches, the A pulse passes through line 490 to set end-of-line flip-flop 460 to its ONE state. When all operations under control of the AM No. 1 clock have been completed, a signal appears on AM No. 1-clock-off line 484. This signal is applied to P clock 300 (FIG. 5A) to, in conjunction with the timing out of single-shot P11, cause single-shot P12 to be set to its ON state.

No operations are performed while single-shot P12 is in its ON state. However, when single-shot P12 times out, the resulting output signal on line 312' is applied to the conditioning input of gates 500 (FIG. 5C) and 508 thereby testing the state of end-of-line flip-flop 460. If this flip-flop is in its ZERO state indicating that there are candidate positions stored in AM No. 1, gate 508 generates an output signal on line 516 at this time which is applied to set single-shot P13 to its ON state. If, however, there is an output signal on line 512 from gate 500 at this time, this signal is passed through OR gate 514 to line 520 to indicate that an error condition has occurred. The signal on line 520 is also applied through OR gate 521 (FIG. 5A) to line 513 to set the P-clock-off flip-flop in P clock 300 to its ON state. Step 58 of FIG. 2 indicates one possible operation which may be performed when an ERROR signal appears on line 520. Other possible operations which may be performed at this point will be described later.

Having assigned the first element in the T list to a position in the M array, the system is now ready to assign the second element in the T list to a position in the M array adjacent to that which the first element in the T list was assigned. For purposes of illustration, the position selected is the first position stored in AM No. 1. As a preliminary step in performing the operations described above, when single-shot P13 is in its ON state the resulting output signal on line 313 is applied through OR gate 736 (FIG. 5G) and line 734 to increment T counter 732 to a count of two. When single-shot P13 times out, single-shot P14 is set to its ON state.

When single shot P14 is in its ON state, the resulting output signal on line 314 is applied through OR gate 576 (FIG. 5D) to set 1's into the B fields of read mask 554 and is also applied through OR gate 466 (FIG. 5E) and line 464 to set flip-flop 456 to its ONE or READ state. When single-shot P14 times out, the resulting signal on line 314' is applied through OR gate 476 (FIG. 5C) and line 474 to start AM No. 1 clock 472 and is also applied to set single-shot P15 to its ON state.

Single shot P15 merely serves to prevent further operations under control of the P clock until the operations controlled by the AM No. 1 clock have been completed. Therefore, if there is a signal on line 488 when single-shot P15 times out, single-shot P15 is reset to its ONE state. The AM No. 1 clock functions in a manner previously described to initially reset end-of-line flip-flop 460 and set the match indicators in control 444 to their ONE state, to cause an associate operation on the A field resulting in all of the match indicators except those corresponding to storage positions having a ONE bit in their A field being reset, and causing an A pulse to be applied to controls 444 which, in conjunction with the READ signal on line 454 from flip-flop 456 causes the contents of the first memory position which was matched on during the associate operation to be read out through lines 570 to read mask 554 (FIG. 5D). The read mask passes the B field of this word into MDR 462. When AM No. 1 clock 472 has completed its operations, the resulting output signal on line 484 is applied to P clock 300 to cause single-shot P16 to be set to its ON state the next time that single-shot P15 times out.

When single-shot P16 is in its ON state, the resulting output signal on line 316 is applied to condition gates 758 (FIG. 5E) to pass the address in the B fields of MDR 462 to GN final register 840. When single-shot P16 times out, single-shot P17 is set to its ON state.

When single-shot P17 is in its ON state, the resulting output signal on line 317 is applied through OR gate 728 (FIG. 5G) and line 726 to condition gates 678 to pass the contents of the T counter into the C field of argument register 580 (FIG. 5H). The signal on line 317 is also applied through OR gate 640 (FIG. 5I) and line 638 to set flip-flop 634 to its ONE or READ state. It should be remembered that at P5 time the argument mask of AM No. 2 was set to block all except the C field and the READ mask for AM No. 2 was set to block all except the D field. When P17 times out, the resulting output signal on line 317' is applied through OR gate 590 and line 589 to start AM No. 2 clock 588. Single-shot P18 is also set to its ON state when single-shot P17 times out.

The sole function of single-shot P18 is to prevent further operations under control of the P clock until the operations controlled by the AM No. 2 clock have been completed. Therefore, as long as there is a signal on line 608, each time single-shot P18 times out, it is reset to its ON state. The AM No. 2 clock operates, during P18 time, in a manner identical to the manner in which it operated during P6 time to cause the name of the element whose P number had been read into the C field of argument register 580 to be read out into the D field of MDR 690. The name of the second element in the T list is in this manner stored in the D field of MDR 690. When AM No. 2 clock 588 has completed its cycle of operation, the resulting output signal on line 594 is applied to P clock 300. The next time that single-shot P18 times out, this signal causes single-shot P19 to be set to its ON state.

When single-shot P19 is in its ON state the resulting output signal on line 319 is applied to condition gates 844 (FIG. 5E) to pass the address in GN final register 840 (i.e., the address of the position on the wafer to which the second element in the T list is to be assigned) through lines 864 to MAR 848 (FIG. 5K) of MACM. The signal on line 319 is also applied through OR gate 966 to condition gates 854 to pass the element designation in the D field of MDR into the right-hand field of MBR 956 and through OR gate 962 and line 960 to set a 0 into the left-hand field of MBR 956. In preparation for later operations, the signal on line 319 is also applied to reset write mask 566 (FIG. 5D) and through OR gate 544 (FIG. 5B) and line 542 to reset argument mask 528. When single-shot P19 times out, single-shot P20 is set to its ON state.

When single-shot P20 is in its ON state, the resulting signal on line 320 is applied through OR gate 952 (FIG. 5K) and line 950 to cause a write access to MACM 934. The second element in the T list is in this manner assigned to the desired position in the M array. The remaining operations which are performed during P20 time are in preparation for storing the information as to the position in which the second element in the T list is stored in AM No. 2 and for indicating in AM No. 1, that the position just used is no longer an available candidate position. To effect these operations, the signal on line 320 is applied to condition gates 540 (FIG. 5L) and through OR gate 944 to condition gates 712 to pass the address in MAR 848 to the B fields of argument register 496 (FIG. 5B) and the E field of MDR 690 (FIG. 5J) respectively. The signal on line 320 is also applied through OR gate 708 (FIG. 5J) to set a 1 into the A field of MDR 690, to set 1 bits into the B field of argument mask 528 (FIG. 5B) to reset MDR 462 (FIG. 5D) to OR gate 568 (FIG. 5D) to set a 1 into the A field of write mask 556, through OR gate 470 (FIG. 5C) to set flip-flop 456 to its ZERO or WRITE state, and through OR gate 644 (FIG. 5I) to set flip-flop 634 to its ZERO or WRITE state. When single-shot P20 times out, the resulting output signal on line 320' is applied through OR gate 476 to start AM No. 1 clock 472, through OR gate 590 to start AM No. 2 clock 588 and through internal circuitry in the P clock to set single-shot P21 to its ON state.

The sole function of single-shot P21 is to inhibit further operations under the control of the P clock until the operations under control of the AM No. 1 and AM No. 2 clocks have been completed. Therefore, the AM No. 1 and AM No. 2 clock-off lines, 484 and 594 respectively, are connected as two inputs to AND gate 610 (FIG. 5I). Each time single-shot P21 times out, a signal is applied through line 321' to the third input of AND gate 610 thereby testing the gate to determine of clocks 472 and 588 have completed their operation. If they have not, a signal appears on line 616 which is applied to P clock 300 to cause single-shot P21 to be reset to its ON state. During P21 time, the AM No. 1 clock functions in a manner previously described to cause a 0 bit to be written into the A field of the memory position which has just had an element assigned to it. This indicates that this position is no longer an acceptable candidate position. During P21 time, the AM No. 2 clock functions in a manner previously described to store the position to which the second element in the T list has been assigned in the E field of the memory word for that entry and to write a 1 bit into the A field of this word indicating that the corresponding element has been assigned. When the functions performed by clocks AM No. 1 and AM No. 2 have been completed, signals appear on lines 484 and 594 which, on the timing out of single-shot P21, fully condition AND gate 610 to generate an output signal on line 612 which is applied to P clock 300 to set single-shot P22 to its ON state.

In this point in the operation a determination is made as to whether there are any more elements to be placed. This is the determination made during step 70 of FIG. 1. As a preliminary to this operation, when single-shot P22 is in its ON state, the resulting output signal on line 322 is applied through OR gates 544 (FIG. 5B) to reset argument mask 528 and through OR gate 532 to reset argument register 496. When single-shot P22 times out, the resulting output signal on line 322' is applied as a conditioning input to gates 748 (FIG. 5G) and 750. The inputs to these gates are the equal and not-equal output lines respectively from compare circuit 738. Compare circuit 738 is comparing the count in T counter 732 with the total number of elements to be stored in E register 742. Therefore, if all elements have been assigned, there is an output on equal line 744 at this time causing gate 748 to apply a signal to line 752 which signal indicates the end of the operation and resets the P clock. However, at this time, it is assumed that these two counts are not equal and, therefore, that there is an output signal on line 754 from gate 750 which is applied to set single shot P23 in the P clock to its ON state and through OR gate 366 (FIG. 5A) to set single shot N1 to its ON state.

The sole function of single shot P23 is to prevent further operations under control of the P clock until the add-new-candidate-positions under control of the N clock has been completed. Therefore, as long as there is no signal applied to P clock 300 through N-off line 362, single shot P23 is reset to its ON state each time it times out. During P23 time, the N clock functions to test the positions adjacent to the position to which the second element in the T list was assigned, to determine how many of these positions is a useable position which has not already been used or already assigned to the candidate position list in AM No. 1. The coordinates of each suitable candidate position are stored in AM No. 1. The manner in which this is accomplished has been previously described and will not be described again except to point out that, during N6 time when the left hand bit in MBR 956 (FIG. 5K) of MACM is being tested, a 0 in this position may mean that any one of the three contingencies mentioned above has occurred. A quick understanding of the functions performed under control of the N clock may be obtained by reference to Appendix II. When all good neighbors have been added to associative memory 440, there is a signal on N-off line 362 which is applied to P clock 300 to, when single shot P23 times out, cause single shot P24 to be set to its ON state.

The operations performed during P24, P25, and P26 time are concerned with determining whether there are any candidate positions in AM No. 1 (i.e., step 56 of FIG. 2). To accomplish this, when single shot P24 is in its ON state, the resulting output signal on P24 line 324 is applied through OR gate 536 (FIG. 5B) to set the A field of the argument register to a 1 bit, through OR gate 548 to set the A field of argument mask 528 to a 1 bit, and through OR gate 466 (FIG. 5C) to set flip-flop 456 to its ONE or READ state. When single shot P24 times out, the resulting signal on line 324' is applied through OR gate 476 to start AM No. 1 clock 472 and is also applied internally to the P clock to set single shot P25 to its ON state.

The only function of single shot P25 is to inhibit further operations under control of the P clock until the operations under control of the AM No. 1 clock have been completed. The signal on output line 488 from inverter 486 (FIG. 5C) is therefore applied to P clock 300 (FIG. 5A) to cause single shot P25 to be reset on its ON state each time the single shot times out. During P25 an associate operation is performed seeking a match on a 1 bit in the A field and an A pulse is then applied to controls 444 (FIG. 5C) to test if any matches have been found. If a match has been found, meaning that there are candidate positions in AM No. 1, end-of-line flip-flop 460 is left in its ZERO state, while if no matches are found, meaning that there are no candidate positions in AM No. 1, the A pulse passes through controls 444 to cause a signal on line 490 which switches end-of-line flip-flop 460 to its ONE state. When AM No. 1 clock 472 has completed its cycle of operation, a signal appears on line 484 which signal is applied to P clock 300 (FIG. 5A) to cause, in the conjunction with the timing out of single shot P25, single shot P26 to be set to its ON state.

No operations are performed when single shot P26 is in its ON state. However, when single shot P26 times out, the resulting output signal on line 326' is applied as the conditioning input to gates 501 (FIG. 5C), and 509. If there are candidate positions in AM No. 1 so that end-of-line flip-flop 460 is in its ZERO state at this time, gate 509 generates an output signal on line 522 which is applied to P clock 300 (FIG. 5A) to cause single shot P27 to be set to its ON state. However, if, at this time, there are no candidate positions in AM No. 1, end-of-line flip-flop 460 is in its ONE state causing gate 501 to generate an output signal on line 518 which is applied through OR gate 514 to line 520 to cause an error indication to be generated. The signal on line 520 is also applied through OR gate 521 (FIG. 5A) to cause the P-clock-off flip-flop in P clock 300 to be set to its ON state. As indicated previously, step 58 of FIG. 2 may be performed when an error signal is received on line 520 or one of several other operations to be described later may be performed.

If there are candidate positions in AM No. 1, the system is ready to find and place the next element in the T list. The first step in this operation is to find the next element in the T list (i.e., step 60 of FIG. 2). As the first step in this operation, when single shot P27 is in its ON state, the resulting signal on line 327 is applied through OR gate 736 (FIG. 5G) and line 734 to increment T counter 732 to a count of three. The signal on line 327 is also applied to OR gates 682 (FIG. 5H) and 700 (FIG. 5J) to reset argument mask 582 and read mask 688 respectively. When single shot P27 times out, the resulting output signal on line 327' is applied to E clock 400 (FIG. 5A) to set the E1 single shot thereof to its ON state. The timing out of single shot P27 is also effective to set single shot P28 to its ON state.

The primary function of single shot P28 is to inhibit further operations under control of the P clock until the find-connected-elements step under the control of the E clock has been completed. Therefore, in the absence of a signal on E clock-off line 428, each time single shot P28 times out, it is effective to restart itself.

The operations performed under control of the E clock are those during step 62 of FIG. 2. Appendix IV illustrates, in chart form, the turn-on conditions for each of the single shots of the E clock and the functions performed when the single shot is in its ON state and when it times out. This chart may be referred to in conjunction with FIG. 4C the following description to assist in gaining a full understanding of the steps performed under control of the E clock. When single shot E1 is in its ON state, the resulting output signal on line 401 is applied through OR gate 586 (FIG. 5H) to line 584 to reset the B and F fields of all memory positions in AM No. 2. Referring to FIG. 6B, it is noted that a bit in the B field indicates that the corresponding element is connected to the T element which is now being assigned, and the F field gives the weight of this connection. The signal on line 401 is also applied through OR gate 728 (FIG. 5G) to condition gates 678 to pass the contents of T counter 732 into the C field of argument register 580 (FIG. 5H). The signal on line 401 is also applied through OR gate 686 to set the C field of argument mask 582 to 1's, through OR gate 704 (FIG. 5J) to set the D field of the read mask to 1's, and through OR gate 640 (FIG. 5I) to switch flip-flop 634 to its ONE or READ state. Since the argument and read mask have previously been reset to 0, fields other than those described above contain all 0's at this time. When the E1 single shot times out, the resulting signal on $\overline{E1}$ line 401' is applied through OR gate 590 (FIG. 5I) to start AM No. 2 clock 588. The timing out of single shot E1 also causes single shot E 2 to be set to its ON state.

The sole function of single shot E2 is to inhibit further operations under the control of the E clock until the readout operation under control of AM No. 2 clock 588 has been completed. The signal on output line 608 from inverter 606 is therefore, applied to E clock 400 to cause the E2 single shot to be reset to its ON state each time it times out. During E2 time the entry in AM No. 2 having a C field with a T number matching that in the C field of argument 580 is located, and the D field of this entry is read out into MDR 690 in a manner previously described. When this operation has been completed, a signal appears on AM No. 2 clock-off line 594, which signal is applied to E clock 400 to cause the E3 single shot to be set to its ON state the next time that the E2 single shot times out.

When single shot E3 is in its ON state, the resulting output signal on line 403 is applied as a conditioning input to gate 855 (FIG. 5Q) and through OR gate 858 (FIG. 5E) as a conditioning input to gate 852 to permit these gates to pass the contents of the D field of MDR 690 (i.e., the name of the P element now being looked at) into name Ti register 1204 and K counter 862 respectively. The signal on line 403 is also applied through OR gate 682 (FIG. 5H) to reset argument mask 582. When single shot E3 times out, single shot E4 is set to its ON state.

When single shot E4 is in its On state, the resulting output signal on line 404 is applied to set a 1 into the A field of argument mask 582 (FIG. 5H), to set a 1 into the A field of argument register 580, through OR gate 640 (FIG. 5I) to set flip-flop 634 to its ONE or READ state, through OR gate 598 to reset end-of-line flip-flop 650 to its ZERO state, and through OR gate 600 to reset the match indicators in AM No. 2 controls 620 to their ONE state. When single shot E4 times out, single shot E5 is set to its ON state. When single shot E5 is in its ON state, a signal is applied through OR gate 602 (FIG. 5H) to cause an associate operation in AM No. 2. This causes the match indicators for all positions in AM No. 2 which store elements not yet assigned position in the M array to be reset to ZERO and leave the match indicators for the positions storing elements that have been assigned to positions in the M array in their ONE state. When single shot E5 times out, single shot E6 is set to its ON state. When single shot E6 is in its ON state, the resulting output signal on line 406 is applied through OR gate 604 to apply an A pulse to controls 620. The A pulse applied to controls 620 is effective to cause the name of the first element in associative memory 578 which has been assigned a position in the M array to be read out into the D field of MDR 690 (FIG. 5J). When single shot E6 times out, single shot E9 is set to its ON state.

No operations are performed when single shot E9 is in its ON state. However, when single shot E9 times out, the resulting signal on line 409' is applied as a conditioning input to gates 658 and 659 (FIG. 5I). If all the entries in AM No. 2. having elements which have already been assigned in the M array have been looked at to determine their relationship to the T element which is about to be assigned, then the A pulse applied to line 622 during E6 time would have set end-of-line flip-flop 650 to its ONE state, and gate 658 would be fully conditioned at this time. When gate 658 is conditioned, the resulting output signal on line 666 is applied to reset the E clock by setting the E-clock-off flip-flop to its ON state. This indicates that the find-connected-elements operation is over. However, at this stage in the operation, it is assumed that there are still elements to be looked at and that the end of line flip-flop is, therefore, in its zero state. Under these conditions, gate 659 is fully conditioned when single shot E9 times out causing an output signal on line 668 which is applied to set single-shot E10 to is ON state.

When single shot E10 is in its ON state, the resulting output signal on line 410 is applied to rest SUM accumulator 1274 (FIG. 5R) and through OR gate 1242 (FIG. 5Q) and line 1240 to reset AGA accumulator 1212 and AROW accumulator 1236. When single shot E10 times out, single shot E11 is set to its ON state. When single shot E11 is in its ON state, the resulting output signal on line 411 is applied to condition gates 857 (FIG. 5Q) to pass the name of the element which has already been assigned a position in the M array, which name has just been read into the D field of MDR, through lines 1210 into AGA accumulator 1212. The signal on line E11 is also applied through OR gate 866 (FIG. 5E) to decrement the contents of K counter 862. It will be remembered that the name of the T element which is now to be assigned was previously stored in this counter. When single shot E11 times out, single shot E12 is set to its ON state.

When single shot E12 is in its ON state, the resulting output signal on line 412 is applied through OR gate 1222 (FIG. 5Q) to condition gates 869 and 1218 to pass the contents of K counter 862 (FIG. 5E) and E register 742 (FIG. 5G) respectively into multiplier 1228. It will be remembered that the E register contains the total number of elements which are to be assigned positions in the M array. The signal on E12 line 412 is also applied to condition gates 1232 (FIG. 5R) to pass the output from the multiplier through lines 1234 into AROW accumulator 1236. Therefore, at the end of T12 time, accumulator 1236 contains a number which is equal to the number of the element which is to be assigned a position in the M array, minus one, times the total number of elements to be assigned. When single shot E12 times out, single shot E13 is set to its ON state. When single shot E13 is in its ON state, the resulting signal on E13 line 413 is applied to condition gate 1216 (FIG. 5R) to pass the previously described quantity in AROW accumulator 1236 into AGA accumulator 1212. It will be remembered that this accumulator previously contained the number of the element whose relationship to the element to be assigned is being investigated. Therefore, st the end of E13 time, accumulator AGA contains a quantity which is equal to:

$$C1 + (C2-1)\,E$$

where C1 is a numerical designation of the name of the element whose relationship to the element being placed is being investigated;

C2 is a numerical designation of the name of the element to be assigned; and

E is a number equal to the total number of elements to be assigned.

When single shot E13 times out, single shot E14 is set to its ON STATE. When single shot E14 is in its ON state, the resulting signal on line 414 is applied through OR gate 1250 (FIG. 5L) and line 1248 to condition gates 1246 to pass the above described quantity in accumulator AGA (FIG. 5Q) into MAR 1254. This quantity therefore serves as an address input to W matrix memory 1258. When single shot E14 times out, single-shot E15 is set to its ON state. When single shot E15 is in its ON state, the resulting output signal on E15 line 415 is applied through OR gate 1262 (FIG. 5L) to line 1260 to cause a read access to W matrix memory 1258. This results in the weight at the address indicated in the W matrix being read into MBR 1266. There may be some question as to whether the formula presented above will in fact give the address at the desired intersection. To prove that it does, assume, with reference to FIG. 6D, that is is desired to assign element No. 5 and that the element whose relationship is being investigated is element No. 2. It is seen that E for this example is 14, C1 is 2, and C2 is 5. Plugging these numbers into the formula, it is seen that the resulting address is 58. From FIG. 6D, it is seen that the address at the intersection of row 5 and column 2 is in fact 58. When single shot E15 times out, single shot E16 is set to its ON state.

When single shot E16 is in its ON state, the resulting output signal on line 416 is applied through OR gate 1273 (FIG. 5R) to condition gates 1270 to pass the weight in MBR 1266 through lines 1272 to a sum accumulator 1274. When single shot E16 times out, single shot E17 is set to its ON state. When single shot E17 is in its ON state, the resulting output signal on line 417 is applied through OR gate 1242 (FIG. 5Q) to line 1240 to reset accumulators 1212 and 1236 (FIG. 5R). When single shot E17 times out, single shot E18 is set to its ON state.

When single shot E18 is in its ON state, the resulting output signal on line 418 is applied through OR gate 858 (FIG. 5E) to condition gates 852 to pass the contents of the D field of MDR 690 (FIG. 5J), which field contains the element designation which has previously been identified as C1, into K counter 862. When single shot E18 times out, single shot E19 is set to its ON state. When single shot E19 is in its ON state, the resulting output signal on line 419 is applied through OR gate 866 to line 864 to decrement the count in counter K by one. This leads to value C1−1 in counter K. When single shot E19 times out, single shot E20 is set to its ON state. When single shot E20 is in its ON state, the resulting output signal on E20 line 420 is applied through OR gate 1222 (FIG. 5Q) to condition gates 869 and 1218 to pass the contents of K counter 862 and E register 742 (FIG. 5G) respectively into multiplier 1228. The signal on E20 line 420 is also applied to condition gates 1214 to pass the output from the multiplier into AGA accumulator 1212. The quantity E (C1−1) is thus stored in the AGA accumulator. When single shot E20 times out, single shot E21 is set to its ON state. When single shot E21 is in its ON state, the resulting output signal on line 421 is applied to condition gate 1208 to pass the contents of name Ti register 1204 into accumulator AGA. The effect of this operation is to add the name of the element which is presently to be assigned, which name was previously stored in name Ti register 1204, to the quantity previously in the AGA accumulator. The resulting quantity has the formula:

$$C2 + (C1-1)E$$

where the values have the same significance described above. When single shot E21 times out, single shot E22 is set to its ON STATE.

When single shot E22 is in its ON state, the resulting output signal on line 422 is applied through OR gate 1250 (FIG. 5L) to condition gates 1246 to pass the quantity in AGA 1212 into MAR 1254. When single shot E22 times out, single shot E23 is set to its ON state. When single shot E23 is in its ON state, the resulting output signal on line 423 is applied through OR gate 1262 to line 1260 to cause a read access to W matrix memory 1258. This results in the weight at the address which was stored in MAR 1254 being read out into MBR 1266. Referring again to FIG. 6D, it is seen that the formula described above gives a value of 19 which is exactly the address at the intersection of the second row and the fifth column. The addresses at both intersections of the two elements being considered have therefore both been derived. When single shot E23 times out, single shot E24 is set to its ON state. When single shot E24 is in its ON state, the resulting output signal on line 424 is applied through OR gate 1273 to condition gate 1270 to pass the weight in MBR 1266 into SUM accumulator 1274. The effect of this operation is to add the weight just retrieved to the weight previously retrieved giving a total weight for the connection being looked at. As a preliminary to future operations, the signal on E24 line 424 is also applied through OR gate 724 (FIG. 5J) to reset write mask 692. When single shot E24 times out, the resulting output signal on line 424' is applied to condition gates 1284 and 1286 (FIG. 5R). If the quantity in SUM register 1274 at this time is 0, this means that the sum of the weights between the next element to be assigned and the element being considered is 0, or, in other words, that these two elements are not connected to each other. Under these conditions, gate 1284 is fully conditioned at this time to generate an output signal on line 1288 which is applied to E clock 400 (FIG. 5A) to cause single shot E27 to be set to its ON state. The operations which are performed when the E27 single shot is in its ON state will be described shortly. If there is a weight other than 0 in SUM register 1274 when single shot E24 times out, decoder 1278 is generating an output signal on line 1282 which is applied to fully condition gate 1286 to generate an output signal on line 1290. The signal on line 1290 is applied to set single shot E25 to its ON state.

Referring for a moment to FIG. 6B, it is seen that the B field of each word in AM No. 2 is used to indicate that the element is connected to the next element which is to be assigned and the F field is used to indicate the total weight between the element and the next element to be assigned. If, during E24 time, it is found that the element being looked at is connected to the next element to be assigned, during E25 time suitable entries are made in the B and F field of the element being looked at. To effect this, the signal on E25 line 425 is applied to set ones into the B and F fields of write mask 692 (FIG. 5J), to set a one into the B field of MDR 690, and to condition gates 716 (FIG. 5R) to gate the contents of SUM accumulator 1274 through lines 714 to the F field of MDR 690, and through OR gate 644 (FIG. 5I) to set flip-flop 634 to its ZERO or WRITE state. When single shot E25 times out, single shot E26 is set to its ON state.

When single shot E26 is in its ON state, the resulting output signal on line 426 is applied through OR gate 604 (FIG. 5I) to line 632 to apply an A pulse to controls 620. Since flip-flop 634 is in its ZERO state, the effect of this A pulse is to cause the contents of MDR 690 (FIG. 5J) to be applied through write mask 692 to the first memory position in associative memory 578 which has its match indicator set to its ONE state. It will be remembered that during E5 time an associate operation was performed leaving the memory position for the element whose relationship to the next element to be placed is being investigated as the first element in the memory with its match indicator set to its ONE state. Since only the B and F fields of write mask 692 have 1 bits in them at this time, the desired entries in these fields are written into the indicated memory position. When single shot E26 times out, single shot E27 is set to its ON state.

It will be remembered that single shot E27 is also set to its ON state if, when single shot E24 times out, it is found that the element being considered is not related to the next element to be placed. Under either this condition or the condition at the end of E26 time when the information as to the relationship has been recorded, it is desired to set up controls 620 (FIG. 5I) so that the relationship of the next element in AM No. 2 which has already been assigned a position on the wafer to the next element to be assigned may be investigated. As a first step in accomplishing this objective, when single shot E27 is in its ON state, the resulting output signal on line 427 is applied through OR gate 626 to line 624 to apply a B pulse to AM No. 2 controls 620. As was indicated previously, there is an additional flip-flop in controls 620 for each position in the memory which flip-flop is set when an A pulse causes the corresponding memory position to either be written into or read out from. This flip-flop being set to its ONE state gates the B pulse to reset the corresponding match indicator. When single shot E27 times out, single shot E28 is set to its ON state. When single shot E28 is in its ON state, the resulting output signal on line 428 is applied through OR gate 630 to line 628 to apply a C pulse to controls 620. The C pulse is effective to reset the additional flip-flops in control 620 to their ZERO state. The effect of the B and C pulses is, therefore, to reset the match indicator for the memory position containing the element whose relationship to the next element to be assigned has just been investigated, leaving a new memory position as the first one having its match indicator set to its ONE state. The significance of this step will be apparent shortly. The signal on E28 line 428 is also applied through OR gate 640 to set flip-flop 634 to its ONE or READ state. When single shot E28 times out, single shot E6 is set to its ON state.

When single shot E6 is in its ON state, the resulting output signal on line 406 is applied through OR gate 604. (FIG. 5I) to line 622 to cause an A pulse to again be applied to controls 620. Since flip-flop 634 was just set to its ONE or READ state, this A pulse is effective to read out the contents of the memory position in AM No. 2 corresponding to the first match indicator which is set to its ONE state in controls 620 or to set end-of-line flip-flop 650 to its ONE state if there are no match indicators set to their ONE state. From the previous discussion with respect to the B and C pulses generated during E27 and E28 times respectively, it can be seen that the word read out at this time is that containing the next element in AM No. 2 which has already been placed on the wafer. When single shot E6 times out, single shot E9 is set to its ON state.

From previous discussion it will be remembered that nothing happens when single shot E9 is in its ON state. However, when single shot E9 times out, a signal is applied to line 409' to condition gates 658 and 659 (FIG. 5I) thereby testing the state of end-of-line flip-flop 650. If the end-of-line flip-flop is in its ZERO state at this time, indicating that there are additional elements which have been placed on the wafer whose relationship to the next element to be placed on the wafer is to be determined, gate 659 is fully conditioned at this time to generate an output signal on line 668 which signal is applied to set single shot E10 to its ON state. The setting of single shot E10 to its ON state initiates a previously described sequence of operation which results in the weights of the connections between the element being considered and the next element to be assigned being placed in SUM accumulator 1274 (FIG. 5R) and, if this weight is other than 0, in this weight being read into the F field of the word in AM No. 2 for this element and a 1 bit being placed in the B field of this word. If, on the other hand, end-of-line flip-flop 650 is in its ONE state when single shot E9 times out, this means that the relationship of all elements which have already been placed on the wafer to the next element to be placed on the wafer has already been determined and therefore, that the function of the E clock has been completed. Therefore, under these conditions, gate 658 is fully conditioned to generate an output signal on line 666 which is applied to set the E-clock-off flip-flop in E clock 400 to its ON state. The resulting output signal on E-clock-off line 428 is applied to AND gate 399 to, in conjunction with the timing out of single shot P28, cause single shot S1 of S clock 370 and single shot P29 of P clock 300 to be set to their ON states.

The sole function of single shot P29 is to inhibit further operations under control of the P clock until the pick-best-position operation under control of the S clock has been completed. Therefore, in the absence of an S-clock-off signal on line 396, each time single shot P29 times out, it is reset to its ON state.

As indicated previously, S clock 370 controls the performance of the pick-best-position step (step 64 of FIG. 2) of the operation. When this operation is started a list of candidate positions to which the next element in the T list may be assigned is stored in AM No. 1, (FIG. 5G) and the relationship of this element to elements already placed in the M array is recorded in the B and F fields for appropriate elements in AM No. 2 (FIG. 5H). Operations under control of the S clock are initiated when single shot S1 is in its ON state. The resulting output signal on S1 line 371 causes certain preliminary operations to be performed. The signal on line 371 is applied to reset accumulators ΣDD1 1034 (FIG. 5P), ΣWXD1 1098, ΣDD1122, and ΣWXD2 1118. The signal on line 371 is also applied to rest J flip-flop 1140 to its ZERO state and through OR gate 544 FIG. 5B) to reset argument mask 528. When single shot S1 times out, single shot S2 is set to its ON state.

At this point reference may be made to FIG. 4D which is a flow diagram for the pick-best-element. During clock times S2 through S4B the pick candidate position step (step 248) of FIG. 4D is performed. When single shot S2 is in its ON state, AM No. 1 memory 440 and the associated components thereof are set up to perform the desired operation. Therefore, the signal on S2 line 372 is applied through OR gate 548 (FIG. 5B) to set a 1 into the A field of argument mask 528, through OR gate 536 to set a 1 into the A field of argument register 496, through OR gate 576 (FIG. 5D) to set 1's into the B fields of read mask 554, through OR gate 452 (FIG. 5C) to line 450 to set all the match indicators in controls 444 to their ONE state, through OR gate 466 to set flip-flop 456 to its ONE or READ state, and through OR gate 485 to set end-of-line flip-flop 460 to its ZERO state. When single shot S2 times out, single shot S3 is set to its ON state.

When single shot S3 is in its ON state, the resulting signal on S3 line 373 is applied through OR gate 492 (FIG. 5B) to cause an associate operation on AM No. 1. Since there are 1 bits in the A fields of the argument register and argument mask for this memory at this time, the match indicators for all words in AM No. 1 which have a one bit in their A field at this time are left in their ONE state, and the match indicators for all other words are reset to their ZERO state. Since, referring to FIG. 6A, there is a bit in the A field only for such memory positions as contain candidate positions at this time, it is the match indicators for these positions in AM No. 1 which are left in their one state. When single shot S3 times out, single shot S4 is set to its ON state.

When single shot S4 is in its ON state, the resulting output signal on line 374 is applied through OR gate 448 (FIG. 5C) to apply an A pulse to controls 444. Since flip-flop 456 is in its ONE state at this time, the A pulse is effective to cause the contents of the upper-most position in AM No. 1 which has its match indicator set at this time to be read out into MDR 462 (FIG. 5D). The coordinates of the first candidate position to be investigated are in this manner stored in the B fields of MDR 462. When single shot S4 times out, single shot S4A is set to its ON state. When single shot S4 A is in its ON state, the resulting output signal on line 474A is applied as a B pulse to controls 444 causing the match indicator for the position just read out to be reset in a manner previously described. When single shot S4A times out, single shot S4B is set to its ON state. When single shot S4B is in its ON state, the resulting output signal on line 374B is applied as a C pulse to controls 444 causing the additional flip-flop which was used in the resetting of the match indicator during S4A time to be reset. Controls 444 are in this manner set up to cause the next entry in AM No. 1 which has its match indicator set to its ONE state to be read out the next time an A pulse is applied to controls 444. The significance of these operations will be apparent later. When single shot S4B times out, single shot S5 is set to its ON state.

When single shot S5 is in its ON state, no operations are performed. However, when single shot S5 times out, the resulting output signal on line 375 is used to perform the check-to-determine-if-all-candidate-positions-have-been-used operation indicated as step 250 in FIG. 4D. To perform this operation, the signal on S5 line 385' is applied as the conditioning input to gates 502 (FIG. 5C) and 510. If end-of-line flip-flop 460 is in its ONE state at this time, indicating that all positions have been looked at, gate 502 is fully conditioned to generate an output signal on line 524 which is applied to reset the S clock by setting the S-clock-off flip-flop to its ON state. However, if there are available positions in AM No. 1, end-of-line flip-flop 460 is in its ZERO state fully conditioning gate 510 to generate an output signal on line 526 which is applied to set single shot S6 to its ON state.

When single shot S6 is in its ON state, the resulting output signal on line 376 is applied to condition gate 760 (FIG. 5E) to pass the address of the position being looked at to lines 762. These lines branch into line 762X which apply the X portion of this address to XGN register 764 and lines 762Y which apply the Y portion of the address to YGN register 766 (FIG. 5F). The signal on line 376 is also applied through OR gate 682 (FIG. 5H) to reset argument mask 582. When single shot S6 times out, single shot S7 is set to its ON state.

During clock times S7 through S10, the find-connected-element step (step 252 of FIG. 4D) is performed. As preliminary operations of this step, when single shot S7 is in its ON state the resulting output signal on line 377 is applied to set a 1 into the B field of argument mask 582 (FIG. 5H), to set a 1 into the B field of argument register 580, to set 1's into the E and F fields of read mask 688 (FIG. 5J), through OR gate 600 to line 618 to cause the match indicators in controls 620 (FIG. 5I) to be set to their ONE state, through OR gate 640 to set flip-flop 634 to its ONE or READ state, and through OR gate 598 to set end-of-line flip-flop 650 to its ZERO state. When single shot S7 times out, single shot S8 is set to its ON state.

When single shot S8 is in its ON state, the resulting output signal on line 378 is applied through OR gate 602 (FIG. 5H) to cause an associate operation of AM No. 2. Since there are 1's in the B fields of argument register 580 and argument mask 582 at this time, only such entries in AM No. 2 as have a 1 in their B field have their match indicator set to the ONE state at the end of the associate operation. It will be remembered that these are the entries which have already been assigned positions in the M array, and which are also connected to the next element to be assigned. When single shot S8 times out, single shot S9 is set to its ON state.

When single shot S9 is in its ON state, the resulting output signal on line 379 is applied through OR gate 604 (FIG. 5I) to apply an A pulse to controls 620. Since flip-flop 634 is in its ONE state at this time, the A pulse is effective to cause the reading out of the contents of the topmost memory position whose match indicator is set to one at this time. Since the E and F fields of read mask 688 (FIG. 5J) are the only ones with 1's in them at this time, it is these fields of the entry which are read into MDR 690. It will be remembered that the E and F fields contain the coordinates of the position to which the element was assigned and the weight of the connection between this element and the next element to be assigned respectively. When single shot S9 times out, single shot S9A is set to its ON state. When single shot S9A is in its ON state, the resulting output signal on line 379A is applied through OR gate 626 (FIG. 5I) to line 624 to apply a B pulse to controls 620. The B pulse is effective, in a manner previously described, to reset the match indicator for the entry which was just read out. When single shot S9A times out, single shot S9B is set to its ON state. When single shot S9B is in its ON state, the resulting output signal on S9B line 379B is applied through OR gate 630 (FIG. 5I) to C pulseline 628. The application of a C pulse to controls 620 causes the additional flip-flop which was used in the resetting of the match indicator to be reset to its ZERO state. Controls 620 are in this manner set to cause the next entry in AM No. 2 which had its match indicator set during the associate operation to be read out the next time an A pulse is applied to control 620. The significance of these operations will be apparent later. When single shot S9B times out, single shot S10 is set to its ON state.

No operations are performed when single shot S10 is in its ON state. However, when single shot S10 times out, a determination is made as to whether there are any connected elements in AM No. 2 which have not yet been considered in determining the cost of using the position being investigated. This is accomplished by applying the signal on $\overline{S10}$ output line 380' as the conditioning input to gates 656 (FIG. 5I) and 657. If all elements have been considered, end-of-line flip-flop 648 is in its ONE state at this time causing gate 656 to be fully conditioned to generate an output signal on line 662 which is applied to set single shot S11 in S clock 370 (FIG. 5A) to its ON state. However, if there are additional elements to be considered in determining the cost of using the position being considered, end-of-line flip-flop 650 is in its ZERO state at this time causing gate 657 to be fully conditioned to generate an output signal on line 664 which is applied to set single shot S14 to its ON state. For purposes of illustration, it will be assumed that end-of-line flip-flop 650 is in its ZERO state at this time so that single shot S14 is set to its ON state. The sequence of events which occur when single shot S11 is set to its ON state will be considered later.

The system is now ready to find the X and Y distances between the candidate position and the connected-element position. This is step 254 of FIG. 4D. As a preliminary operation in performing this function, when single shot S14 is in its ON state the resulting output signal on line 384 is applied to condition gates 1178 and 1182 (FIG. 5P) to pass the contents of the E field and F field respectively of MDR 690 into XCB Register 1188, YCB Register 1190, and WT Register 1090. The X and Y coordinates of the position to which the connected element is assigned is in this manner stored in the XCB and YCB Registers respectively and the weight of the connection between the candidate position for the next element to be assigned and the connected element position is stored in register 1090. When single shot S14 times out, single shot S15 is set to its ON state. When single shot S15 is in its ON state, the resulting output signal on line 385 is applied to condition gates 782 (FIG. 5F) to apply the contents of XGN register 764, which register this time contains the X address of the candidate position, through lines 904 and OR gates 908 (FIG. 5M) to one input of subtractor 998 and to condition gates 1194 (FIG. 5P) to pass the contents of XCB register 1188, which register contains the X address of the connected element position, through lines 1200 and OR gates 1002 (FIG. 5M) to the other input of subtractor 998. These two quantities are subtracted in subtractor 998, and the absolute value of the result of this subtraction is applied through lines 1004 to gates 1008. The signal on S15 line 385 is also applied to condition gates 1008 to pass this difference through line 1002 to FX register 1016. The X differences are in this manner stored in FX register 1016. When single shot S15 times out, single shot S16 is set to its ON state. When single shot S16 is in its ON state the difference between the Y addresses is determined by applying the signal on S16 line 386 to condition gates 792 (FIG. 5F) to pass the address in YGN register 766 through lines 906 and OR gates 908 (FIG. 5M) to one input of subtractor 998 and conditioning gates 1198 (FIG. 5P) to pass the contents of YCB register 1190 through lines 1200 and OR gates 1202 to the other input of the subtractor. The result of this subtraction, which is the absolute value of the difference between the Y address of the candidate position and the Y address of the connected element position, is applied through lines 1004 to gates 1010. The signal on S16 line 386 is applied to condition gates 1010 to pass this difference through lines 1014 to GY register 1018. When single shot S16 times out, single shot S17 is set to its ON state.

During times S17 through S20, step 256 of FIG. 4D is performed. As a first step in this operation, the signal on S17 line 387 is applied to condition gates 1022 (FIG. 5M) to pass the contents of FX register 1016 through lines 1036 to squaring circuit 1038. The square of the X distance difference is then applied through lines 1040 to the input of gates 1042 (FIG. 5N). The signal on S17 line 387 conditions gates 1042 to pass this square distance through lines 1046 to $X^2$ register 1048. When single shot S17 times out, single shot S18 is set to its ON state. When single shot S18 is in its ON state the resulting output signal on S18 line 388 is applied to condition gates 1028 (FIG. 5M) to pass the contents of GY register 1018 through lines 1036 to squaring circuit 1038. The square of the Y distance difference is then applied through lines 1040 to the information inputs of gates 1044 (FIG. 5N). The signal on S18 line 388 is applied to condition gates 1044 to pass this square difference through lines 1050 to $Y^2$ register 1052. When single shot S18 times out, single shot S19 is set to its ON state.

When single shot S19 is in its ON state, the resulting output signal on S19 line 389 is applied to condition gates 1056 (FIG. 5N) and 1060 to pass the contents of $X^2$ register 1048 and $Y^2$ register 1052 respectively into adder 1066. The results of this addition, which is the sum of the distances squared, is applied through lines 1068 to the information input of gates 1070. The signal on S19 line 389 conditions gates 1070 to pass this squared sum through lines 1072 to $SUM^2$ register 1074. When single shot S19 times out, single shot S20 is set to its ON state.

When single shot S20 is in its ON state, the resulting signal on S20 lines 390 is applied to condition gates 1078 (FIG. 5N) to apply the contents of the $SUM^2$ register 1074 to one input of multiplier 1082 and is applied to condition gates 1086 to apply the contents of WT register 1090 (FIG. 5P) to the other input of this multiplier. The resulting output signals from the multiplier on line 1092, which signals represent the product of the weight of the connection between the connected element and the next element to be assigned times the sum of the squares of the distances between the candidate position and the connected element position, is applied to the information inputs of gates 1094. The signal on S20 line 390 conditions gates 1094 to pass this quantity through lines 1096 to ΣWXD1 accumulator 1098 (FIG. 5O). When single shot S20 times out, single shot S21 is set to its ON state.

During S21 time information as to the X and Y differences is generated which information may later be used during the breaking step 262 (FIG. 4D). This is step 259 of the operation. When single shot S21 is in its ON state the resulting output signal on S21 line 391 is applied to condition gates 994 and 1026 (FIG. 5M) to pass the contents of FX register 1016 and GY register 1018 respectively, through OR gates 908 and 1002 to the inputs of subtracter 998. The absolute value of the result of this subtraction, which is the difference between the X and Y differences is applied to the information input of gates 1006. The signal on S21 line 391 is applied to condition gates 1006 to pass this information through lines 1032 to ΣDD1 accumulator 1034 (FIG. 5O). When single shot S21 times out, single shot S9 is reset to its ON state.

From Appendix III and FIG. 4D it can be seen that the system has now returned to step 252 (FIG. 4D) to find a new connected element. During S9 time an A pulse is applied to controls 620 (FIG. 5I) causing the E and F fields of the next connected element to be read out into MDR 690 or causing end-of-line flip-flop 648 to be set to its ONE state if there are no more connected elements. The system then proceeds to apply B and C pulses to the controls, in a manner previously described, to reset the match indicator for the position in memory which was just read out, thereby preparing the system for the next attempt to find a connected element. At S10 time a determination is made as to whether a connected element has been located, and, if a connected element has been located, the system then proceeds through S14 to S21 times to compute the increment of cost for using the candidate position which this connected element incurs. At S20 times this coat is applied through conditioned gate 1094 (FIG. 5N) to accumulator ΣWXD1 where it is added to the cost previously stored in this accumulator. During S21 time the difference between the X and Y differences for the candidate position and connected element being considered is determined and added to the previous difference stored in the ΣDD1 accumulator 1034. As before, the system returns to S9 time from S21 time.

The increment of cost for using the candidate position which results from each connected element is in this manner computed and added to the sum stored in ΣWXD1 accumulator 1098 until, with an A pulse is applied to controls 620 (FIG. 5I) during S9 time, it is found that all of the match indicators have been reset and an output signal appears on lines 648 to set end-of-line flip-flop 650 to its ONE state. The next time that the S10 single shot times out, the resulting signal on $\overline{S10}$ line 380′ conditions gates 656 to pass the signal on output line 654 for the ONE side of end-of-line flip-flop 650 to line 662. The signal on line 662 is applied to S clock 370 (FIG. 5A) to set single shot S11 to its ON state.

The operations performed during S11–S13 time permit the compare operation of step 260 (FIG. 4D) to be bypassed for the first candidate position to be considered. It will be appreciated that the compare operation at this point would be meaningless since there is nothing to compare against. When the S11 single shot is in its ON state no operations are performed. However, when the S11 single shot times out, the resulting signal on $\overline{S11}$, line 381′ is applied to condition gates 1146 and 1148 (FIG. 5O) which gates test the state of J flip-flop 1140. It will be remembered that J flip-flop 1140 was reset to its ZERO state at the beginning of the operation controlled by S clock. Therefore, if this flip-flop is still in its ZERO state, it means that the candidate position being considered is the first candidate position to be considered. Under these conditions gate 1148 is fully conditioned to generate an output signal on line 1152 which is applied to set single shot S12 to its ON state. The sequence of events which occur if J flip-flop 1140 is in its ONE state at this time will be described later.

When single shot S12 is in its ON state, the resulting output signal on S12 line 382 is applied through OR gate 836 (FIG. 5E) to condition the gates 780 and 794 to pass the contents of XGN register 764 and YGN register 766 in GN Final register 840. This stores the X and Y address of the candidate position which was just looked at as the best candidate position so far. The signal on S12 line 382 is also applied through OR gate 1114 (FIG. 5O) to condition gates 1104 to pass the contents of ΣWXD1 accumulator 1098 into ΣWXD2 register 1118 and to condition gates 1108 to pass the contents ΣDD1 accumulator 1034 into ΣDD2 register 1122. The effect of these operations is to store the cost of using the candidate position just looked at as the best cost so far and to store the sum of the differences of the X and Y differences for this candidate position as the best so far also. This cost and sum will be compared against later-computed costs and sums in determining the best candidate position for the element to be assigned. When single shot S12 times out, single shot S13 is set to its ON state.

When single shot S13 is in its ON state the resulting output signal on line S13 line 383 is applied to set J flip-flop 1140 (FIG. 5O) to its ONE state. This will be used as an indication in the future that the first candidate position has been investigated and the cost and other values for this position stored so that, when values are computed for subsequent candidate positions, these values must be compared against the stored values to determine the best candidate position so far. When single shot S13 times out, single shot S4 is reset to its ON state.

The setting of single shot S4 to its ON state indicates that a new candidate position is to be selected (i.e., step 248 of FIG. 4D is to be repeated). Referring now to Appendix III and to FIG. 5C, it is seen that at S4 time an A pulse is applied to controls 444 to cause the address of the next candidate position in AM No. 1 to be read out into MDR 462 (FIG. 5D). The reason that the next candidate position is read out at this time is that, during the previous S4A time, the match indicator for the first candidate position was reset. The system then proceeds through S4A and S4B times to reset the match indicator for the candidate position just read out and to reset the additional flip-flop for this position. During S5 time a determination is made that there is a candidate position to be investigated and, during the subsequent S times, the cost of using this candidate position is computed in a manner previously described for the first candidate position. When the increment of cost for using the candidate position being investigated which results from the last of the connected elements has been determined, the A pulse applied to controls 620 at S9 time finds all the match indicators reset and is applied through line 648 to set end-of-line flip-flop 650 to its ONE state. The next time the S10 single shot times out, gate 656 (FIG. 5I) is fully conditioned to generate an output signal on line 662 which is applied to set the S11 single shot to its ON state.

It will be remembered that the timing out of the S11 single shot is used to determine whether the candidate position being investigated is the first candidate position. Therefore, when the S11 single shot times out, the resulting signal on line 381′ is applied to condition gate 1146 (FIG. 5O). Since J flip-flop 1140 was set to its ONE state during the previous S13 time, this gate is fully conditioned at this time to generate an output signal on line 1150 which is applied to set single shot S22 to its ON state.

During clock time S22 step 260 of FIG. 4D is performed. In accomplishing this function, no operations are performed when single shot S22 is in its ON state. However, when single shot S22 times out a signal is applied through line 392′ to the conditioning input of gates 1132–1134 (FIG. 5O). The inputs to these gates are the greater than, less than, and equal outputs respectively from compare circuit 1102. As indicated previously, the inputs to compare circuit 1102 are output lines 1100 from ΣWXD1 accumulator 1198 and output lines 1124 from ΣWXD2 register 1118. Accumulator 1098 contains the cost of using the candidate position being investigated at this time while register 1118 contains the best cost (i.e. lowest cost) so far. If the new cost is greater than the best cost so far, compare circuit 1102 generates an output signal on line 1128 which is applied through gate 1133 and OR gate 1172 (FIG. 5P) to line 1174 to cause single shot S4 to be reset to its ON state. The significance of this operation is to indicate that the cost stored is the best cost so far and that the system should return to seek another candidate position to investigate. On the other hand, if the cost computed for the candidate position being investigated is less than the best cost so far, compare circuit 1102 generates an output signal on line 1126 which is applied through gate 1132, line 1136, and OR gate 1139 to line 1166 to cause single shot S23 to be set to its ON state. As will be seen later, when single shot S23 is in its ON state, steps 264, 266 and 268 of FIG. 4D are performed or, in other words, the parameters for the candidate position being investigated are stored at the best ones so far. If the costs applied to compare circuit 1102 are equal, an output signal on line 1130 results which signal is applied through conditioned gate 1134 to line 1138. The signal on line 1138 is applied to S clock 370 to cause single shot S24 to be set to its ON state.

During S24 time, tie breaking step 262 of FIG. 4D is performed. In accomplishing this step, no operations are performed when single shot S24 is in its ON state. However, when single shot S24 times out, the resulting output signal on S24 line 394′ is applied as a conditioning input to gates 1160–1162 (FIG. 5P). The information input to gates 1160–1162 is greater than, less than and equal output lines 1156–1158 respectively from compare circuit 1110. The inputs to compare circuit 1110 are output lines 1106 for ΣDD1 accumulator 1034, which accumulator contains the sum of the differences of the X and Y differences for the candidate position being investigated and output lines 1154 from ΣDD2 register 1122 which contains the sum of the differences of the X and Y differences for the best positions so far. If the contents of accumulator 1034 are less than the contents of the register 1122, compare circuit 1110 generates an output signal on line 1156 which is applied through conditioned gate 1160 and OR gate 1139 to cause single shot S23 to be set to its ON state. The operations when single shot S23 is in its ON state will be described shortly. If the contents of register 1122 are less than or equal to the contents of the accumulator 1034 an output signal appears on line 1157 or 1158 respectively, which signals are applied through conditioned gates 1161 and 1162 to OR gate 1172. The resulting signal on output line 1174 from OR gate 1172 is applied to set single shot S4 to its ON state, thereby causing the best candidate position stored to be retained intact and causing the investigation of a new candidate position to be initiated.

As indicated previously, when a decision is made when either single shot S22 or single shot S24 times out that the candidate position being looked at is the best candidate position so far, single shot S23 is set to its ON state. When single shot S23 is in its ON state steps 264 and 266 and 268 of FIG. 4D are performed. In performing these operations, the signal on S23 line 393 is applied through OR gate 1114 (FIG. 5O) and line 1112 to condition gates 1104 to pass the contents of accumulator ΣWXD1 into register ΣWXD2 and to condition gates 1108 to pass the contents of accumulator ΣDD1 into register ΣDD2. The signal on S23 line 393 is also applied through OR gate 836 (FIG. 5E) to condition gates 780 and 794 to pass the contents of XGN register 764 and YGN register 766 (FIG.

5F) respectively into GN final register 840. When single shot S23 times out, single shot S4 is set to its ON state.

The setting of single shot S4 to its ON state causes the coordinates of a new candidate position to be read out, and the steps described above to compute the cost of using this position to be initiated. When, during an S4 time, it is found that all candidate positions have been looked at and the cost of using these positions determined, the system has reached a point where it may now be said that the parameters stored for the best position so far are the parameters of the best candidate position. The A pulse applied to controls 444 during S4 time is applied through line 459 to set end-of-line flip-flop 460 to its ONE state. The next time that the S5 single shot times out, the output signal on $\overline{S5}$ line 375' finds gate 502 (FIG. 5C) fully conditioned to generate an output signal on line 524 which is applied to S clock 370 (FIG. 5A) to set the S-clock-off flip-flop to its ONE state. This effectively resets the S clock. The next time that the P29 single shot times out, it finds a signal on S-clock-off line 396 which signal is effective, in conjunction with the timing out of the P29 single shot, to cause the P17 single shot to be set to its ON state.

The operations which are now to be performed have previously been described in detail and will therefore only be described functionally at this point. Referring to Appendix I, it is seen that during P17 and P18 time the name of the next element to be assigned is retrieved from AM No. 2 and during P19 time the conditions are set up to cause this element name to be recorded in the proper position in M array core memory 934 (FIG. 5K). During P20 time the entry in the M array is made thereby performing step 66 of FIG. 2 and conditions are set up to make housekeeping entries in AM No. 2 and to remove the used position from the list of candidate positions in AM No. 1 (i.e. to perform step 68 of FIG. 2). During P21 time the operations which were prepared during P20 time are performed thereby accomplishing step 68 of the operation. During P23 time a determination is made as to whether all elements in the T list have been looked at (i.e., the contents of T counter 732 (FIG. 5G) are compared with the contents of E register 742). This is step 70 of FIG. 2. If it is found that all of the elements have not yet been assigned, the N clock is started causing new candidate positions to be added to the candidate position list by the frontier-choice method in a manner previously described. When the operations under the control of the N clock have been completed, the system proceeds during P times 24 through 26 to determine whether there are any candidate positions in AM No. 1. If there are none, actions to be described later are taken. If candidate positions are found, the system proceeds to P27 time to cause the T counter to be incremented thereby performing step 60 of the operation (FIG. 2) and, when the P27 single shot times out, causes the E clock to be turned on so as to cause step 62 (FIG. 2) of the operation to be performed. The system then proceeds to turn on the S clock causing the best position for the element to be selected (i.e., step 64 of the operation to be performed), and, when this operation has been completed, causes the P17 single shot to again be set to its ON state.

The system then proceeds through the operations performed during P17 – P21 time to cause the element-to-be-assigned to be placed in the selected position in the M array and to cause the desired housekeeping operations to be performed in AM No. 1 and AM No. 2. When these operations have been completed, the system proceeds to P22 time. When the P22 single shot times out a signal is again applied through line 322' to condition gates 748 and 750 (FIG. 5G). If, at this time, all of the elements have been assigned to positions in the M array, the contents of T counter 732 and E register 742 are equal and compare circuit 738 is generating an output signal on line 744 which is applied through conditioned gate 748 to line 752. The signal on line 752 is applied to set the P-clock-off flip-flop to its ON state thereby resetting the P clock and causing the assignment operation to be terminated.

In addition to resetting the P clock, the signal on line 752 may also be used either to initiate a print out of the information in AM No. 2 and/or the information in M array 934 (FIG. 5K), or may be used to cause the operation of the wiring pattern determining system 30 (FIG. 1) to be initiated.

POSSIBLE SYSTEM MODIFICATIONS

In the description of the system provided so far, it has been assumed that during step 52 (FIG. 2), the first element in the T list is assigned either to a fixed position at the center of the M array or to a centralized position which has previously been determined to be a good position and to be in the center of an area of good positions near the center of the array. In the latter instance there is little danger that the initially selected position will be a bad position or that, at some point in the operation, the check during step 60 of the operation (FIG. 2) will indicate that there are no available candidate positions. However, if a fixed central position is employed, there is a real danger that one of the two problems described above will occur. In the system described so far, when the first of the problems described above occurs, an error indication is generated and it is assumed that a new attempt will be made to place the circuit on the wafer starting at a new centralized position. If the latter problem described above develops, either an error indication is generated and a new attempt to place the circuit on the wafer starting at a new centralized position is initiated or, step 58 of FIG. 2 is performed. There are, however, other operations which may be performed when either of the problems described above occurs.

If a fully automated assignment system is desired, an initial attempt would always be made to place the first element in the T list at a predetermined central position in the M array. If this position is found to be an unuseable position for the particular wafer being considered, the system could then branch to a step which causes succeeding positions selected in a spiral path around the initially selected central position to be investigated until a useable position is located. Other possible paths could be selected for the succeeding positions to be investigated if desired for the particular application.

Assuming that the initial position selected is a useable one but that, during a step 56 (FIG. 2) later in the operation, it is found that no candidate positions exist, the system could proceed to step 58 to cause all useable unfilled positions to be read into the candidate position list or, a more limited alternative approach may be taken at this time. The advantage of a more limited alternative approach at this point is that it reduces the number of candidate positions in the candidate position list and therefore reduces the number of candidate positions which must be looked at during step 64 (FIG. 2) in order to select the "best" candidate position. An assumption has been made in this invention that the best candidate position will be one which is along the frontier of the positions which already have elements assigned to them and that therefore only these positions need be looked at. When none of the frontier positions are useable, the frontier may be expanded by considering diagonal positions (i.e., the position above and to the right, the position below and to the left, etc., of a position which has had an element assigned to it) or by considering the two positions above, the two positions to the left, etc., of each position which has had an element assigned to it rather than just a single position in each direction. Other possible criteria for expanding the number of positions in the frontier from which candidate positions will be selected when such a course of action becomes necessary will be apparent to those skilled in the art. As an alternative to expanding the frontier, when no candidate positions are found in the candidate position list during step 56, the system may start all over again by assigning the first element in the T list to a new centralized position selected, for example, by the spiral path method or in any other desired manner.

While it is believed that the adjacent position criteria stated in the preferred embodiment of the invention is the best all around criteria for selecting candidate positions to be considered in assigning an element from the T list, the invention is by no means limited to this criteria. For example, one of the criteria suggested in the previous paragraph for the situation where no candidate positions are available may be used as the initial criteria for selecting candidate positions.

As indicated in the introductory sections, one of the primary objects of the placement system is to so assign elements to the wafer in a manner such that the final wiring paths are minimized. While the frontier choice criteria generally satisfies this objective, there are some special situations where additional criteria may be employed in order to accomplish desired objectives. For example, where an element is to be connected to a terminal leading to external circuitry, the relationship of the element to the terminal as well as the relationship of the element to the other elements which have already been assigned may be taken into consideration in selecting the best position for the particular element. The type of wiring scheme which is to be employed (i.e., point to point wiring or net wiring) may also influence the placement system.

While the invention has been particularly shown and described with reference to preferred embodiments thereof, it will be understood by those skilled in the art that the foregoing changes in form and details may be made therein without departing from the spirit and scope of the invention.

APPENDIX I

P CLOCK

| Single Shot | Set Conditions | Functions Performed When Set | Functions Performed When Timing Out |
|---|---|---|---|
| P1 | Start Signal on line 332 (FIG. 5A) | Gate contents REG START X (FIG. 5L) and REG START Y to MAR (FIG. 5K) of MACM (i. e., apply signal to OR gate 932). Reset A field in AM # 1 (FIG. 5B). Reset A, B, and F fields of AM # 2 (FIG. 5H). | Set P2 |
| P2 | Timing out of P1 | Read MACM (FIG. 5K) (i. e., apply signal to OR gate 948) | Set P3 |

| Single Shot | Set Conditions | Functions Performed When Set | Functions Performed When Timing Out |
|---|---|---|---|
| P3 | Timing out of P2 | Not used | Condition gates 972 (FIG. 5K) and 980 to test indicator bit of MBR for MACM. Set T4 if indicator bit present. Generate error indication and reset P clock if indicator bit not present. |
| P4 | Signal on output line 986 from gate 972 (FIG. 5K) (i. e., timing out of P3 and indicator bit present in MBR 956) | Reset T counter (FIG. 5G) to 1. Reset AM # 2 argument mask (FIG. 5H) (i. e., apply signal to OR gate 682). Reset AM # 2 read mask (FIG. 5J)(i. e., apply signal to OR gate 700) | Set P5 |
| P5 | Timing out of P4 | Gate T counter (FIG. 5G) to C field of AM # 2 argument register (FIG. 5H) (i. e., apply signal to OR gate 728 of FIG. 5G). | Start AM # 2 clock (FIG. 5I)(i. e., apply signal to OR gate 590). Set P6 |

| Single Shot | Set Conditions | Functions Performed When Set | Functions Performed When Timing Out |
|---|---|---|---|
| | | Set C field of AM # 2 argument mask (FIG. 5H) to one (i. e., apply signal to OR gate 686). Set D field of AM # 2 read mask (FIG. 5J) to one (i. e., apply signal to OR gate 704). Set flip-flop 634 (FIG. 5I) to ONE or READ state (i. e., apply signal to OR gate 640). | |
| P6 | Timing out of P5, OR Timing out of P6 and signal on AM # 2-clock-on line 608. | Not used. | Test AM # 2 clock. Set P6 if signal on AM # 2-clock-on line 608 (FIG. 5I) OR Set P7 if signal on AM # 2-clock-off line 594. |
| P7 | Timing out of P6 and signal on AM # 2-clock-off line 594. | Gate REG START X and REG START Y (FIG. 5L) to MAR of MACM (i. e., apply signal to OR gate 932). Gate D field AM # 2 MDR (FIG. 5J) to MBR 956 (FIG. 5K) and set indicator bit of MBR to zero (i. e., apply signal to OR gates | Set P8 |

| Single Shot | Set Conditions | Functions Performed When Set | Functions Performed When Timing Out |
|---|---|---|---|
| | | 962 and 966) Reset AM # 2 write mask (FIG. 5J) (i. e., apply signal to OR gate 724). | |
| P8 | Timing out of P7 | Write access MACM (FIG. 5K)(i. e., apply signal to OR gate 952) Gate MAR of MACM to E field of AM # 2 MDR (FIG. 5J) (i. e., apply signal to OR gate 944 of FIG. 5L). Set A field of AM #2 MDR to one (i. e., apply signal to OR gate 708). Set A and E fields of AM # 2 write mask to one. Set flip-flop 634 (FIG. 5I) to ZERO or WRITE state (i. e., apply signal to OR gate 644). Reset AM #1 argument register (FIG. 5B) and argument mask (i. e., apply signal to OR gates 532 and 544). | Start AM # 2 clock (FIG. 5I) (i. e., apply signal to OR gate 590). Set N1 (apply signal to OR gate 366 of FIG. 5A). Set P9 |
| P9 | Timing out of P8 OR | Not used. | Test AM # 2 and N clocks (i. e., apply signal to |

| Single Shot | Set Conditions | Functions Performed When Set | Functions Performed When Timing Out |
|---|---|---|---|
| | Timing out of P9 and either AM # 2 or N clock ON (i. e., signal on output line 615 from inverter 613 of FIG. 5I) | | AND gate 609 of FIG. 5I). If either clock ON, set P9. If both clocks OFF set P10. |
| P10 | Timing out of P9 and N clock off and AM # 2 clock off (i. e., signal on output line 611 from AND gate 609 of FIG. 5I. | Set flip-flop 456 (FIG. 5C) to ONE or READ state (i. e., apply signal to OR gate 466). Set A field of AM #1 argument register (FIG. 5B) and AM # 1 argument mask to one (i. e., apply signals to OR gates 536 and 548. | Start AM # 1 clock (FIG. 5C) (i. e., apply signal to OR gate 476). Set P11 |
| P11 | Timing out of P10 OR Timing out of P11 and signal on AM # 1-clock-ON line 488. | Not used. | Test AM # 1 clock. If ON (i. e., signal on line 488), set P11. If OFF (i. e., signal on AM # 1-clock-OFF line 484, set P12 |

| Single Shot | Set Conditions | Functions Performed When Set | Functions Performed When Timing Out |
|---|---|---|---|
| P12 | Timing out of P11 and signal on AM # 1-clock-OFF line 484. | Not used. | Test end-of-line flip-flop 460 (FIG. 5C) for AM # 1 (i. e., apply conditioning signal to gates 500 and 508). If flip-flop in ONE state error signal, and reset P clock. If flip-flop in ZERO state, set P13 |
| P13 | Timing out of P12 and end of line flip-flop 460 in ZERO state (i. e., gate 508 fully conditioned to generate signal on line 516. | Increment T counter (FIG. 5G) (i. e., apply signal to OR gate 736). | Set P14 |
| P14 | Timing out of P13 | Set B fields of AM # 1 read mask (FIG. 5D) to one (i. e., apply signal to OR gate 576). Set flip-flop 456 (FIG. 5C) to ONE or READ state (i. e., apply signal to OR gate 466). | Start AM # 1 clock (FIG. 5C) (i. e., apply signal to OR gate 476). Set P15. |

| Single Shot | Set Conditions | Functions Performed When Set | Functions Performed When Timing Out |
|---|---|---|---|
| P15 | Timing out of P14 OR Timing out of P15 and signal on AM # 1-clock-ON line 488. | Not used | Test AM # 1 clock. If signal on AM #1-clock-ON line 488, set P11. If signal on AM #1-clock-OFF line 494, set P16. |
| P16 | Timing out of P15 and signal on AM # 1-clock-OFF line 484. | Gate B fields AM #1 MDR (FIG. 5B) to GN FINAL register (FIG. 5E) (i. e., apply conditioning signal to gates 758). | Set P17 |
| P17 | Timing out of P16 OR Timing out of P29 and signal on S-clock-OFF line 396 | Gate T counter (FIG. 5G) to C field of AM #2 argument register (FIG. 5H) (i. e., apply signal to OR gate 728 of FIG. 5G). Set flip-flop 634 (FIG. 5I) to ONE or READ state (i. e., apply signal to OR gate 640). | Start AM # 2 clock (i. e., apply signal to OR gate 590). Set P18 |
| P18 | Timing out of P17 OR Timing out of | Not used. | Test AM # 2 clock. If signal on line 608 indicating that clock is ON, set P18. |

| Single Shot | Set Conditions | Functions Performed When Set | Functions Performed When Timing Out |
|---|---|---|---|
| | P18 and signal on AM #2-clock-ON on line 608. | | If signal on AM #2-clock-OFF line 594, set P19 |
| P19 | Timing out of P18 and signal on AM # 2-clock-OFF line 594 | Gate GN FINAL register (FIG. 5E) to MAR of MACM (i. e., apply conditioning signal to gate 844. Gate D field of AM # 2 MDR (FIG. 5J) to MBR of MACM (FIG. 5K) and set indicator bit of MBR to zero (i. e., apply signal to OR gates 962 and 966) Reset AM #1 argument mask (FIG. 5B) (i. e., apply signal to OR gate 544. Reset AM #1 write mask (FIG. 5D) | Set P20 |
| P20 | Timing out of P19 | Write access MACM (FIG. 5K) (i.e., apply signal to OR gate 952). Gate MAR of MACM to E field of AM #2 MDR and B fields of AM #1 | Start AM #1 clock (FIG. 5C) and AM #2 clock (FIG. 5I) (i.e., apply signals to OR gates 476 and 590). Set P21 |

| Single Shot | Set Conditions | Functions Performed When Set | Functions Performed When Timing Out |
|---|---|---|---|
| | | argument register (i.e., apply signal to condition gate 540 and to OR gate 944 of FIG. 5L. Set A field of AM #2 MDR (FIG. 5J) to one (i.e., apply signal to OR gate 708). Set B fields of AM #1 argument mask (FIG. 5B) to one. Reset AM #1 MDR (FIG. 5D). Set A field of AM #1 write mask to one (i.e., apply signal to OR gate 568). Set flip-flops 456 (FIG. 5C) and 634 (FIG. 5I) to their ZERO or WRITE state (i.e. apply signals to OR gates 470 and 644). | |
| P21 | Timing out of P 20 OR Timing out of P21 and a signal on output line 616 from | Not used. | Test AM #1 and AM #2 clocks (i.e., apply signal to AND gate 610 (FIG. 5I). If either clock ON, output signal on line 616 to set P21. |

| Single Shot | Set Conditions | Functions Performed When Set | Functions Performed When Timing Out |
|---|---|---|---|
| | inverter 614 (FIG. 5I) (i.e., AM #1 clock or AM #2 clock ON) | | If both clocks OFF, signal on output line 612 from AND gate 610 to set P22 |
| P22 | Output signal on line 612 from AND gate 610 (FIG. 5I) (i.e., timing out of P21 and AM #1 and AM #2 clocks OFF). | Reset AM #1 argument register (FIG. 5B) and argument mask (i.e., apply signal to OR gates 532 and 544). | Compare contents of T counter (FIG. 5G) with contents of E register in compare circuit 738 (i.e., apply signal to condition gates 748 and 750). If equal, reset P clock and signal end of operation. If not equal, set P23 and N1. |
| P23 | Signal on output line 754 from gate 750 (FIG. 5G) (i.e., timing out of P22 and not equal output from compare circuit 738). OR Timing out of | Not used. | Test N clock. If ON, set P23. If OFF (i.e., signal on N clock OFF line 362) set P24 |

| Single Shot | Set Conditions | Functions Performed When Set | Functions Performed When Timing Out |
|---|---|---|---|
| | P23 and absence of a signal on N clock OFF line 362. | | |
| P24 | Timing out of P23 and signal on N clock OFF line 362. | Set flip-flop 456 to ONE or READ state (i.e., apply signal to OR gate 466). Set A field of AM #1 argument register (FIG.5B) and AM #1 argument mask to ONE (i.e., apply signals to OR gates 536 and 548). | Start AM #1 clock (FIG. 5C) (i.e., apply signal to OR gate 476. Set P25 |
| P25 | Timing out of P24 OR Timing out of P25 and signal on output line 488 from inverter 486 (FIG. 5C) indicating that AM #1 clock ON. | Not used. | Test AM #1 clock. If signal on AM #1-clock-OFF line 484, set P26. If no signal on this line (i.e., signal on line 488) set P25 |
| P26 | Timing out of P25 and signal | Not used. | Test AM #1 end-of-line flip-flop (FIG. |

| Single Shot | Set Conditions | Functions Performed When Set | Functions Performed When Timing Out |
|---|---|---|---|
| | on AM #1-clock-OFF line 484. | | 5C) (i.e., apply signal to condition gates 501 and 509). If flip-flop in ONE state, error signal and reset P clock. If ZERO, set P27 |
| P27 | Signal on output line 522 from gate 509 (FIG. 5C) (i.e., timing out of P26 and end-of-line flip-flop in ZERO state). | Increment T counter (FIG. 5G) (i.e., apply signal to OR gate 736). Reset AM #2 argument mask (FIG. 5H) (i.e., apply signal to OR gate 682). Reset AM #2 READ mask (FIG. 5J) (i.e., apply signal to OR gate 700) | Set E1 (i.e., start E clock). Set P28. |
| P28 | Timing out of P27 OR Timing out of P28 and absence of signal on E clock OFF line 429. | Not used. | Test E clock. If E clock ON (i.e., no signal on E clock OFF line 429) set P28. If E clock OFF (i.e., signal on E clock OFF line 429) set S1 (i.e., start S clock) and set P29 |

| Single Shot | Set Conditions | Functions Performed When Set | Functions Performed When Timing Out |
|---|---|---|---|
| P29 | Timing out of P28 and signal on E clock OFF line 429, OR Timing out of P29 in absence of signal on S clock OFF line 396. | Not used. | Test S. clock. If S clock ON (i.e., no signal on S clock OFF line 396) set P29. If S clock OFF (i.e., signal on S clock OFF line 396) set P17. |

APPENDIX II
N CLOCK

| Single Shot | Set Conditions | Functions Performed When Set | Functions Performed When Timing Out |
|---|---|---|---|
| N1 | Timing out of P8 OR Output signal on line 754 from gate 750 (FIG. 5G) (i.e., timing out of P22 and not-equal output from compare circuit 738). | Reset counter K (FIG. 5E) to one. Gate MAR, MACM (FIG. 5K) to registers XGN (FIG. 5E) and YGN (FIG. 5F) (i.e., condition gates 738 and 740 of FIG. 5K). Set A field of AM #1 argument mask (FIG. 5B) to 1 (i.e., apply signal to OR gate 548). Set A and B fields of AM #1 write mask | Set N2 |

| Single Shot | Set Conditions | Functions Performed When Set | Functions Performed When Timing Out |
|---|---|---|---|
| | | (FIG. 5D) and A field of AM #1 MDR to 1. Set flip-flop 456 (FIG. 5C) to ZERO or WRITE state (i.e., apply signal to OR gate 470. | |
| N2 | Timing out of N1 OR Timing out of N10 | Test counter K (FIG. 5E) (i.e., apply conditioning signal to gate 880). If count 1, increment XGN, If count 2, decrement XGN and increment YGN, If count 3, decrement XGN and decrement YGN, If count 4 increment XGN and decrement YGN. | If count in K counter is 1-4, set N3 If count 5, reset N clock (i.e., set N clock off flip-flop) (i.e., apply conditioning signal to gates 896 and 898 of FIG. 5F). |
| N3 | Timing out of N2 and count of 1, 2, 3, or 4 in counter K. | Not used. | Test XGN against X(MAX) and YGN against Y(MAX) (i.e., apply conditioning signal to gates 822 and 826 of FIG. 5F) If either XGN is greater than X(MAX) or YGN is greater than Y(MAX), set N10. |

| Single Shot | Set Conditions | Functions Performed When Set | Functions Performed When Timing Out |
|---|---|---|---|
| | | | If XGN is not greater than X(MAX) and YGN is not greater than Y(MAX), set N4 |
| N4 | Signal on output line 830 from gate 826 (FIG. 5F) (i.e., timing out of N3 and neither XGN nor YGN exceeding its respective maximum) | Gate XGN and YGN to MAR of WACM (FIG. 5K) (i.e., condition gates 784 and 790 of FIG. 5F) | Set N5 |
| N5 | Timing out of N4 | Read access MACM (FIG. 5K) (i.e., apply signal to OR gate 948. | Set N6 |
| N6 | Timing out of N5 | Not used. | Test indicator bit (left hand bit) of MBR of MACM (i.e., apply conditioning signal to gates 970 and 978). If indicator bit is ONE, set N7. If indicator bit is ZERO, set N10. |

| Single Shot | Set Conditions | Functions Performed When Set | Functions Performed When Timing Out |
|---|---|---|---|
| N7 | Signal on output line 982 from gate 970 (FIG. 5K) (i.e., timing out of N6 and presence of indicator bit in MBR). | Set left hand bit of MDR (FIG. 5K) to 0 (i.e., apply signal to OR gate 962) Gate MAR of MACM to B field of AM #1 MDR (i.e., apply conditioning signal to gate 560 of FIG. 5K). | Start AM #1 clock (FIG. 5C) (i.e., apply signal to OR gate 476) Set N8 |
| N8 | Timing out of N7 OR Timing out of N8 and signal on output line 488 from inverter 486 (FIG. 5C) indicating AM # 1 clock ON. | Not used. | Test AM # 1 clock, If ON, (i.e., signal on output line 488 from inverter 486), set N8 If signal on AM #1-clock-OFF line 484, set N9. |
| N9 | Timing out of N8 and signal on AM # 1 clock OFF line 484. | Write access MACM (FIG. 5K) (i.e., apply signal to OR gate 952) | Set N10 |
| N10 | Timing out of N9 OR Signal on output line 828 from OR gate 822 | Increment counter K (FIG. 5E) | |

| Single Shot | Set Conditions | Functions Performed When Set | Functions Performed When Timing Out |
|---|---|---|---|
| | (FIG. 5F) (i.e., timing out of N3 and indication that either XGN or YGN is greater than corresponding maximum) OR output signal on line 984 from gate 978 (FIG. 5K) (i.e., timing out of N6 and absence of indicator bit in MBR | | |

APPENDIX III

S CLOCK

| Single Shot | Set Conditions | Functions Performed When Set | Functions Performed When Timing Out |
|---|---|---|---|
| S1 | Signal on output line 398 from AND gate 399 (FIG.5A) (i.e., timing out of P28 and signal on E clock OFF line 429. | Reset ΣWXD1 (FIG. 5O) ΣWXD2, ΣDD1, and ΣDD2, and reset J flip-flop to its ZERO state. Reset AM#1 argument mask (FIG.5B)(i.e., apply signal to OR gate 544). | Set S2 |
| S2 | Timing out of S1 | Set A field of AM#1 argument register (FIG. 5B) and AM#1 argu- | Set S3 |

| Single Shot | Set Conditions | Functions Performed When Set | Functions Performed When Timing Out |
| --- | --- | --- | --- |
| | | ment mask to 1 (i.e., apply signal to OR gates 536 and 548. Set B fields of AM#1 read mask (FIG. 5D) to 1 (i.e., apply signal to OR gate 576). Set flip-flop 456 (FIG. 5C) to ONE or READ state, and reset end of line flip-flop 460 to its ZERO state (i.e., apply signals to OR gates 466 and 485). Set AM#1 match indicators to 1 (i.e. apply signal to OR gate 452 of FIG. 5C). | |
| S3 | Timing out of S2 | Associate on AM #1 (FIG.5B) (i.e., apply signal to OR gate 492). | Set S4 |
| S4 | Timing out of S3 OR Timing out of S13 OR Timing out of S22 and an indication that the contents of accumulator ΣWXD1 | Apply A pulse to AM#1 controls (FIG.5C) (i.e., apply signal to OR gate 448) | Set S4A |

| Single Shot | Set Conditions | Functions Performed When Set | Functions Performed When Timing Out |
|---|---|---|---|
| | are greater than the contents of register ΣWXD2, OR Timing out of S23 OR Timing out of S24, and an indication that the contents of accumulator ΣDD1 are equal to or greater than the contents of register ΣDD2. | | |
| S4A | Timing out of S4 | Apply B pulse to AM#1 controls (FIG. 5C). | Set S4B |
| S4B | Timing out of S4A | Apply C pulse to AM#1 controls (FIG. 5C) | Set S5 |
| S5 | Timing out of S4B | Not used | Test end of line flip-flop for AM #1 (i.e., apply signal to condition gates 502 and 510 0f FIG.5C) If flip-flop is in ONE state, reset S clock by applying signal to set S-clock-OFF flip-flop to its ON state. If end-of-line |

| Single Shot | Set Conditions | Functions Performed When Set | Functions Performed When Timing Out |
|---|---|---|---|
| | | | flip-flop is in ZERO state, set S6 |
| S6 | Signal on output line 526 from gate 510 (FIG. 5C)(i.e. timing out of S5 and end of line flip-flop 460 in its ZERO state) | Gate BX and BY fields of AM#1, MDR(FIG.5D) to XGN and YGN registers respectively, (i.e. apply conditioning signal to gate 760 of FIG.5E). Reset AM #2 argument mask (FIG.5H) (i.e. apply signal to OR gate 682) | Set S7 |
| S7 | Timing out of S6 | Set B field of AM #2 argument register (FIG.5H) and AM#2 argument mask to 1. Set E and F fields of AM#2 read mask (FIG. 5J) to 1. Set flip-flop 634 (FIG. 5I) to ONE or READ state, and reset AM#2 end-of-line flip-flop to ZERO state (i.e. apply signal to OR gates 640 and 598). Set match indicators in AM#2 controls (FIG.5I) to ONE (i.e. apply signal to OR gate 600) | Set S8 |
| S8 | Timing out of S7 | Associate on AM#2 (FIG.5H) (i.e. apply signal to OR gate 602) | Set S9 |

| Single Shot | Set Conditions | Functions Performed When Set | Functions Performed When Timing Out |
|---|---|---|---|
| S9 | Timing out of S8 OR Timing out of S21 | Apply A pulse to AM#2 controls (FIG. 5I) (i.e. apply signal to OR gate 604) | Set S9A |
| S9A | Timing out of S9 | Apply B pulse to AM#2 controls (FIG. 5I) (i.e. apply signal to OR gate 626) | Set S9B |
| S9B | Timing out of S9A | Apply C pulse to AM#2 controls (FIG. 5I) (i.e. apply signal to OR gate 630) | Set S10 |
| S10 | Timing out of S9B | Not used | Test AM#2 end-of-line flip-flop (FIG. 5I) (i.e. apply signal to condition gates 656 and 657) If flip-flop is in its ZERO state Set S14. If flip-flop is in its ONE state, set S11. |
| S11 | Signal on output line 662 from gate 656 (FIG. 5I) (i.e. timing out of S10 and signal on 1-side output line from end-of-line flip-flop 650) | Not used | Test J flip-flop (FIG. 5O) (i.e. apply conditioning signal to gates 1146 and 1148). If J flip-flop ZERO, set S 12. If J flip-flop ONE, set S22 |

| Single Shot | Set Conditions | Functions Performed When Set | Functions Performed when Timing Out |
|---|---|---|---|
| S12 | Signal on output line 1152 from gate 1148 (FIG.5O) (i.e. timing out of S11 and J flip-flop in its ZERO state) | Gate contents XGN (FIG.5E) and YGN to GN final (i.e. apply signal through OR gate 836 to condition gates 780 and 794). Gate accumulator ΣWXD1 to register ΣWXD2 and accumulator ΣDD1 to register ΣDD2 (i.e. apply signal through OR gate 1114 to condition gates 1104 and 1108) | Set S13 |
| S13 | Timing out of S12 | Set J flip-flop (FIG.5O) to ONE state | Set S4 |
| S14 | Signal on output line 664 from gate 657 (FIG.5I) (i.e. timing out of S10 and signal on ZERO side output line from end-of-line flip-flop 650) | Gate E field AM#2 MDR (Fig. 5J to XCB and YCB (FIG.5P) and gate F field AM#2 MDR to register WT(i.e. apply conditioning signals to gates 1178 and 1182 of FIG.5P) | Set S15 |
| S15 | Timing out of S14 | Gate contents XGN (FIG. 5E) and contents XCB (FIG. 5P) to inputs of subtracter 998 (FIG. 5M) (i. e., condition gates 782 of FIG. 5F and 1194 of FIG. 5P) | Set S16 |

| Single Shot | SetConditions | Functions Performed When Set | Functions Performed when Timing Out |
|---|---|---|---|
| | | Gate output from subtracter 998 to FX register (i. e., apply conditioning signal to gate 1008) | |
| S16 | Timing out of S15 | Gate contents YGN (FIG. 5F) and YCB (FIG. 5P) to inputs of subtracter 998 (FIG. 5M) (i. e., apply conditioning signal to gates 792 of FIG. 5F) and 1198 of FIG. 5P) Gate output form subtracter 998 to GY (FIG. 5M) (i. e., apply signal to condition gates 1010) | Set S17 |
| S17 | Timing out of S16 | Gate contents FX (FIG. 5M) to squaring circuit 1038 (i. e., apply conditioning signal to gate 1022) Gate output from squaring circuit 38 to $X^2$ register (FIG. 5N) (i. e., apply conditioning signal to gates 1042) | Set S18 |
| S18 | Timing out of | Gate contents GY (FIG. | Set S19 |

| Single Shot | Set Conditions | Functions Performed When Set | Functions Performed when Timing Out |
|---|---|---|---|
| | S17 | 5M) to squaring circuit 1038 (i. e., apply conditioning signal to gate 1028) Gate output from squaring circuit 38 to $Y^2$ register (FIG. 5N) (i. e., apply conditioning signal to gates 1044) | |
| S19 | Timing out of S18 | Gate contents of register $X^2$ (FIG. 5N) and $Y^2$ to adder 1066 (i. e., condition gates 1056 and 1060). Gate output adder 1066 to $Sum^2$ register (i. e., condition gates 1070) | Set S20 |
| S20 | Timing out of S19 | Gate contents $sum^2$ register (FIG. 5N) and contents WT register (FIG. 5P) to multiplier 1082 (i. e., apply conditioning signal to gates 1078 and 1086) Gate output multiplier 1082 to ΣWXD1 accumulator (FIG. 5O) (i.e., apply conditioned signal to gate 1094) | Set S21 |

| Single Shot | Set Conditions | Functions Performed When Set | Functions Performed when Timing Out |
|---|---|---|---|
| S21 | Timing out of S20 | Gate contents FX (FIG. 5M) and GY to inputs subtracter 998 (i.e., apply conditioning signal to gates 994 and 1026) Gate output subtracter 998 to accumulator ΣDD1 (FIG. 5O) (i.e., apply conditioning signal to gates 1006 of FIG. 5M) | Set S9 |
| S22 | Signal on output line 1150 from gate 1146 (FIG. 5O) (i.e, timing out of S11 and J flip-flop in its ONE state). | Not used. | Test compare unit 1102 (FIG. 5O) between accumulator ΣWXD1 and register ΣWXD2 (i.e., apply conditioning signal to gates 1132 to 1134) If ΣWXD2 less than ΣWXD1, set S4 If ΣWXD2 greater than ΣWXD1, set S23 If inputs to compare circuit 1102 equal, set S24 |
| S23 | Signal on output line 1166 from OR gate 1136 (FIG. 5P | Gate contents XGN (FIG. 5E) and YGN to GN final (i.e., applied signal | Set S4 |

| Single Shot | Set Conditions | Functions Performed When Set | Functions Performed When Timing Out |
|---|---|---|---|
| | (i.e., timing out of S22 and ΣWXD2 greater than ΣWXD1 OR Timing out of S24 and ΣDD2 greater than ΣDD1) | through OR gate 836 to condition gates 780 and 794. Gate contents ΣWXD1 (FIG. 5O) to ΣWXD2 and gate contents ΣDD1 to ΣDD2 (i.e., apply signal through OR gate 1114 to condition gates 1104 and 1108) | |
| S24 | Signal on output line 1138 from gate 1134 (FIG. 5O)(i.e., timing out of S22 and equal output from compare circuit 1102) | Not used. | Test output from compare circuit 1110 (FIG. 5P) which compares contents ΣDD1 and ΣDD2 (i.e., apply conditioning signal to gates 1160-1162) If ΣDD2 greater than ΣDD1, set S23 If ΣDD2 less than or equal ΣDD1, set S4 |

APPENDIX IV
E Clock

| Single Shot | Set Condi | Functions Performed When Set | Functions Performed When Timing Out |
|---|---|---|---|
| E1 | Timing out of P27 | Reset B and F fields AM #2 (FIG. 5H) (i.e., apply signal to OR gate 586) Gate contents T counter (FIG. 5 G) to C field AM #2 argument register (FIG. 5H) (i.e., apply conditioning signal to OR gate 728) Set C field AM #2 argument mask (FIG. 5H) to 1 (i.e., apply signal to OR gate 686) Set D field AM #2 read mask (FIG. 5J) to 1 (i.e., apply signal to OR gate 704) Set flip-flop 634 (FIG. 5I) to ONE or READ state (i.e., apply signal to OR gate 640) | Start AM #2 clock (FIG. 5I) (i.e., apply signal to OR gate 590) Set E2 |
| E2 | Timing out of E1 OR Timing out of E2 and signal on line 608 indicating AM# 2 clock not finished. | Not used | Test AM #2 clock If clock ON, Set E2 If signal on AM# 2-clock-OFF line 594, Set E3 |

| Single Shot | Set Conditions | Functions Performed When Set | Functions Performed When Timing Out |
|---|---|---|---|
| E3 | Timing out of E2 and signal on AM#2-clock-OFF line 594 | Gate contents D field of AM #2 MDR (FIG. 5J) to counter K (FIG. 5E) and name TI register 1204 (FIG. 5Q) (i.e., apply conditioning signal through OR gate 858 to gate 852 and apply conditioning signal to gate 855) Reset AM #2 argument mask (FIG. 5H) (i.e., apply signal to OR gate 682) | Set E4 |
| E4 | Timing out of E3 | Set A fields of AM#2 argument register (FIG. 5H) and AM #2 argument mask to 1. Set flip-flop 634 (FIG. 5I) to its ONE or READ state, and end of line flip-flop 650 to its ZERO state (i.e., apply signals to OR gates 640 and 598) Set match indicators in AM# 2 controls (FIG. 5I) to ONE state (i.e., apply signal to | Set E5 |

| Single Shot | Set Conditions | Functions Performed When Set | Functions Performed When Timing Out |
|---|---|---|---|
| | | OR gate 600) | |
| E5 | Timing out of E4 | Associate on AM #2 (FIG. 5H) (i.e., apply signal to OR gate 602) | Set E6 |
| E6 | Timing out of E5 OR Timing out of E28 | Apply A pulse to AM #2 controls (FIG. 5I) (i.e., apply signal to OR gate 604) | Set E9 |
| E9 | Timing out of E6 | Not used. | Test AM #2 end-of-line flip-flop (FIG. 5I) (i.e., apply signal to condition gates 658 and 659) If end of line flip-flop in its ONE state, reset E clock by setting E-clock-OFF trigger to its ONE state. If flip-flop in its ZERO state, set E10 |
| E10 | Signal on output line 668 from gate 659 (FIG. 5I) (i.e., timing out of E9 and | Reset accumulators AGA (FIG. 5Q) AROW (FIG. 5R) and SUM (i.e., apply signal to | Set E11 |

| Single Shot | Set Conditions | Functions Performed When Set | Functions Performed When Timing Out |
|---|---|---|---|
| | AM #2 end-of-line flip-flop in its ZERO state. | OR gate 1242 of FIG. 5Q) | |
| E11 | Timing out of E10 | Gate D field AM #2 MDR (FIG. 5J) to AGA accumulator (FIG. 5Q) (i.e., apply conditioning signal to gate 857) Decrement counter K (FIG. 5E) (i.e., apply signal to OR gate 866) | Set E12 |
| E12 | Timing out of E11 | Gate counter K (FIG. 5E) and register E (FIG. 5G) to multiplier 1228 (FIG. 5Q) (i.e., apply signal through OR gate 1222 to condition gates 869 and 1218) Gate output from multiplier to AROW accumulator (FIG. 5R) (i.e., apply conditioning signal to gates 1232) | Set E13 |
| E13 | Timing out of E12 | Gate contents AROW to accumulator AGA (FIG. 5Q) (i.e., apply conditioning signal to gates 1216) | Set E14 |
| E14 | Timing out of E13 | Gate contents AGA (FIG. 5Q) to MAR of W matrix | Set E15 |

| Single Shot | Set Conditions | Functions Performed When Set | Functions Performed When Timing Out |
|---|---|---|---|
| | | memory (FIG. 5L) (i.e., apply signal through OR gate 1250 to condition gates 1246) | |
| E15 | Timing out of E14 | Read access W matrix memory (FIG. 5L) (i.e., apply signal to OR gate 1262) | Set E16 |
| E16 | Timing out of E15 | Gate contents MBR W matrix memory to SUM accumulator (FIG. 5R) (i.e., apply signal through OR gate 1273 to condition gates 1270) | Set E17 |
| E17 | Timing out of E16 | Reset accumulators AGA (FIG. 5Q) and AROW (FIG. 5R) (i.e., apply signal to OR gate 1242 of FIG. 5Q) | Set E18 |
| E18 | Timing out of E17 | Gate D field of AM #2 MDR (FIG. 5J) to counter K (FIG. 5E) (i.e., apply signal through OR gate 858 to condition gates 852) | Set E19 |
| E19 | Timing out of E18 | Decrement counter K (FIG. 5E) (i.e., apply signal to OR gate 866) | Set E20 |
| E20 | Timing out of E19 | Gate Contents of counter K (FIG. 5E) and E register (FIG. | Set E21 |

| Single Shot | Set Conditions | Functions Performed When Set | Functions Performed When Timing Out |
|---|---|---|---|
| | | 5G) to multiplier 1228 (FIG. 5Q) (i.e., apply signal through OR gate 1222 to condition gates 869 and 1218) Gate output from multiplier 1228 to accumulator AGA (i.e., apply conditioning signal to gate 1214) | |
| E21 | Timing out of E20 | Gate contents NAME TI register (FIG. 5Q) to accumulator AGA (i.e., apply conditioning signal to gate 1208) | Set E22 |
| E22 | Timing out of E21 | Gate contents AGA (FIG. 5Q) to MAR of W matrix memory (FIG. 5L) (i.e., apply signal through OR gate 1250 to condition gates 1246) | Set E23 |
| E23 | Timing out of E22 | Read access W matrix memory (FIG. 5L) (i.e., apply signal to OR gate 1262 | Set E24 |
| E24 | Timing out of E23 | Gate contents MBR for W matrix memory (FIG. 5L) SUM accumulator | Test SUM accumulator (FIG. 5R) |

| Single Shot | Set Conditions | Functions Performed When Set | Functions Performed When Timing Out |
|---|---|---|---|
| | | (FIG. 5R) (i.e., apply signal through OR gate 1273 to condition gates 1270) Reset AM #2 write mask (FIG. 5J) (i.e., apply signal to OR gate 724) | (i.e., apply conditioning signals to gates 1284 and 1286) If contents of accumulator is zero, set E27, If contents of accumulator is other than zero, set E25 |
| E25 | Signal on output line 1290 from gate 1286 (FIG. 5R) (i.e., timing out of E24 and not-zero output from SUM accumulator decoder 1278) | Set B and F fields of AM #2 write mask (FIG. 5J) to 1, set B field of AM #2 MDR to 1. Gate contents SUM accumulator (FIG. 5R) to F field of AM #2 MDR (i.e., apply conditioning signal to gate 716. Set flip-flop 634 (FIG. 5I) to ZERO or WRITE state (i.e., apply signal to OR gate 644) | Set E26 |

| Single Shot | Set Conditions | Functions Performed When Set | Functions Performed When Timing Out |
|---|---|---|---|
| E26 | Timing out of E25 | Apply A pulse to AM #2 controls (FIG. 5I) (i.e., apply signal to OR gate 604) | Set E27 |
| E27 | Signal on output line 1288 from gate 1284 (FIG. 5R) (i.e., timing out of E24 and signal on zero output line from decoder 1278 for SUM accumulator 1274) OR Timing out of E26 | Apply B pulse to AM #2 controls (FIG. 5I) (i.e., apply signal to OR gate 626) | Set E28 |
| E28 | Timing out of E27 | Apply C pulse to AM #2 controls (FIG. 5I) (i.e., apply signal to OR gate 630). Set flip-flop 634 to ONE or READ state (i.e., apply signal to OR gate 640) | Set E6 |

What is claimed is:

1. A system for fabricating an interconnected circuit on a substrate having a plurality of circuit element positions comprising:

means for applying to the system information as to the interconnected circuit including the relationship of the elements of the circuit to each other;

means for utilizing the relationship of the elements of the circuit to determine the order in which the elements of the circuit are to be assigned to circuit element positions on the substrate;

means for assigning the first element to be assigned to a selected element position on said substrate;

means operative after each element is assigned to an element position on the substrate for selecting candidate positions related in a predetermined manner to positions which have already had an element assigned to them;

means for determining the best candidate position for the next element to be assigned;

and means, including in part said first element assigning means, for assigning the next element to be assigned to said best candidate position.

2. A system of the type described in claim 1 including:

means operative when all the elements of said interconnected circuit have been assigned to element positions for initiating the interconnecting of the element positions having elements assigned to them into said interconnected means, means operative in response to said interconnecting initiating means for determining a suitable wiring pattern for interconnecting the element positions having elements assigned to them into said interconnected circuit;

and means for interconnecting said element positions in accordance with said suitable pattern.

3. A system of the type described in claim 1 further including means operative when all the elements of said interconnected circuit have been assigned to element positions for initiating the interconnecting of the element positions having elements assigned to them into said interconnected circuit.

4. A system of the type described in claim 1 wherein said means for assigning said first element to a selected element position operates to assign said element to a centralized position on said substrate;

and said means for selecting candidate positions operate to select elements positions which have not yet had an element assigned to them and are adjacent to a position which has already had an element assigned to it.

5. A system of the type described in claim 1 wherein said means for assigning the next element to said best candidate position operated to assign the candidate position for which the eventual interconnections between the next element to be assigned and the elements to which it is connected which have already been assigned is, on the average, the shortest and the simplest.

6. A system of the type described in claim 1 wherein it is possible that less than 100 percent of the element positions will be useable including:

means for applying to the system information as to the useable condition of each of the element positions on the substrate;

and means for inhibiting the selection of an unuseable element position as a candidate position by said candidate position selecting means.

7. A system of the type described in claim 6 wherein said means for assigning said first element to a selected element position operates to assign said element to a centralized position on said substrate;

and said means for selecting candidate positions operate to select element positions which have not yet had an element assigned to them and are adjacent to a position which has already had an element assigned to it.

8. A system of the type described in claim 7 wherein said means for determining the best candidate position includes:

means for determining, for each candidate position, the sum of the square of the distance between the candidate position and each position having assigned to it an element related to the next element to be assigned times the relationship of the next element to be assigned to the element assigned to the position;

and means for selecting as the best candidate position the candidate position for which the above determined sum is a minimum.

9. A system for assigning a plurality of interrelated elements to element positions in an array of element positions comprising:

means for storing a coefficient of interrelationship between each of said elements;

means for utilizing said coefficients of interrelationship to determine the order in which the elements are to be assigned to element positions in said array;

means for assigning the first element to be assigned to a selected element position in said array;

means operative after each element is assigned to an element position for selecting candidate positions related in a predetermined manner to positions which have already had an element assigned to them;

means for determining the best candidate position for the next element to be assigned;

and means, including in part said first element assigning means, for assigning the next element to be assigned to said best candidate position.

10. A system of the type described in claim 9 wherein said means for assigning said first element to a selected element position operates to assign said element to a centralized position in said array;

and said means for selecting candidate positions operate to select element positions which have not yet had an element assigned to them and are adjacent to a position which has already had an element assigned to it.

11. A system of the type described in claim 9 wherein said means for determining the best candidate position includes:

means for determining, for each candidate position, the sum of the square of the distance between the candidate position and each position having assigned to it an element related to the next element to be assigned times the coefficient of interrelationship of the next element to be assigned to the element assigned to the position;

and means for selecting as the best candidate position the candidate position for which the above determined sum is a minimum.

12. A system of the type described in claim 11 including:

means operative when two or more candidate positions have the same minimum-determined-sum for determining for which of those candidate positions the average distance in each coordinate direction between the candidate position and the positions having elements related to the next element to be assigned to them are most nearly equal;

and means for selecting the candidate position determined to have the minimum average distance difference, by the above means, as the best candidate position.

13. A system of the type described in claim 10 wherein it is possible that less than 100 percent of the element positions will be useable including:

means for applying to the system information as to the useable condition of each of the element positions of the array;

and means for inhibiting the selection of an unuseable element position as a candidate position by said candidate position selecting means.

14. A system of the type described in claim 13 including:

means operative after said candidate position selecting means for determining if there are any candidate positions;

and means operative in response to a determination by said above means that there are no candidate positions, for making all useable positions in said array available as candidate positions.

15. A system for assigning a plurality of interrelated elements to element positions in an array of element positions wherein the interrelated elements are circuit elements of an interconnected circuit and wherein the element positions are circuit positions on a substrate, said system comprising:

means for storing a coefficient of interrelationship between each of said elements;

means for storing a list of said interrelated elements in the order in which they are to be assigned;

means for assigning the first element to be assigned to a selected element position in said array;

means operative after each element is assigned to an element position in said array for selecting candidate positions related in a predetermined manner to positions which have already had an element assigned to them;

means for determining the best candidate position for the next element to be assigned;

and means, including in part said first element assigning means, for assigning the next element to be assigned to said best candidate position.

16. A system of the type described in claim 15 wherein said means for assigning said first element to a selected element position operates to assign said element to a centralized position of said array;

and said means for selecting candidate positions operate to select element positions which have not yet had an element assigned to them and are adjacent to a position which has already had an element assigned to it.

17. A system of the type described in claim 15 wherein said means for determining the best candidate position includes:

means for determining, for each candidate position, the sum of the square of the distance between the candidate position and each position having assigned to it an element related to the next element to be assigned times the relationship of the next element to be assigned to the element assigned to the position;

and means for selecting as the best candidate position the candidate position for which the above determined sum is a minimum.

18. A system of the type described in claim 17 including:

means operative when two or more candidate positions have the same minimum determined sum for determining for which of those candidate positions the average distance in each coordinate direction between the candidate position and the positions having elements, related to the next element to be assigned, assigned to them are most nearly equal;

and means for selecting the candidate position determined to have the minimum average distance difference by the above means as the best candidate position.

19. A system of the type described in claim 15 wherein it is possible that less than 100 percent of the element positions will be useable including:

means for applying to the system information as to the useable condition of each of the element positions;

and means for inhibiting the selection of an unuseable element position as a candidate position by said candidate position selecting means.

20. A system of the type described in claim 19 including:

means operative after said candidate position selecting means for determining if there are any candidate positions;

and means operative in response to a determination by said above means that there are no candidate positions, for making all useable positions in said array available as candidate positions.

* * * * *